US012132899B2

(12) United States Patent
Wang et al.

(10) Patent No.: US 12,132,899 B2
(45) Date of Patent: Oct. 29, 2024

(54) BV LIST CONSTRUCTION PROCESS OF IBC BLOCKS UNDER MERGE ESTIMATION REGION

(71) Applicants: Beijing Bytedance Network Technology Co., Ltd., Beijing (CN); Bytedance INC., Los Angeles, CA (US)

(72) Inventors: Yang Wang, Beijing (CN); Li Zhang, San Diego, CA (US); Hongbin Liu, Beijing (CN); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 139 days.

(21) Appl. No.: 17/882,590

(22) Filed: Aug. 7, 2022

(65) Prior Publication Data
US 2023/0081842 A1    Mar. 16, 2023

Related U.S. Application Data

(63) Continuation of application No. PCT/CN2021/075775, filed on Feb. 7, 2021.

(30) Foreign Application Priority Data

Feb. 7, 2020   (WO) ................ PCT/CN2020/074485
Mar. 30, 2020  (WO) ................ PCT/CN2020/082125
Apr. 10, 2020  (WO) ................ PCT/CN2020/084298

(51) Int. Cl.
*H04N 19/119*   (2014.01)
*H04N 19/176*   (2014.01)
(Continued)

(52) U.S. Cl.
CPC ......... *H04N 19/119* (2014.11); *H04N 19/176* (2014.11); *H04N 19/70* (2014.11); *H04N 19/96* (2014.11)

(58) Field of Classification Search
CPC .... H04N 19/119; H04N 19/176; H04N 19/52; H04N 19/593; H04N 19/70; H04N 19/96
(Continued)

(56) References Cited

U.S. PATENT DOCUMENTS

2019/0246143 A1   8/2019 Zhang et al.
2020/0045306 A1   2/2020 Lee
(Continued)

FOREIGN PATENT DOCUMENTS

WO        2020007291 A1    1/2020

OTHER PUBLICATIONS

Document: JVET-Q0185-v1, Hsiao, Y-L., et al., "AHG16: On merge estimation region for VVC," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.

(Continued)

Primary Examiner — Kathleen M Walsh
(74) Attorney, Agent, or Firm — Conley Rose, P.C.

(57) ABSTRACT

BV list construction process of IBC blocks under merge estimation region is described. An example method of video processing includes determining, for a conversion between a current video block of a video and a bitstream of the video, one or more block vector (BV) candidates for the current video block based on a merge estimation region (MER) covering the current video block; adding the one or more BV candidates to a BV list associated with the current video block; and performing the conversion based on the BV list.

18 Claims, 29 Drawing Sheets

(51) Int. Cl.
  *H04N 19/70* (2014.01)
  *H04N 19/96* (2014.01)
(58) Field of Classification Search
  USPC ..................................................... 375/240.02
  See application file for complete search history.

(56) References Cited

U.S. PATENT DOCUMENTS

| | | | |
|---|---|---|---|
| 2021/0136422 A1* | 5/2021 | Huang | H04N 5/765 |
| 2021/0195229 A1* | 6/2021 | Esenlik | H04N 19/513 |
| 2021/0203980 A1* | 7/2021 | Esenlik | H04N 19/52 |

OTHER PUBLICATIONS

Document: JCTVC-H0082, M22954, Zhou, M., "AHG10: Configurable and CU-group level parallel merge/skip," Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, 14 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

Document: JVET-N0843-v1, Xu, X., et al., "CE8-related: Combination test of JVET-N0176/JVET-N0317/JVET-N0382 on simplification of IBC vector prediction," Joint Video Experts Team (JVET) of ITU-T SG 16 WP 3 and ISO/IEC JTC 1/SC 29/WG 11 14th Meeting: Geneva, CH, Mar. 19-27, 2019, 11 pages.

Document: JVET-N0340_r1, Wang, X., et al., "CE4-related: An improved method for triangle merge list construction," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

Document: JVET-L0054, Jeong, S., et al., "CE4 Ultimate motion vector expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, 6 pages.

Document: JVET-L0100-v3, Chiang, M-S., et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11 12th Meeting: Macao, CN, Oct. 3-12, 2018, 15 pages.

Document: JVET-N1001-v10, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.

Document: JVET-M0147-v7, Sethuraman, S., "CE9: Results of DMVR related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, 12 pages.

Document: JVET-Q2001-vB, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13- 21, 2017, 50 pages.

Retrieved on the Internet: https://jvet.hhi.fraunhofer.de/svn/svn_HMJEMSoftware/tags/HM-16.6-JEM-7.0, Nov. 1, 2022, 1 page.

Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.

Series H: Audiovisual and Multimedia Systems Infrastructure of audiovisual services—Coding of moving video, "High efficiency video coding", Recommendation ITU-T H.265, ISO/IEC 23008-2, Feb. 2018, 692 pages.

Suehring, K., Retrieved from the internet: https://vcgit.hhi.fraunhofer.de/jvet/VVCSoftware_VTM/-/tags/VTM-7.0, Nov. 1, 2022, 2 pages.

Document: JCTVC-W1005-v4, Joshi, R., et al., "High Efficiency Video Coding (HEVC) Screen Content Coding: Draft 6," Joint Collaborative Team on Video Coding (JCT-VC) of ITU-T SG 16 WP 3 and ISO/IEC JTC 1/SC 29/WG 11 23rd Meeting: San Diego, USA, Feb. 19-26, 2016, 592 pages.

Document: JVET-Q2001-vD, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 511 pages.

Foreign Communication From A Related Counterpart Application, International Application No. PCT/CN2021/075775, English Translation of International Search Report dated May 6, 2021, 12 pages.

* cited by examiner

BV LIST CONSTRUCTION PROCESS OF IBC BLOCKS UNDER MERGE ESTIMATION REGION

CROSS-REFERENCE TO RELATED APPLICATION

This application is a continuation of International Patent Application No. PCT/CN2021/075775, filed on Feb. 7, 2021, which claims the priority to and benefits of International Patent Application No. PCT/CN2020/074485, filed on Feb. 7, 2020, No. PCT/CN2020/082125, filed on Mar. 30, 2020, and No. PCT/CN2020/084298, filed on Apr. 10, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for video processing in which intra block coding and decoding is performed using block vector (BV) lists.

In one example aspect, a video processing method is disclosed. The method includes maintaining, for a conversion between a video block of a video of a video region and a coded representation of the video, a list of block vector (BV) candidates based on a selection rule that specifies selectively including candidates based on a merge estimation region (MER) of the video block; and performing the conversion based on the list of BV candidates.

In another example aspect, a video processing method is disclosed. The method includes determining, for a conversion between a video block of a video and a coded representation of the video; and processing a list of block vector history based candidates subject to a rule that the list is not updated in a first case that the video block is in a merge estimation region (MER) or in a second case that the list has been updated once before inside the MER.

In another example aspect, a video processing method is disclosed. The method includes maintaining, for a conversion between a video block of a video and a coded representation of the video, a list of motion candidates to which candidates from neighboring blocks of a merge estimation region (MER) of the video block are selectively added based a rule; and performing the conversion based on the list of motion candidates.

In another example aspect, a video processing method is disclosed. The method includes maintaining, for a conversion between a video block of a video and a coded representation of the video, a list of motion candidates whose size depends on whether the video block is under a merge estimation region (MER) according to a size rule; and performing the conversion based on the list of motion candidates.

In another example aspect, a video processing method is disclosed. The method includes determining, a position of a video block of a video with respect to a corresponding merge estimation region, and performing, by selecting a motion list construction process based on a rule that depends on the position, a conversion between the video block and a coded representation of the video.

In another example aspect, a video processing method is disclosed. The method includes determining, for a video block of a video, a characteristic of a merge estimation region for the video block, and performing a conversion between the video block and a coded representation of the video, wherein a tree splitting mode used during the conversion depends on the characteristic according to a rule.

In another example aspect, a video processing method is disclosed. The method includes determining, for a conversion between a current video block of a video and a bitstream of the video, one or more block vector (BV) candidates for the current video block based on a merge estimation region (MER) covering the current video block; adding the one or more BV candidates to a BV list associated with the current video block; and performing the conversion based on the BV list.

In another example aspect, a video processing method is disclosed. The method includes determining, for a conversion between a current video block of a video and a bitstream of the video, one or more motion candidates for the current video block based on a merge estimation region (MER) covering the current video block in a motion candidate list construction process; adding the one or more motion candidates to a motion candidate list associated with the current video block in the motion candidate list construction process; and performing the conversion based on the motion candidate list.

In another example aspect, a video processing method is disclosed. The method includes determining, for a conversion between a current video block of a video and a bitstream of the video, one or more normative constraints on Binary Tree (BT) and/or Ternary-Tree (TT) split based on a merge estimation region (MER) associated with the current video block, wherein the current video block is completely inside the MER or overlapped with the MER; and performing the conversion based on the one or more normative constraints.

In another example aspect, a method for storing bitstream of a video is disclosed. The method includes determining, for a conversion between a current video block of a video and a bitstream of the video, one or more motion candidates for the current video block based on a merge estimation region (MER) covering the current video block in a motion candidate list construction process; adding the one or more motion candidates to a motion candidate list associated with the current video block in the motion candidate list construction process; generating the bitstream from the current video block based on the motion candidate list; and storing the bitstream in a non-transitory computer-readable recording medium.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed.

The code embodies one of the methods described herein in the form of processor-executable code.

These, and other, features are described throughout the present document.

DETAILED DESCRIPTION

Figure 1:
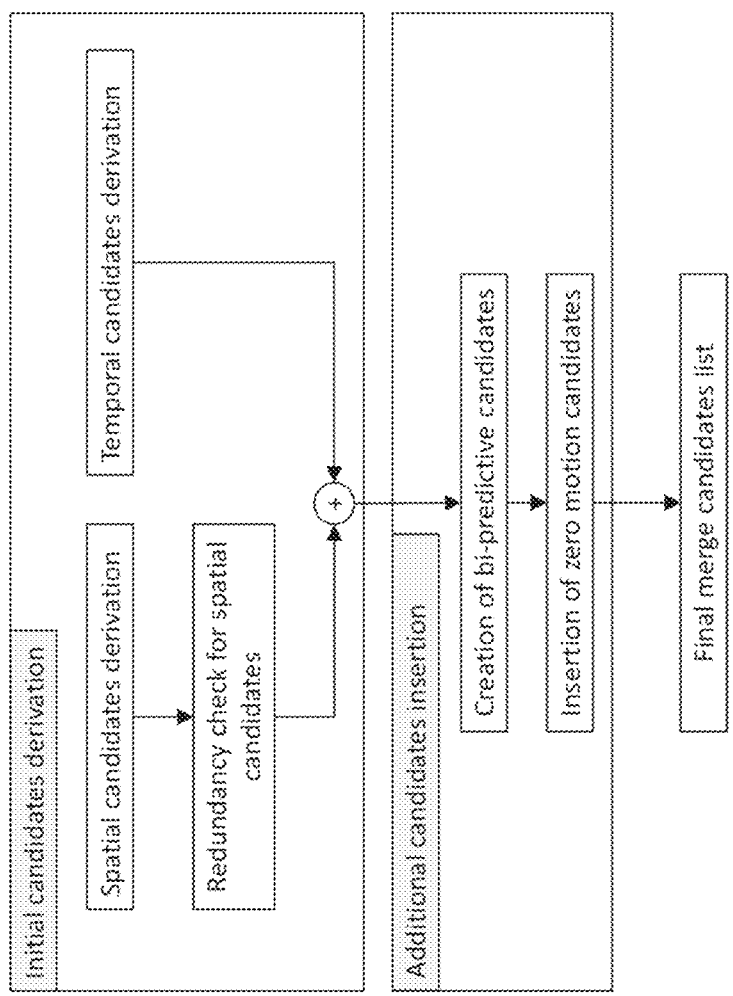
FIG. 1 shows a derivation process for merge candidates list construction.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1 Summary

This document is related to video coding technologies. Specifically, it is related to inter coding and intra block copy (IBC) coding, in which the reference (or prediction) block is obtained with samples in the current picture. It may be applied to the existing video coding standard like High Efficiency Video Coding (HEVC), or the standard Versatile Video Coding (VVC) to be finalized. It may be also applicable to future video coding standards or video codec.

2 Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
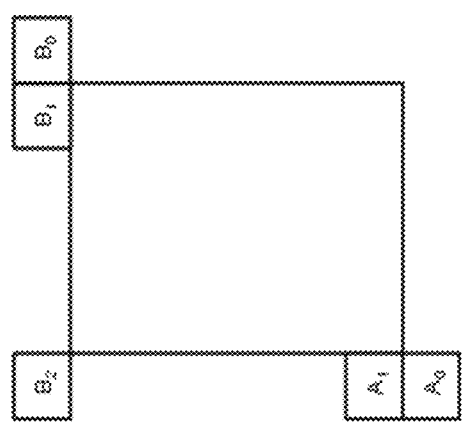
FIG. 2 shows positions of spatial merge candidates.

In the derivation of spatial merge candidates, a maximum of four merge candidates are selected among candidates located in the positions depicted in FIG. 2. The order of derivation is left ($A_1$), above ($B_1$), above-right ($B_0$), below-left ($A_0$) and above-left ($B_2$). Position $B_2$ is considered only when any PU of position $A_1$, $B_1$, $B_0$, $A_0$ is not available (e.g. because it belongs to another slice or tile) or is intra coded.

Figure 3:
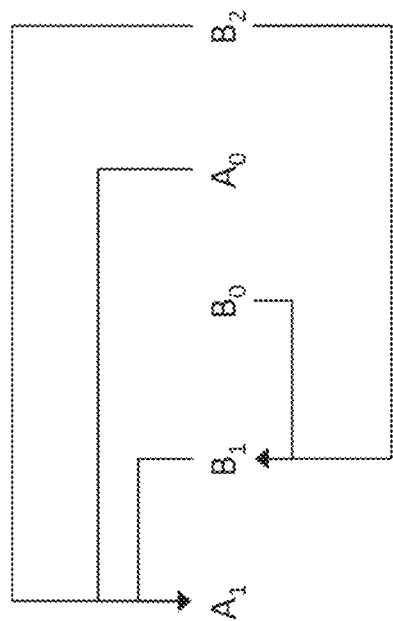
FIG. 3 shows candidate pairs considered for redundancy check of spatial merge candidates.
Figure 4:
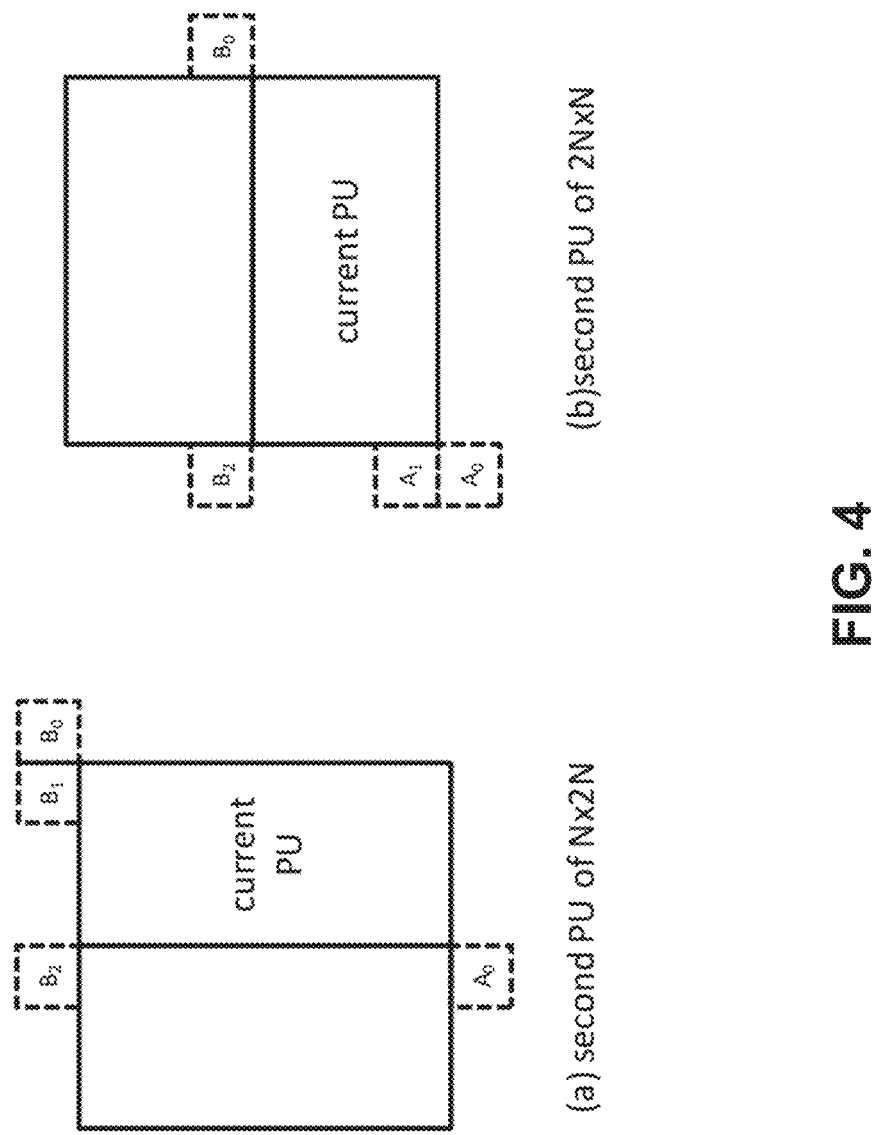
FIG. 4 illustrates an example coding of palette in shows example positions for the second prediction unit (PU) of N×2N and 2N×N partitions.

After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

In this step, only one candidate is added to the list. Particularly, in the derivation of this temporal merge candidate, a scaled motion vector is derived based on co-located PU in a co-located picture. The scaled motion vector for temporal merge candidate is obtained as illustrated by the dotted line in FIG. 5, which is scaled from the motion vector of the co-located PU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
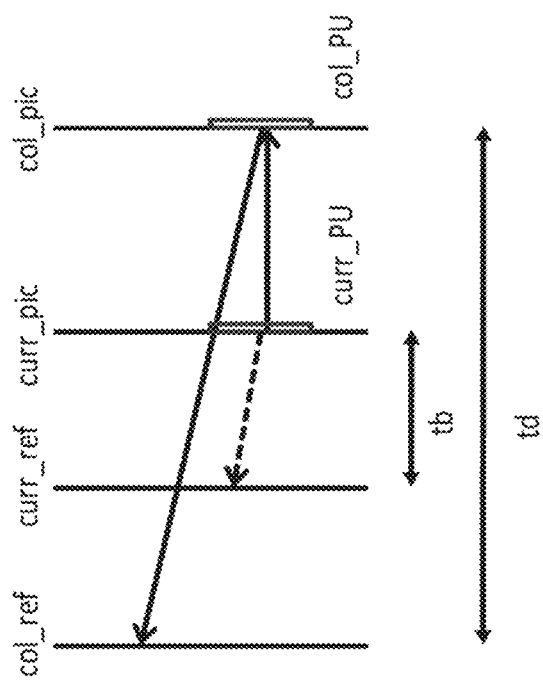
FIG. 5 is an illustration of motion vector scaling for temporal merge candidate.

FIG. 5 is an illustration of motion vector scaling for temporal merge candidate.

2.1.2.4 Co-Located Picture and Co-Located PU

When temporal motion vector predictor (TMVP) is enabled (i.e., slice_temporal_mvp_enabled_flag is equal to 1), the variable ColPic representing the col-located picture is derived as follows:

If current slice is B slice and the signalled collocated_from_l0 flag is equal to 0, ColPic is set equal to RefPicList1[collocated_ref_idx].

Otherwise (slice_type is equal to B and collocated_from_l0_flag is equal to 1, or slice_type is equal to P), ColPic is set equal to RefPicList0[collocated_ref_idx].

wherein collocated_ref_idx and collocated_from_l0_flag are two syntax elements which may be signalled in slice header.

Figure 6:
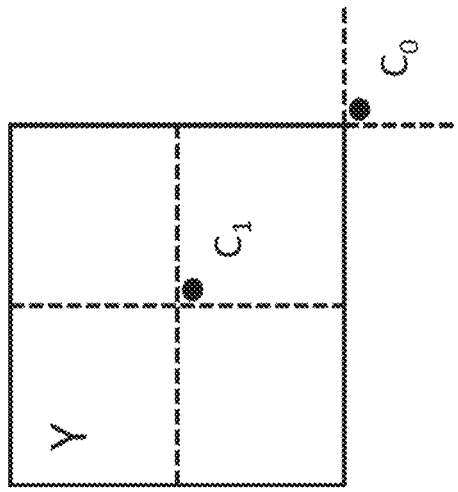
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

Related syntax elements are described as follows:

7.3.6.1 General Slice Segment Header Syntax

| slice_segment_header( ) { | Descriptor |
|---|---|
| first_slice_segment_in_pic_flag | u(1) |
| ... | |
| if( slice_type = = P | | slice_type = = B ) { | |
| num_ref_idx_active_override_flag | u(1) |
| if( num_ref_idx_active_override_flag) { | |
| num_ref_idx_l0_active_minus1 | ue(v) |
| if( slice type = = B ) | |
| num_ref_idx_l1_active_minus1 | ue(v) |
| } | |
| ... | |
| *if( slice_temporal_mvp_enabled_flag {* | |
| *if( slice_type = = B )* | |
| *collocated_from_l0_flag* | u(1) |
| *if( ( collocated_from_l0_flag && num_ref_idx_l0_active_minus1 > 0 ) \|\|* | |
| *( !collocated_from_l0_flag && num_ref_idx_l1_active_minus1 > 0 ) )* | |
| *collocated_ref_idx* | ue(v) |
| } | |
| ... | |
| byte_alignment( ) | |
| } | |

2.1.2.5 Derivation of MVs for the TMVP Candidate

More specifically, the following steps are performed in order to derive the TMVP candidate:

1) set reference picture list X=0, target reference picture to be the reference picture with index equal to 0 (i.e., curr_ref) in list X. Invoke the derivation process for collocated motion vectors to get the MV for list X pointing to curr_ref.

2) if current slice is B slice, set reference picture list X=1, target reference picture to be the reference picture with index equal to 0 (i.e., curr_ref) in list X. Invoke the derivation process for collocated motion vectors to get the MV for list X pointing to curr_ref.

The derivation process for collocated motion vectors is described in the next sub-section 2.1.2.5.1.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.

Otherwise, A is set equal to collocated_from_l0_flag.

The related working draft in JCTVC-W1005-v4 is described as follows:

8.5.3.2.9 Derivation Process for Collocated Motion Vectors

Inputs to this process are:
  a variable currPb specifying the current prediction block,
  a variable colPb specifying the collocated prediction block inside the collocated picture specified by ColPic,
  a luma location (xColPb, yColPb) specifying the top-left sample of the collocated luma prediction block specified by colPb relative to the top-left luma sample of the collocated picture specified by ColPic,
  a reference index refIdxLX, with X being 0 or 1.

Outputs of this process are:
  the motion vector prediction mvLXCol,
  the availability flag availableFlagLXCol.

The variable currPic specifies the current picture.

The arrays predFlagL0Col[x][y], mvL0Col[x][y], and refIdxL0Col[x][y] are set equal to PredFlagL0[x][y], MvL0[x][y], and RefIdxL0[x][y], respectively, of the collocated picture specified by ColPic, and the arrays predFlagL1Col[x][y], mvL1Col[x][y], and refIdxL1Col[x][y] are set equal to PredFlagL1[x][y], MvL1[x][y], and RefIdxL1[x][y], respectively, of the collocated picture specified by ColPic.

The variables mvLXCol and availableFlagLXCol are derived as follows:

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows:

If predFlagL0Col[xColPb][yColPb] is equal to 0, mvCol, refIdxCol, and listCol are set equal to mvL1Col[xColPb][yColPb], refIdxL1Col[xColPb][yColPb], and L1, respectively.

Otherwise, if predFlagL0Col[xColPb][yColPb] is equal to 1 and predFlagL1Col[xColPb][yColPb] is equal to 0, mvCol, refIdxCol, and listCol are set equal to mvL0Col[xColPb][yColPb], refIdxL0Col[xColPb][yColPb], and L0, respectively.

Otherwise (predFlagL0Col[xColPb][yColPb] is equal to 1 and predFlagL1Col[xColPb][yColPb] is equal to 1), the following assignments are made:

If NoBackwardPredFlag is equal to 1, mvCol, refIdxCol, and listCol are set equal to mvLXCol[xColPb][yColPb], refIdxLXCol[xColPb][yColPb], and LX, respectively.

Otherwise, mvCol, refIdxCol, and listCol are set equal to mvLNCol[xColPb][yColPb], refIdxLNCol[xColPb][yColPb], and LN, respectively, with N being the value of collocated_from_l0_flag.

and mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic, and the following applies:

$$colPocDiff=DiffPicOrderCnt(ColPic,refPicListCol[refIdxCol]) \quad (2\text{-}1)$$

$$currPocDiff=DiffPicOrderCnt(currPic,RefPicListX[refIdxLX]) \quad (2\text{-}2)$$

If RefPicListX[refIdxLX] is a long-term reference picture, or colPocDiff is equal to currPocDiff, mvLXCol is derived as follows:

$$mvLXCol=mvCol \quad (2\text{-}3)$$

Otherwise, mvLXCol is derived as a scaled version of the motion vector mvCol as follows:

$$tx=(16384+(Abs(td)>>1))/td \quad (2\text{-}4)$$

$$distScaleFactor=Clip3(-4096,4095,(tb*tx+32)>>6) \quad (2\text{-}5)$$

$$mvLXCol=Clip3(-32768,32767,Sign(distScaleFactor*mvCol)*((Abs(distScaleFactor*mvCol)+127)>>8)) \quad (2\text{-}6)$$

where td and tb are derived as follows:

$$td=Clip3(-128,127,colPocDiff) \quad (2\text{-}7)$$

$$tb=Clip3(-128,127,currPocDiff) \quad (2\text{-}8)$$

Definition of NoBackwardPredFlag is:
The variable NoBackwardPredFlag is derived as follows:
 If DiffPicOrderCnt(aPic, CurrPic) is less than or equal to 0 for each picture aPic in RefPicList0 or RefPicList1 of the current slice, NoBackwardPredFlag is set equal to 1.
 Otherwise, NoBackwardPredFlag is set equal to 0.

2.1.2.6 Additional Candidates Insertion

Figure 7:
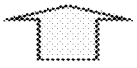
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates, defined in [1].

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatial-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
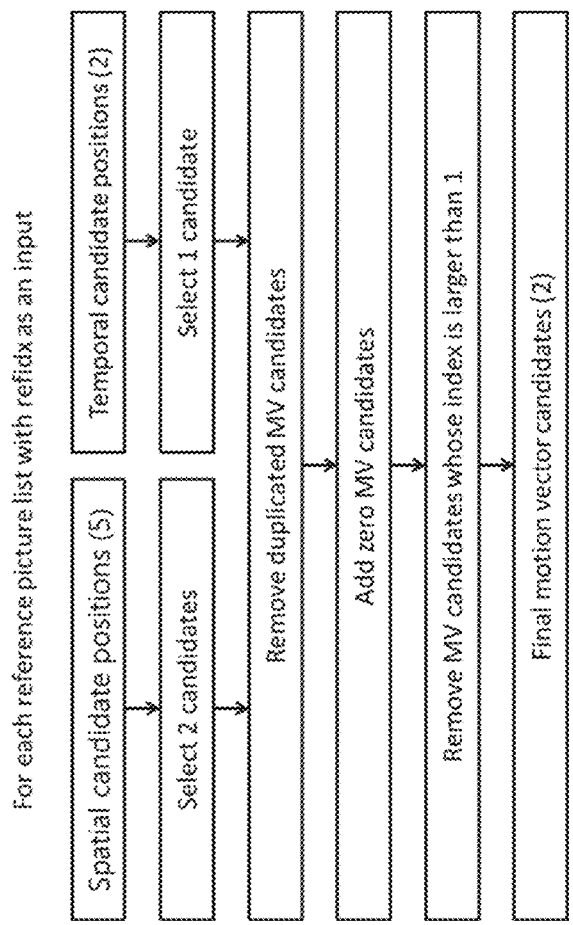
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
 Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
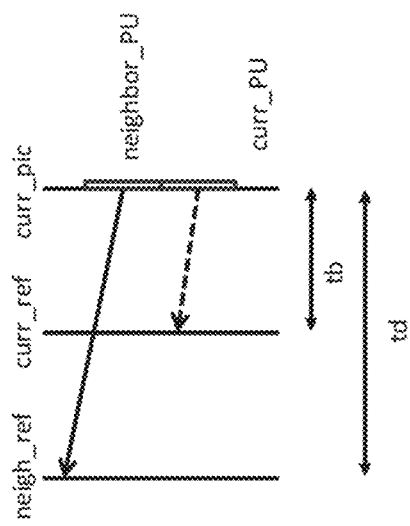
FIG. 9 is an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6) The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signalled in slice header, and maximum value is 5.
2) Regular merge list: For inter-coded blocks, one merge list construction process is shared. Here, the spatial/temporal merge candidates, history-based motion vector prediction (HMVP), pairwise merge candidates and zero motion candidates may be inserted in order. Regular merge list size is signalled in slice header, and maximum value is 6. MMVD, TPM, CIIP rely on the regular merge list.
3) IBC merge list: it is done in a similar way as the regular merge list.

Similarly, there are three AMVP lists supported in VVC:
1) Affine AMVP candidate list
2) Regular AMVP candidate list
3) IBC AMVP candidate list: the same construction process as the IBC merge list 2.2.1 Coding Block Structure in VVC In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signalled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10B:
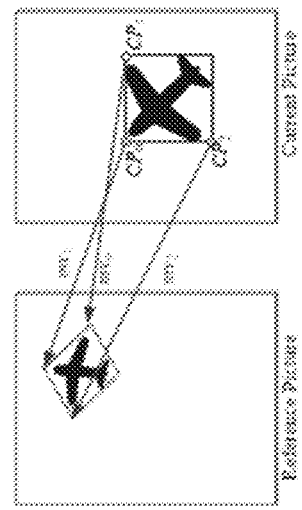
FIGS. 10A-10B show simplified affine models; a 4-parameter affine model (FIG. 10A) and a 6-parameter affine model (FIG. 10B).
Figure 10A:
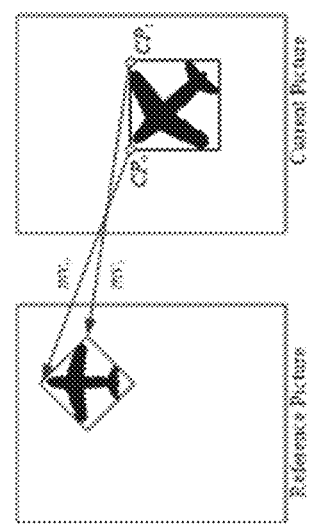

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown in FIGS. 10A-10B the affine motion field of the block is described by two control point motion vectors (CPMVs) for the 4-parameter affine model (FIG. 10A) and 3 CPMVs for the 6-parameter affine model (FIG. 10B).

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

Where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signalled (like in the affine AMVP mode) or derived on-the-fly (like in the affine merge mode). w and h are the width and height of the current block. In practice, the division is implemented by right-shift with a rounding operation. In virtual transport medium (VTM), the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
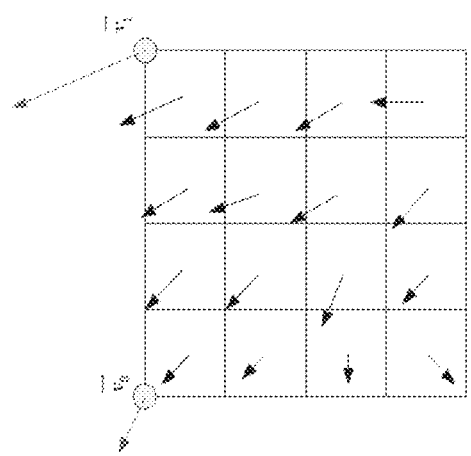
FIG. 11 shows an example of Affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block

2.2.3.1 Merge List Construction of Translational Regular Merge Mode

2.2.3.1.1 History-Based Motion Vector Prediction (HMVP)

Different from the merge list design, in VVC, the history-based motion vector prediction (HMVP) method is employed.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly.

Figure 12:
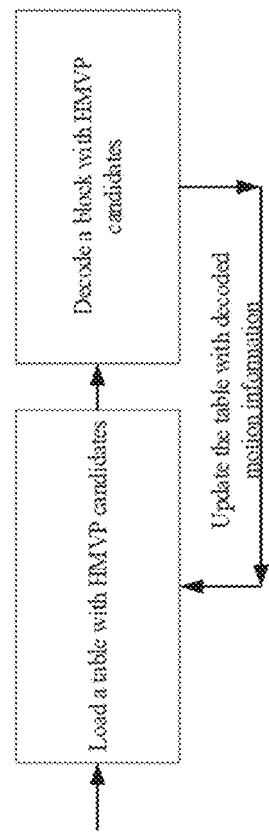
FIG. 12 shows examples of candidates position for affine merge mode.

The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

Figure 13:
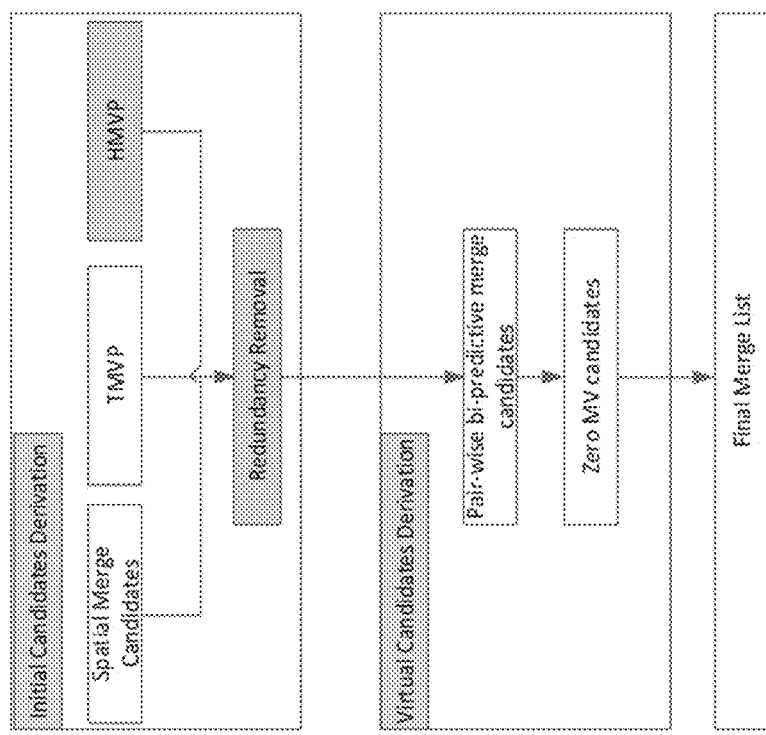
FIG. 13 shows an example of a Modified merge list construction process.

The construction of the regular merge list (for translational motion) can be summarized according to the following sequence of steps:

Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 13 depicts a modified merge candidate list construction process (identified by bold, italicized text). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signalled, the merge candidate list construction process is terminated.

It is noted that all the spatial/temporal/HMVP candidate shall be coded with non-IBC mode. Otherwise, it is not allowed to be added to the regular merge candidate list. HMVP table contains up to 5 regular motion candidates and each of them is unique.

2.2.3.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (i.e., five pruning) for the spatial merge candidates is utilized.

2.2.4 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

Figure 14:
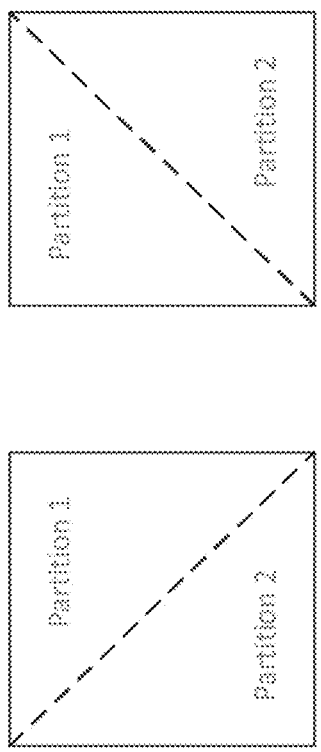
FIG. 14 shows an example of triangle partition based inter prediction.

When this mode is used, a CU is split evenly into two triangle-shaped partitions, using either the diagonal split or the anti-diagonal split, as depicted in FIG. 14. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.4.1 Merge List Construction Process for TPM

Basically, the regular merge list construction process is applied as proposed. However, some modifications are added.

Specifically, the followings are applied:
1) How to do the pruning process is dependent on the usage of TPM for current block
   If the current block is not coded with TPM, the HEVC 5 pruning applied to spatial merge candidates is invoked
   Otherwise (if the current block is coded with TPM), full pruning is applied when adding a new spatial merge candidates. That is, B1 is compared to A1; B0 is compared to A1 and B1; A0 is compared to A1, B1, and B0; B2 is compared to A1, B1, A0, and B0.
2) The condition on whether to check of motion information from B2 is dependent on the usage of TPM for current block
   If the current block is not coded with TPM, B2 is accessed and checked only when there are less than 4 spatial merge candidates before checking B2.
   Otherwise (if the current block is coded with TPM), B2 is always accessed and checked regardless how many available spatial merge candidates before adding B2.

2.2.4.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The $2^{nd}$ weighting factor group is used when any one of the following condition is true:

the reference pictures of the two triangular prediction units are different from each other absolute value of the difference of two motion vectors' horizontal values is larger than 16 pixels.

absolute value of the difference of two motion vectors' vertical values is larger than 16 pixels.

Figure 15:
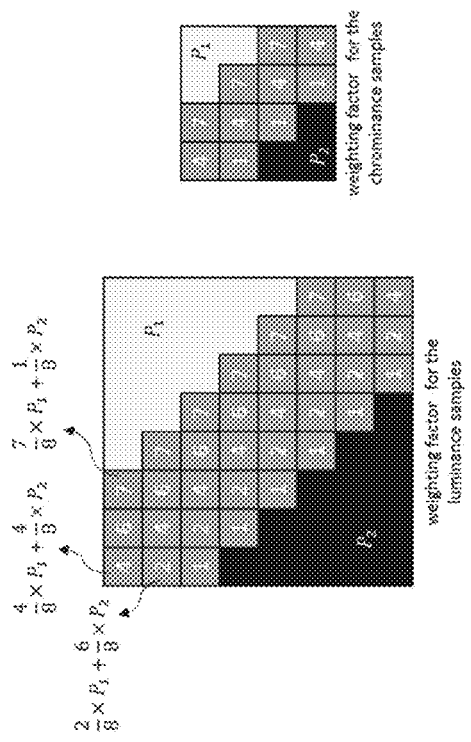
FIG. 15 shows an example of a coding unit (CU) applying the 1st weighting factor group.

Otherwise, the $1^{st}$ weighting factor group is used. An example is shown in FIG. 15.

2.2.4.3 Motion Vector Storage

Figures 16, 17:
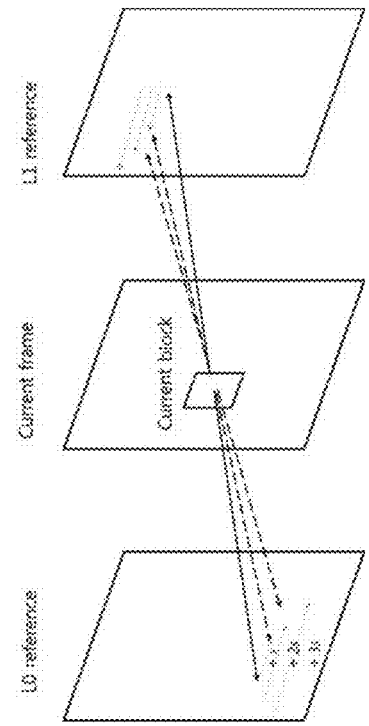
FIG. 16 shows an example of motion vector storage.
FIG. 17 shows an example of an ultimate motion vector expression (UMVE) search process.

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.

2) In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.2.4.4 Syntax Tables, Semantics and Decoding Process for Merge Mode 7.3.5.1 General Slice Header Syntax

| slice_header( ) { | Descriptor |
|---|---|
| slice_pic_parameter_set_id | ue(v) |
| if( rect_slice_flag \|\| NumBricksInPic > 1 ) | |
|   slice_address | u(v) |
| if( !rect_slice_flag && !single_brick_per_slice_flag ) | |
|   num_bricks_in_slice_minus1 | ue(v) |
| slice_type | ue(v) |
| ... | |
| *if ( slice_type != I ) {* | |
|   if( sps_temporal_mvp_enabled_flag) | |
|     slicetemporalmvpenabledflag | u(1) |
|     if( slice_type = = B ) | |
|       mvd_l1_zero_flag | u(1) |
|   if( cabac_init_present_flag) | |
|     cabac_init_flag | u(1) |
|   if( slice_temporal_mvp_enabled_flag) { | |
|     if( slice_type = = B ) | |
|       collocated_from_l0_flag | u(1) |
|   } | |
|   if( ( weighted_pred_flag && slice_type = = P ) \|\| | |
|     (weighted_bipred_flag && slice_type = = B )) | |
|     pred_weight_table( ) | |
|   six_minus_max_num_merge_cand | ue(v) |
|   *if( sps_affine_enabled_flag )* | |
|     *five_minus_max_num_subblock_merge_cand* | ue(v) |
|   *if( sps_fpel_mmvd_enabled_flag )* | |
|     *slice_fpel_mmvd_enabled_flag* | u(1) |
| *if( sps_triangle_enabled_flag &&MaxNumMergeCand >=2 )* | |
| | ue(v) |
| *max_num_merge_cand_minus_max_num_triangle_cand* | |
| *} else if ( sps_ibc_enabled_flag )* | |
|   six_minus_max_num_merge_cand | ue(v) |
| slice_qp_delta | se(v) |
| if( pps_slice_chroma_qp_offsets_present_flag) { | |
|   slice_cb_qp_offset | se(v) |
|   slice_cr_qp_offset | se(v) |
| } | |
| ... | |
| byte_alignment( ) | |
| } | |

7.3.7.5 Coding Unit Syntax

| coding_unit( x0, y0, cbWidth, cbHeight, treeType ) { | Descriptor |
|---|---|
| if( slice_type != I \|\| sps_ibc_enabled_flag ) { | |
|   if( treeType != DUAL TREE CHROMA && | |
|     !( cbWidth = = 4 && cbHeight = = 4 && !sps_ibc_enabled_flag )) | |
|     cu_skip_flag[ x0 ][ y0 ] | ae(v) |
|   if( cu_skip_flag[ x0 ][ y0 ] = = 0 && slice_type != 1 | |
|     && !( cbWidth = = 4 && cbHeight = = 4 )) | |
|     pred_mode_flag | ae(v) |
|   if( (( slice_type = = I && cu_skip_flag[ x0 ][ y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0)))) | |
| &&  | |
|     sps_ibc_enabled_flag && ( cbWidth != 128 \|\| cbHeight != 128 )) | |
|     pred_mode_ibc_flag | ae(v) |
| } | |
| if( CuPredMode[ x0 ][ y0 ] = = MODE_INTRA ) { | |
| ... | |
| } | |
| } else if( treeType != DUAL_TREE_CHROMA ) { /* MODE_INTER or MODE_IBC */ | |
|   if( cu_skip_flag[ x0 ][ y0 ] = = 0 ) | |
|     general_merge_flag[ x0 ][ y0 ] | ae(v) |
|   if( general_merge_flag[ x0 ][ y0 ] ) { | |
|     merge_data( x0, y0, cbWidth, cbHeight) | |
|   *} else if ( CuPredMode[ x0 ][ y0 ] = = MODE_IBC ) {* | |
|     *mvd_coding( x0, y0, 0, 0 )* | |

| coding_unit( x0, y0, cbWidth, cbHeight, treeType ) { | Descriptor |
|---|---|
|     *mvp_l0_flag[ x0 ][ y0 ]* | ae(v) |
|     *if( sps_amvr_enabled_flag &&* | |
|       *( MvdL0[ x0 ][ y0 ][ 0 ] != 0 \| MvdL0[ x0 ][ y0 ][ 1 ] != 0 ) ) {* | |
|       *amvr_precision_flag[ x0 ][ y0 ]* | ae(v) |
|     *}* | |
|     } else { | |
|     if( slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( sps_smvd_enabled_flag && inter_pred_idc[ x0 ][ y0 ] = = PRED_BI && | |
|       !inter_affine_flag[ x0 ][ y0 ] && RefIdxSymL0 > -1 && RefIdxSymL1 > -1) | |
|       sym_mvd_flag[ x0 ][ y0 ] | ae(v) |
|     . . . | |
|     } | |
| } | |

7.3.7.7 Merge Data Syntax

| merge_data( x0, y0, cbWidth, cbHeight) { | Descriptor |
|---|---|
|   *if ( CuPredMode[ x0 ][ y0 ]if ( CuPredMode[ x0 ][ y0 ]* | |
|     *if( MaxNumMergeCand > 1 )* | |
|       *merge_idx[ x0 ][ y0 ]* | ae(v) |
|   } else { | |
|     if( sps_mmvd_enabled_flag \|\| cbWidth * cbHeight != 32 ) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && | |
|             ( cbWidth * cbHeight) >= 64 && cbWidth < 128 && cbHeight < 128 ) { | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

7.4.6.1 General Slice Header Semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

MaxNumMergeCand=6−six_minus_max_num_merge_cand (7-57)

The value of MaxNumMergeCand shall be in the range of 1 to 6, inclusive.

five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

MaxNumSubblockMergeCand=5−five_minus_max_num_subblock_merge_cand (7-58)

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode.

pred_mode_flag equal to 1 specifies that the current coding unit is coded in intra prediction mode.

When pred_mode_flag is not present, it is inferred as follows:
- If cbWidth is equal to 4 and cbHeight is equal to 4, pred_mode_flag is inferred to be equal to 1.
- Otherwise, pred_mode_flag is inferred to be equal to 1 when decoding an I slice, and equal to 0 when decoding a P or B slice, respectively.

The variable CuPredMode[x][y] is derived as follows for x=x0 . . . x0+cbWidth−1 and y=y0 . . . y0+cbHeight−1:
- If pred_mode_flag is equal to 0, CuPredMode[x][y] is set equal to MODE_INTER.
- Otherwise (pred_mode_flag is equal to 1), CuPredMode[x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:
- If cu_skip_flag[x0][y0] is equal to 1, and cbWidth is equal to 4, and cbHeight is equal to 4, pred_mode_ibc_flag is inferred to be equal 1.
- Otherwise, if both cbWidth and cbHeight are equal to 128, pred_mode_ibc_flag is inferred to be equal to 0.
- Otherwise, pred_mode_ibc_flag is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:
- If cu_skip_flag[x0][y0] is equal to 1, general_merge_flag[x0][y0] is inferred to be equal to 1.
- Otherwise, general_merge_flag[x0][y0] is inferred to be equal to 0.

mvp_l0_flag[x0][y0] specifies the motion vector predictor index of list 0 where x0, y0 specify the location (x0, y0) of the top-left luma sample of the considered coding block relative to the top-left luma sample of the picture.

When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

TABLE 7-10

Name association to inter prediction mode

| inter_pred_idc | Name of inter_pred_idc | | |
|---|---|---|---|
| | ( cbWidth + cbHeight) > 12 | ( cbWidth + cbHeight) = = 12 | ( cbWidth + cbHeight) = = 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[x0][y0] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:
- If all the following conditions are true, regular_merge_flag[x0][y0] is inferred to be equal to 1:
  - sps_mmvd_enabled_flag is equal to 0.
  - general_merge_flag[x][y0] is equal to 1.
  - cbWidth*cbHeight is equal to 32.
- Otherwise, regular_merge_flag[x0][y0] is inferred to be equal to 0.

mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:
- If all the following conditions are true, mmvd_merge_flag[x][y0] is inferred to be equal to 1:
  - sps_mmvd_enabled_flag is equal to 1.
  - general_merge_flag[x][y0] is equal to 1.
  - cbWidth*cbHeight is equal to 32.
  - regular_merge_flag[x][y0] is equal to 0.
- Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| | MmvdDistance[ x0 ][ y0 ] | |
|---|---|---|
| mmvd_distance _idx[ x0 ][ y0 ] | slice_fpel_mmvd_ enabled_flag == 0 | slice_fpel_mmvd_ enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

Both components of of the merge plus MVD offset MmvdOffset[x0][y0] are derived as follows:

$$MmvdOffset[x0][y0][0](MmvdDistance[x0][y0]<<2)*MmvdSign[x0][y0][0] \quad (7\text{-}124)$$

$$MmvdOffset[x0][y0][1]=(MmvdDistance[x0][y0]<<2)*MmvdSign[x0][y0][1] \quad (7\text{-}125)$$

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:

If all the following conditions are true, MergeTriangleFlag[x0][y0] is set equal to 1:
  sps_triangle_enabled_flag is equal to 1.
  slice_type is equal to B.
  general_merge_flag[x0][y0] is equal to 1.
  MaxNumTriangleMergeCand is greater than or equal to 2.
  cbWidth*cbHeight is greater than or equal to 64.
  regular_merge_flag[x0][y0] is equal to 0.
  mmvd_merge_flag[x0][y0] is equal to 0.
  merge_subblock_flag[x0][y0] is equal to 0.
  ciip_flag[x0][y0] is equal to 0.

Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
  If mmvd_merge_flag[x0][y0] is equal to 1, merge_idx[x0][y0] is inferred to be equal to mmvd_cand_flag[x0][y0].
  Otherwise (mmvd_merge_flag[x0][y0] is equal to 0), merge_idx[x0][y0] is inferred to be equal to 0.

2.2.4.4.1 Decoding Process

The decoding process as provided is defined as follows:
8.5.2.2 Derivation Process for Luma Motion Vectors for Merge Mode This process is only invoked when general_merge_flag[xCb][yCb] is equal to 1, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL0[0][0] and mvL1[0][0],
- the reference indices refIdxL0 and refIdxL1,
- the prediction list utilization flags predFlagL0[0][0] and predFlagL1[0][0],
- the bi-prediction weight index bcwIdx.
- the merging candidate list mergeCandList.

The bi-prediction weight index bcwIdx is set equal to 0.

The motion vectors mvL0[0][0] and mvL1[0][0], the reference indices refIdxL0 and refIdxL1 and the prediction utilization flags predFlagL0[0][0] and predFlagL1[0][0] are derived by the following ordered steps:

1. The derivation process for spatial merging candidates from neighbouring coding units as specified in clause 8.5.2.3 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices bcwIdx$A_0$, bcwIdx$A_1$, bcwIdx$B_0$, bcwIdx$B_1$, bcwIdx$B_2$.

2. The reference indices, refIdxLXCol, with X being 0 or 1, and the bi-prediction weight index bcwIdxCol for the temporal merging candidate Col are set equal to 0.

3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol=availableFlagL0Col (8-263)

predFlagL0Col=availableFlagL0Col (8-264)

predFlagL1Col=0 (8-265)

4. When slice_type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

availableFlagCol=availableFlagL0Col||availableFlagL1Col (8-266)

predFlagL1Col=availableFlagL1Col (8-267)

5. The merging candidate list, mergeCandList, is constructed as follows:

i=0 if(availableFlag$A_1$)

mergeCandList[i++]=$A_1$ if(availableFlag$B_1$)

mergeCandList[i++]=$B_1$ if(availableFlag$B_0$)

mergeCandList[i++]=$B_0$ if(availableFlag$A_0$)

mergeCandList[i++]=$A_0$ if(availableFlag$B_2$)

mergeCandList[i++]=$B_2$ if(availableFlagCol)

mergeCandList[i++]=Col (8-268)

6. The variable numCurrMergeCand and numOrigMergeCand are set equal to the number of merging candidates in the mergeCandList.

7. When numCurrMergeCand is less than (MaxNumMergeCand −1) and NumHmvpCand is greater than 0, the following applies:
   The derivation process of history-based merging candidates as specified in 8.5.2.6 is invoked with mergeCandList and numCurrMergeCand as inputs, and modified mergeCandList and numCurrMergeCand as outputs.
   numOrigMergeCand is set equal to numCurrMergeCand.

8. When numCurrMergeCand is less than MaxNumMergeCand and greater than 1, the following applies:
   The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.
   numOrigMergeCand is set equal to numCurrMergeCand.

9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index bcwIdx of every new candidate zeroCand$_m$ being added into mergeCandList is set equal to 0. The number of candidates being added, numZeroMergeCand, is set equal to (numCurrMergeCand − numOrigMergeCand). When numZeroMergeCand is greater than 0, m ranges from 0 to numZeroMergeCand −1, inclusive.

10. The following assignments are made with N being the candidate at position merge_idx[xCb][yCb] in the merging candidate list mergeCandList (N=mergeCandList[merge_idx[xCb][yCb]]) and X being replaced by 0 or 1:

refIdxLX=refIdxLXN    (8-269)

predFlagLX[0][0]=predFlagLXN    (8-270)

mvLX[0][0][0]=mvLXN[0]    (8-271)

mvLX[0][0][1]=mvLXN[1]    (8-272)

bcwIdx=bcwIdxN    (8-273)

11. When mmvd_merge_flag[xCb][yCb] is equal to 1, the following applies:
The derivation process for merge motion vector difference as specified in 8.5.2.7 is invoked with the luma location (xCb, yCb), the reference indices refIdxL0, refIdxL1 and the prediction list utilization flags predFlagL0[0][0] and predFlagL1[0][0] as inputs, and the motion vector differences mMvdL0 and mMvdL1 as outputs.
The motion vector difference mMvdLX is added to the merge motion vectors mvLX for X being 0 and 1 as follows:

mvLX[0][0][0]+=mMvdLX[0]    (8-274)

mvLX[0][0][1]+=mMvdLX[1]    (8-275)

mvLX[0][0][0]=Clip3(−2$^{17}$,2$^{17}$−1,mvLX[0][0][0])    (8-276)

mvLX[0][0][1]=Clip3(−2$^{17}$,2$^{17}$−1,mvLX[0][0][1])    (8-277)

2.2.5 MMVD

Ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 18:
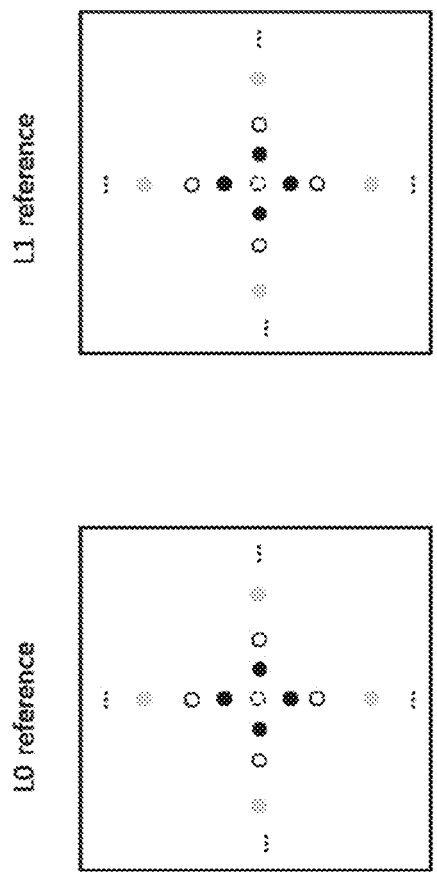
FIG. 18 shows an example of a UMVE search point.

FIG. 17 shows an example of UMVE Search Process.
FIG. 18 shows an example of UMVE Search Point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 4

| Base candidate IDX | | | | |
|---|---|---|---|---|
| Base candidate IDX | 0 | 1 | 2 | 3 |
| N$^{th}$ MVP | 1$^{st}$ MVP | 2$^{nd}$ MVP | 3$^{rd}$ MVP | 4$^{th}$ MVP |

If the number of base candidate is equal to 1, Base candidate IDX is not signalled.

Distance index is motion magnitude information. Distance index indicates the pre-defined distance from the starting point information. Pre-defined distance is as follows:

TABLE 5

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 6

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signalled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.6 Combined Intra-Inter Prediction (CIIP)

Multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signalled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighbouring blocks (A1 and B1).

2.2.7 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
 a. ATMVP candidate (maybe available or unavailable);
 b. Affine merge lists (including Inherited Affine candidates; and Constructed Affine candidates)
 c. Padding as zero MV 4-parameter affine model 2.2.7.1.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections 2.2.7.1.1.1 and 2.2.7.1.1.2, respectively.

2.2.7.1.1.1 Derivation of Initialized Motion Vector

Denote the initialized motion vector by tempMv. When block A1 is available and non-intra coded (i.e., coded with inter or IBC mode), the following is applied to derive the initialized motion vector.

If all of the following conditions are true, tempMv is set equal to the motion vector of block A1 from list 1, denoted by mvL1$A_1$:
 Reference picture index of list 1 is available (not equal to −1), and it has the same POC value as the collocated picture (i.e., DiffPicOrderCnt(ColPic, RefPicList[1][refIdxL1$A_1$]) is equal to 0),
 All reference pictures are with no larger POC compared to the current picture (i.e., DiffPicOrderCnt(aPic, currPic) is less than or equal to 0 for every picture aPic in every reference picture list of the current slice),
 Current slice is equal to B slice,
 collocated_from_l0_flag is equal to 0.

Otherwise if all of the following conditions are true, tempMv is set equal to the motion vector of block A1 from list 0, denoted by mvL0$A_1$:
 Reference picture index of list 0 is available (not equal to −1),
 it has the same POC value as the collocated picture (i.e., DiffPicOrderCnt(ColPic, RefPicList[0][refIdxL0$A_1$]) is equal to 0).

Otherwise, zero motion vector is used as the initialized MV.

A corresponding block (with center position of current block plus the rounded MV, clipped to be in certain ranges in necessary) is identified in the collocated picture signalled at the slice header with the initialized motion vector.

If the block is inter-coded, then go to the $2^{nd}$ step. Otherwise, the ATMVP candidate is set to be NOT available.

2.2.7.1.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate could be found.

If the block in the collocated picture identified by the initialized MV and location of current sub-CU is intra or IBC coded, or no motion candidate could be found as described above, the following further apply:

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

The related decoding process for collocated motion vectors derivation process is described as follows, with the parts related to ATMVP identified by bold, italicized text:

8.5.2.12 Derivation Process for Collocated Motion Vectors

Inputs to this process are:
 a variable currCb specifying the current coding block,
 a variable colCb specifying the collocated coding block inside the collocated picture specified by ColPic,
 a luma location (xColCb, yColCb) specifying the top-left sample of the collocated luma coding block specified by colCb relative to the top-left luma sample of the collocated picture specified by ColPic,
 a reference index refIdxLX, with X being 0 or 1,
 a flag indicating a subblock temporal merging candidate sbFlag.

Outputs of this process are:
 the motion vector prediction mvLXCol in 1/16 fractional-sample accuracy,
 the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1 Col[x][y] and refIdxL1 Col[x][y] are set equal to PredFlagL1[x][y], MvDmvrL1[x][y] and RefIdxL1[x][y], respectively, of the collocated picture specified by ColPic.

The variables mvLXCol and availableFlagLXCol are derived as follows:
 If colCb is coded in an intra or IBC prediction mode, both components of mvLXCol are set equal to 0 and availableFlagLXCol is set equal to 0.
 Otherwise, the motion vector mvCol, the reference index refIdxCol and the reference list identifier listCol are derived as follows:

If sbFlag is equal to 0, availableFlagLXCol is set to 1 and the following applies:
   If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
   Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.
   Otherwise (predFlagL0Col[xColCb][yColCb] is equal to 1 and predFlagL1Col[xColCb][yColCb] is equal to 1), the following assignments are made:
      If NoBackwardPredFlag is equal to 1, mvCol, refIdxCol and listCol are set equal to mvLXCol[xColCb][yColCb], refIdxLXCol[xColCb][yColCb] and LX, respectively.
      Otherwise, mvCol, refIdxCol and listCol are set equal to mvLNCol[xColCb][yColCb], refIdxLNCol[xColCb][yColCb] and LN, respectively, with N being the value of collocated_from_l0_flag.
Otherwise (sbFlag is equal to 1), the following applies:
   If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.
   Otherwise (PredFlagLXCol[xColCb][yColCb] is equal to 0), the following applies:
      If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.
      Both the components of mvLXCol are set to 0 and availableFlagLXCol is set equal to 0.
When availableFlagLXCol is equal to TRUE, mvLXCol and availableFlagLXCol are derived as follows:
   If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.
   Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

$$colPocDiff=DiffPicOrderCnt(ColPic,refPicList[listCol][refIdxCol]) \quad (8\text{-}402)$$

$$currPocDiff=DiffPicOrderCnt(currPic,RefPicList[X][refIdxLX]) \quad (8\text{-}403)$$

The temporal motion buffer compression process for collocated motion vectors as specified in clause 8.5.2.15 is invoked with mvCol as input, and the modified mvCol as output.
If RefPicList[X][refIdxLX] is a long-term reference picture, or colPocDiff is equal to currPocDiff, mvLXCol is derived as follows:

$$mvLXCol=mvCol \quad (8\text{-}404)$$

Otherwise, mvLXCol is derived as a scaled version of the motion vector mvCol as follows:

$$tx=(16384+(Abs(td)>>1))/td \quad (8\text{-}405)$$

$$distScaleFactor=Clip3(-4096,4095,(tb*tx+32)>>6) \quad (8\text{-}406)$$

$$mvLXCol=Clip3(-131072,131071, (distScaleFactor*mvCol+128- (distScaleFactor*mvCol>=0))>>8)) \quad (8\text{-}407)$$

where td and tb are derived as follows:

$$td=Clip3(-128,127,colPocDiff) \quad (8\text{-}408)$$

$$tb=Clip3(-128,127,currPocDiff) \quad (8\text{-}409)$$

2.2.8 Refinement of Motion Information

2.2.8.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 19:
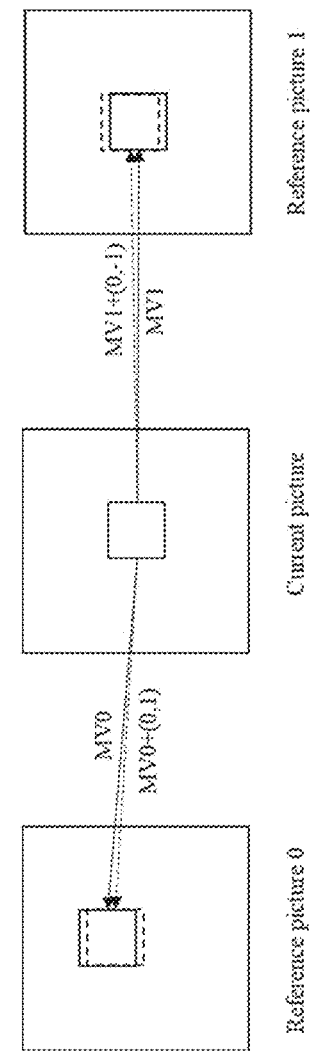
FIG. 19 shows an example of motion vector differences (MVD) (0, 1) mirrored between list 0 and list 1 in decoder-side motion vector refinement (DMVR).

For DMVR in VVC, MVD mirroring between list 0 and list 1 is assumed as shown in FIG. 19 and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 20:
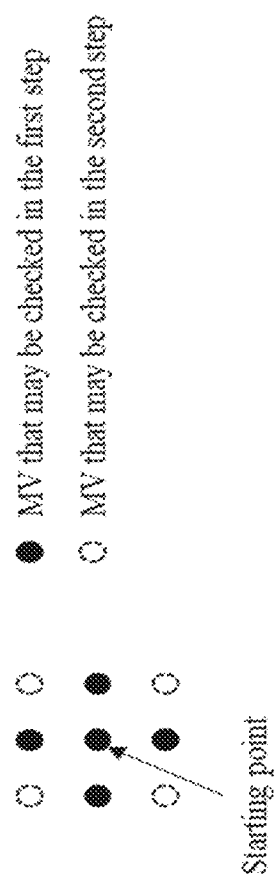
FIG. 20 shows an example of motion vectors (MVs) that may be checked in one iteration.

The motion vector refinement process may iterate twice. In each iteration, at most 6 MVDs (with integer-pel precision) may be checked in two steps, as shown in FIG. 20. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:
   MvdX=−1;
   MvdY=−1;
   If (Sad(1, 0)<Sad(−1, 0))
      MvdX=1;
   If (Sad(0, 1)<Sad(0, −1))
      MvdY=1;

In the first iteration, the starting point is the signalled MV, and in the second iteration, the starting point is the signalled MV plus the selected best MVD in the first iteration. DMVR applies only when one reference picture is a preceding picture and the other reference picture is a following picture, and the two reference pictures are with same picture order count distance from the current picture.

FIG. 19 shows an example of MVD (0, 1) mirrored between list 0 and list 1 in DMVR.

FIG. 20 shows an example of MVs that may be checked in one iteration.

To further simplify the process of DMVR, it proposed several changes to the design in JEM. More specifically, the adopted DMVR design to VTM-4.0 (to be released soon) has the following main features:

- Early termination when (0,0) position SAD between list0 and list1 is smaller than a threshold.
- Early termination when SAD between list0 and list1 is zero for some position.
- Block sizes for DMVR: W*H>=64 && H>=8, wherein W and H are the width and height of the block.
- Split the CU into multiple of 16×16 sub-blocks for DMVR of CU size>16*16. If only width or height of the CU is larger than 16, it is only split in vertical or horizontal direction.
- Reference block size (W+7)*(H+7) (for luma).
- 25 points SAD-based integer-pel search (i.e. (+−) 2 refinement search range, single stage)
- Bilinear-interpolation based DMVR.
- "Parametric error surface equation" based sub-pel refinement. This procedure is performed only when the minimum SAD cost is not equal to zero and the best MVD is (0, 0) in the last MV refinement iteration.
- Luma/chroma MC w/reference block padding (if needed).
- Refined MVs used for MC and TMVPs only.

2.2.8.1.1 Usage of DMVR

When the following conditions are all true, DMVR may be enabled:

- DMVR enabling flag in the SPS (i.e., sps_dmvr_enabled_flag) is equal to 1
- TPM flag, inter-affine flag and subblock merge flag (either ATMVP or affine merge), MMVD flag are all equal to 0
- Merge flag is equal to 1
- Current block is bi-predicted, and POC distance between current picture and reference picture in list 1 is equal to the POC distance between reference picture in list 0 and current picture
- The current CU height is greater than or equal to 8
- Number of luma samples (CU width*height) is greater than or equal to 64

2.2.8.1.2 "Parametric Error Surface Equation" Based Sub-Pel Refinement

The method is summarized below:

1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.3 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 20, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is also known as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

Figure 21:
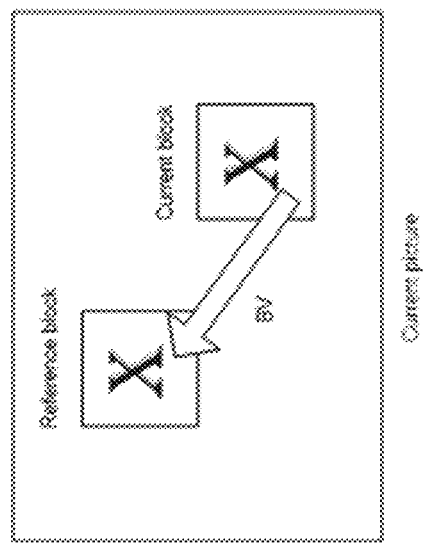
FIG. 21 is an illustration of intra block copy.

FIG. 21 is an illustration of Intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into (N>>1) *(M>>1) sub blocks.
2) Each sub block with a top left sample coordinated at (x, y) fetches the corresponding luma block covering the same top-left sample which is coordinated at (2x, 2y).
3) The encoder checks the block vector(bv) of the fetched luma block. If one of the following conditions is satisfied, the by is considered as invalid.
   a. A by of the corresponding luma block is not existing.
   b. The prediction block identified by a by is not reconstructed yet.
   c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid bv.

2.3.2 Recent Progress for IBC (in VTM5.0)

2.3.2.1 Single BV List

The BV predictors for merge mode and AMVP mode in IBC will share a common predictor list, which consist of the following elements:
  2 spatial neighbouring positions (A1, B1 as in FIG. 2)
  5 HMVP entries
  Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, it also proposed to simplify the pruning operations between HMVP candidates and the existing merge candidates (A1, B1). In the simplification there will be up to 2 pruning operations since it only compares the first HMVP candidate with spatial merge candidate(s).

2.3.2.2 Size Restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.3.2.3 Shared Merge List for IBC

To reduce the decoder complexity and support parallel encoding, it proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
  If the block has luma samples no larger than 32, and split to 2 4×4 child blocks, sharing merge lists between very small blocks (e.g. two adjacent 4×4 blocks) is used.
  If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

2.4 Merge Estimation Region

The merge estimation region (MER) was introduced in HEVC/H.265 to allow independent derivation of merge candidate list for the coding units in the same MER. A candidate block that is in the same MER with the current coding unit is not included in the merge candidate list. The availability of a spatial merge candidate is set as false if xPb<<Log2ParMrgLevel is equal to xNbA1>>Log2ParMrgLevel and yPb>>Log2ParMrgLevel is equal to yNbA1>>Log2ParMrgLevel. Wherein Log2ParMrgLevel is equal to 2+log2_parallel_merge_level_minus2, xPb and yPb are the coordinates of the current block, xNbA1 and yNbA1 are the coordinates of the spatial neighbouring block. The MER size is adaptive and signalled as log2_parallel_merge_level_minus2 in the picture parameter set.

Figure 22:
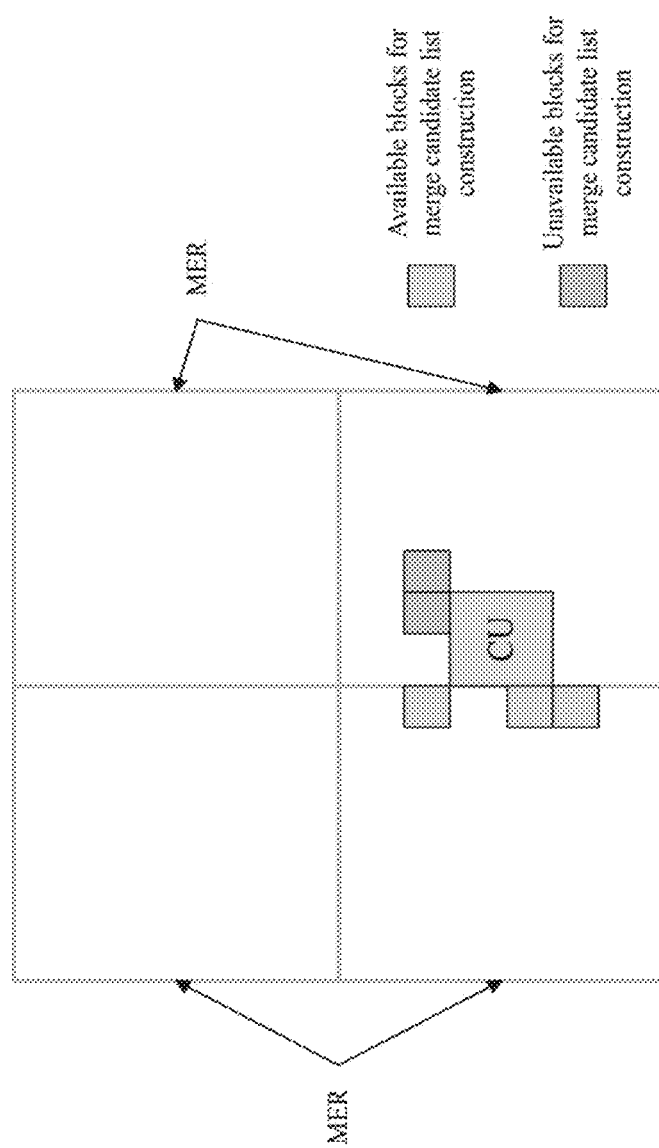
FIG. 22 is an illustration of MER.

An example of MER is shown in FIG. 22. As denoted in FIG. 22, the darker grey blocks that are in the same MER (MER 3) with the current coding unit are not included in the merge candidate list, while the lighter grey blocks in a different MER (MER 2) may be included in the merge candidate list.

FIG. 22 is an illustration of MER.

3 Examples of Technical Problems Solved by the Solutions and Embodiments Described Herein The current design of IBC blocks under MER has the following problems:
1. The merge candidate list construction process of general merge or affine merge is defined well under MER. However, the block vector (BV) merge list construction process of IBC blocks is undefined. Thus, MER cannot be utilized when IBC is enabled.
2. In current design, when a neighbouring block is within the MER, it is marked as unavailable. Therefore, it could happen that for some CUs, all spatial neighbouring blocks are not available. How to better handle this case needs to be further studied.

4 a Listing of Example Embodiments and Techniques

In this document, intra block copy (IBC) may not be limited to the current IBC technology, but may be interpreted as the technology that reference (or prediction) block is obtained with samples in the current slice/tile/subpicture/picture/other video unit (e.g., CTU row) excluding the conventional intra prediction methods. To solve the problem mentioned above, BV list construction process of IBC blocks under MER is proposed.

The listing of items below should be considered as examples to explain general concepts. These items should not be interpreted in a narrow way. Furthermore, these items can be combined in any manner.

"Under a MER" may be interpreted as "inside a MER", or "overlapped with a MER", or "the size of the current coding block is no larger than the size of a MER".

Figure 23:
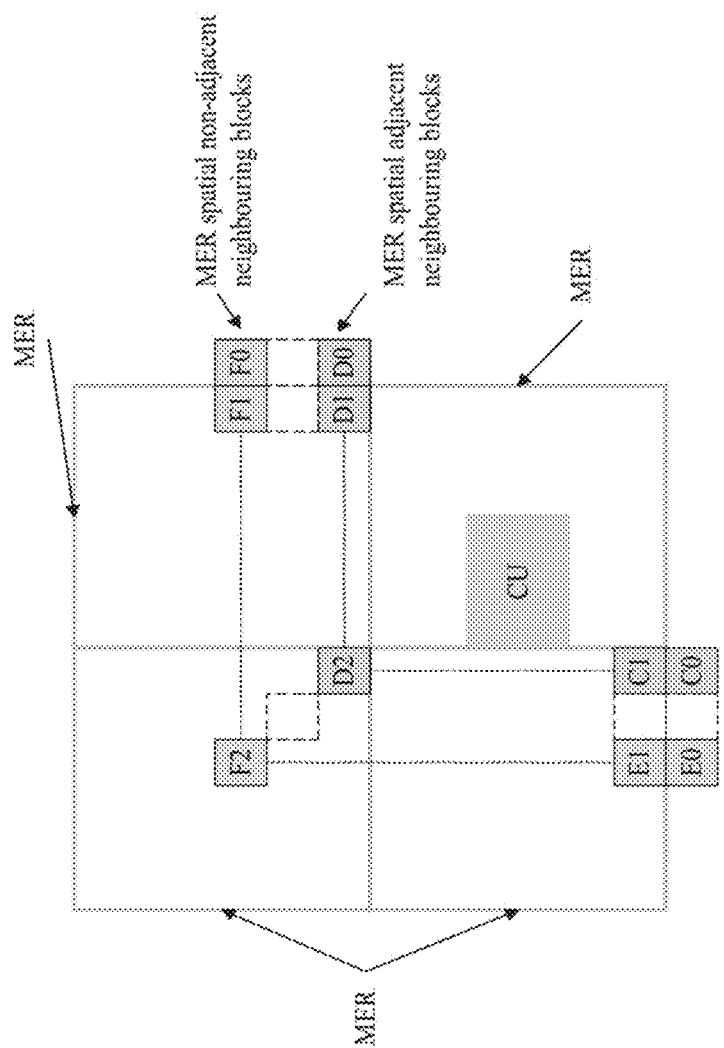
FIG. 23 is an illustration of MER spatial neighbouring blocks.

FIG. 23 is an illustration of MER spatial neighbouring blocks.

MER spatial neighbouring blocks are defined to be those outside the current MER. In addition, two concepts, MER spatial adjacent neighbouring blocks and MER spatial non-adjacent neighbouring blocks are introduced. MER spatial adjacent neighbouring blocks for a MER are those located spatially adjacent to the MER region while MER spatial non-adjacent neighbouring blocks for a MER are those located spatially non-adjacent to the MER region. For both cases, they shall be outside the current MER. Examples of the MER spatial adjacent neighbouring blocks (e.g., C0, C1, D0, D1, and D2) and MER spatial non-adjacent neighbouring blocks (e.g., E0, E1, F0, F1, and F2) are depicted in FIG. 23, for the bottom-right MER.

BV List Construction Process of IBC Blocks
1. When constructing the BV list for an IBC coded block, BV candidates from the spatial neighbouring (adjacent or/and non-adjacent) blocks that are under the MER covering the current block, cannot be used.
    a. It is proposed that when constructing the BV list for an IBC coded block, only BV candidates from the spatial neighbouring (adjacent or/and non-adjacent) blocks that are outside the MER covering the current block, or/and BV candidates from the IBC HMVP table, or/and default BV candidates may be used.
    b. In one example, the BV candidates from the IBC HMVP table may be added to the BV list.
        i. Alternatively, furthermore, the BV candidates from the spatial neighbouring blocks may not be inserted into the BV list.
        ii. In one example, the BV candidates from the IBC HMVP tables may be added to the BV list in a predefined order or/and no pruning is performed when adding such BV candidates.
            1) In one example, the order is based on the ascending order of entry index to the tables.
            2) In one example, the order is based on the descending order of entry index to the tables.
            3) In one example, the first N entries in the table may be skipped.
            4) In one example, the last N entries in the table may be skipped.
            5) In one example, an entry with invalid BV(s) may be skipped.
        iii. Alternatively, furthermore, BV candidates from the IBC HMVP candidates may be modified before being inserted into the BV list.
            1) For example, an offset may be added to the horizontal component or/and vertical component of a BV candidate from the IBC HMVP table.
            2) For example, an HMVP candidate with invalid BV(s) may be modified to a candidate with valid BV(s).
        iv. Alternatively, furthermore, default BV candidates may be added after or before one or multiple HMVP BV candidates.
            1) In one example, the default BV candidate may be defined as (BVx, BVy).
                a. In one example, BVx=0, BVy=0.
                b. In one example, BVx=−W, BVy=−H, wherein W and H are the width and height of the current block.
    c. In one example, the BV list may refer to the IBC AMVP list or/and the IBC merge list.
2. The BV HMVP table (i.e., the HMVP table for IBC coded blocks) may not be updated after decoding a video block (e.g., a CU) under a MER.
3. The BV HMVP table may be updated only once inside a MER.
    a. In one example, BV HMVP table may only be updated if the current CU is not inside a MER, or its right-bottom corner coincides with the right-bottom corner of a MER.

Motion list construction process (e.g., BV list, or normal (non-subblock) merge list, or sub-block merge list
4. It is proposed to utilize the motion information from MER spatial neighbouring blocks (e.g., MER spatial adjacent neighbouring blocks and/or MER spatial non-adjacent neighbouring blocks) may be utilized during the motion list construction process.

When to start checking MER spatial neighbouring blocks or start adding motion candidates from MER spatial neighbouring blocks
    a. In one example, when a neighbouring block (e.g., $A_0$ in FIG. 23) to be checked is unavailable (e.g., within the same MER as the current block), a MER spatial neighbouring block is checked instead.
        i. Alternatively, furthermore, if the motion information of the MER spatial neighbouring block is available, it may be utilized to derive a candidate which may be directly added to the motion list as a replacement of the candidate derived from the spatial block.
  b. In one example, MER spatial neighbouring blocks may be checked after all spatial neighbouring blocks are checked.
    i. Alternatively, furthermore, the motion information from the MER spatial neighbouring blocks may be added after the spatial merge candidates.
  c. In one example, MER spatial neighbouring blocks may be checked after HMVP candidates are checked.
    i. Alternatively, furthermore, the motion information from the MER spatial neighbouring blocks may be added after the HMVP candidates.

How many MER spatial neighbouring blocks to be checked; how many candidates from MER neighbouring blocks
  d. In one example, at most X (X is an integer) candidates from the MER spatial adjacent neighbouring blocks and MER spatial non-adjacent neighbouring blocks may be added to the motion list, e.g., X is equal to 2.

Which MER spatial neighbouring blocks to be checked
  e. In one example, MER spatial neighbouring blocks at fixed positions may be checked and motion information from those fixed positions may be utilized in the motion list construction process.
    i. For two blocks (e.g., CU0 and CU1 in FIG. 24) within the same MER, a same set of allowed MER spatial neighbouring blocks may be defined, and only those blocks in the set may be checked and utilized.
      1) In one example, only one or multiple of the blocks marked as C0, C1, D0, D1, and D2 in FIG. 24 may be checked and utilized.
      2) In one example, only one or multiple of the blocks marked as E0, E1, E0, F1, and F2 in FIG. 24 may be checked and utilized.
      3) In one example, when a neighbouring adjacent block of current block is unavailable, a corresponding MER spatial neighbouring block may be utilized instead by assuming the current block size is equal to the MER size. Denote the top-left position of current block by (x0, y0) relative to the top-left sample of the current picture, the block width by bW, the block height by bH, the MER width by mW, and the MER height by mH (e.g. denoted in FIG. 24), the following may apply:
        a. In one example, if the left block (e.g., A1) located at (x-1, y0+bH-1) is unavailable, the block (e.g., C1) located at ((x>>Log2(mW))<<Log2(mW)-1, (y0>>Log2(mH))<<Log2(mH)+mH-1) may be utilized
        b. In one example, if the below-left block (e.g., A0) located at (xCb-1, yCb+cbHeight) is unavailable, the block (e.g., C0) located at ((x0>>Log2(mW))<<Log2(mW)-1, (y0>>Log2(mH))<<Log2(mH)+mH) may be utilized
        c. In one example, if the above-right block (e.g., B0) located at (x0+bW, y0-1) is unavailable, the block (e.g., D0) located at ((x>>Log2(mW))<<Log2(mW)+mW, (y0>>Log2(mH))<<Log2(mH)-1) may be utilized
        d. In one example, if the above block (e.g., B1) located at ((x0>>Log2(mW))<<Log2(mW)+mW-1, y0-1) is unavailable, the block (e.g., D1) located at (x0+bW-1, (y0>>Log2(mH))<<Log2(mH)-1) may be utilized
        >>e. In one example, if the above-left block (e.g., B2) located at (x0-1, y0-1) is unavailable, the block located at ((x0>>Log2(mW))<<Log2(mW)-1, (y0>>Log2(mH))<<Log2(mH)-1) may be utilized.
  f. In one example, MER spatial neighbouring blocks at adaptive positions may be checked and motion information from those adaptive positions may be utilized in the motion list construction process. In this case, at least for two blocks under the MER, at least one of blocks to be checked is different.
    i. In one example, when a neighbouring adjacent block of current block is unavailable, a corresponding MER spatial neighbouring block may be utilized instead by assuming the current block size is equal to the MER size. Denote the top-left position of current block by (x0, y0) relative to the top-left sample of the current picture, the block width by bW, the block height by bH, the MER width by mW, and the MER height by mH (e.g. denoted in FIG. 25), the following may apply:
      1) In one example, if the left block (e.g., A1) located at (x-1, y0+bH-1) is unavailable, the block (e.g., C1) located at ((x0>>Log2(mW))<<Log2(mW)-1, y0+bH-1) may be utilized
      2) In one example, if the below-left block (e.g., A0) located at (xCb-1, yCb+cbHeight) is unavailable, the block (e.g., C0) located at ((x>>Log2(mW))<<Log2(mW)-1, y0+bH) may be utilized
      3) In one example, if the above-right block (e.g., B0) located at (x0+bW, y0-1) is unavailable, the block (e.g., D0) located at (x0+bW, (y0>>Log2(mH))<<<Log2(mH)-1) may be utilized
      4) In one example, if the above block (e.g., B1) located at (x0+bW-1, y0-1) is unavailable, the block (e.g., D1) located at (x0+bW-1, (y0>>Log2(mH))<<<Log2(mH)-1) may be utilized
      5) In one example, if the above-left block (e.g., B2) located at (x0-1, y0-1) is unavailable, the block located at ((x0>>Log2(mW))<<Log2(mW)-1, (y0>>Log2(mH))<<Log2 (mH)-1) may be utilized.
    ii. For different blocks (e.g., CU0 and CU1 in FIG. 26) within the same MER, different sets of allowed MER spatial neighbouring blocks may be defined, and only those blocks in the set may be checked and utilized.
      1) In one example, only one or multiple of the blocks marked as C0, C1, D0, D1, and D2 in FIG. 26 may be checked and utilized in the motion list construction for CU0.
      2) In one example, only one or multiple of the blocks marked as E0, E1, F0, F1, and F2 in FIG. 26 may be checked and utilized in the motion list construction for CU0.
      3) In one example, only one or multiple of the blocks marked as C'0, C'1, D'0, D'1, and D'2 in FIG. 26 may be checked and utilized in the motion list construction for CU1.

Figure 26:
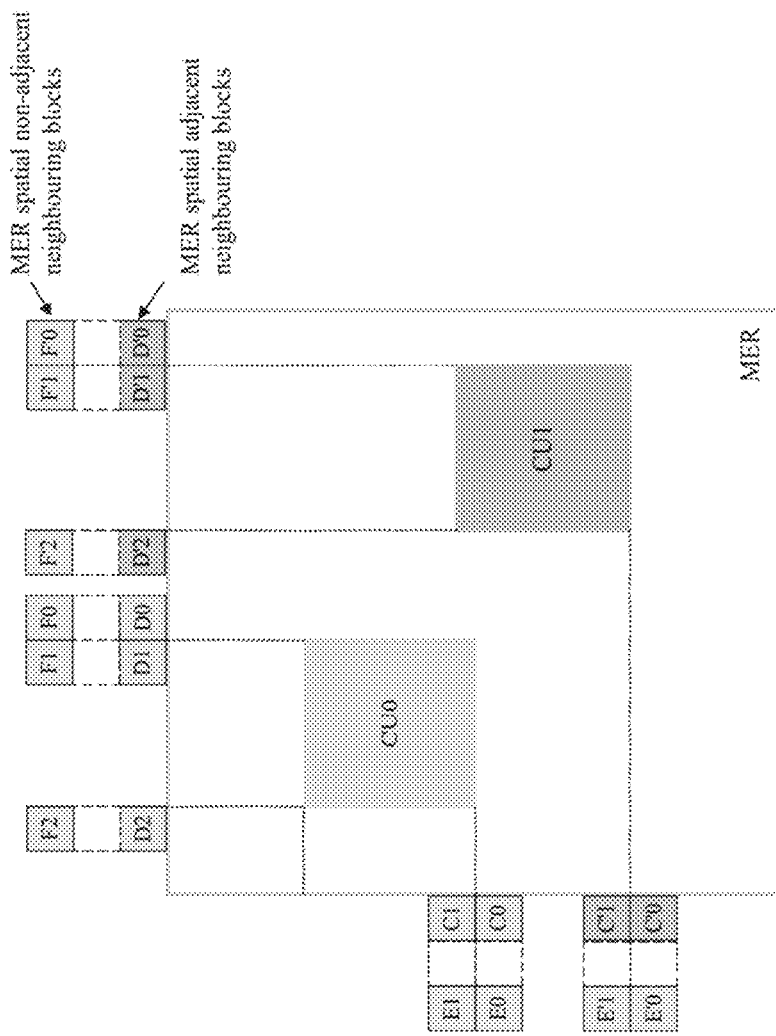
FIG. 26 shows an example of MER spatial neighbouring blocks at adaptive positions for different blocks.

4) In one example, only one or multiple of the blocks marked as E'0, E'1, F'0, F'1, and F'2 in FIG. 26 may be checked and utilized in the motion list construction for CU1.

g. In one example, whether a motion candidate from a MER spatial neighbouring block may be added to the motion list may depend on the position, or/and the availability of the MER spatial neighbouring block.

i. In one example, motion candidates (e.g., IBC candidate, or normal inter candidate, or subblock candidate (e.g., affine)) from at least one of the MER spatial adjacent or/and non-adjacent neighbouring blocks (e.g., below-left, left, above-right, above-left and above neighbouring blocks in FIG. 22) outside the MER may be used during the motion list construction process.

1) In one example, motion candidates locating at the certain positions may be added to the motion list.

a. In one example, the 'certain positions' may be C1, D1 (or E1, F1).
b. In one example, the 'certain positions' may be D1, C1 (or F1, E1).
c. In one example, the 'certain positions' may be C1, D1, D2 (or E1, F1, F2).
d. In one example, the 'certain positions' may be D1, D2 (or F1, F2).
e. In one example, the 'certain positions' may be C1, D2 (or E1, F2).

2) In one example, candidates from the spatial neighbouring blocks may be inserted into the motion list following a predefined order.

a. In one example, the 'predefined order' may be C1, C0, D0, D1, and D2 (or E1, E0, F0, F1, and F2).
b. In one example, the 'predefined order' may be D1, D0, C1, C0, and D2 (or F1, F0, E1, E0, and F2).
c. In one example, the 'predefined order' may be D2, C1, D1, C0, and D0 (or F2, E1, F1, E0, and F0).

3) In one example, BV candidates from at least one of the non-adjacent below-left, left, above-right, above-left and above neighbouring blocks outside the MER may be used during the motion list construction process.

ii. In one example, a block is considered as available only when the block is coded with a certain mode.
1) In one example, the 'certain mode' may refer to the IBC mode.
2) In one example, the 'certain mode' may refer to the normal inter mode (e.g., translational motion-based inter mode).
3) In one example, the 'certain mode' may refer to the affine mode.

iii. In one example, a neighbouring block used in the motion list construction is treated as unavailable if it is outside the MER.

iv. In one example, a candidate from the MER spatial neighbouring block may be added to the motion list with pruning operation.
1) In one example, a candidate may not be added to the motion list when the motion information of the candidate exists in the motion list.
2) In one example, two candidates from the MER spatial neighbouring blocks may be compared to determine whether they are same or similar. The two candidates can be both put into the motion list only when they are not same or similar.

v. Alternatively, the candidates from the MER spatial neighbouring blocks may be added to the motion list without pruning.

5. In one example, the maximum number of candidates for the motion list of a block may depend on whether the block is under a MER or not.

a. In one example, for a first block that is under a MER and a second block that is not under a MER, the maximum numbers of candidates of the motion list for the first block and the second block may be different.

i. In one example, the maximum number of candidates for the motion list of the first block may be less than that of the second block.
ii. In one example, the maximum number of candidates for the motion list of the first block may be greater than that of the second block.
iii. Alternatively, the maximum number of candidates of the motion list may be the same for the first block and the second block.

b. In one example, the maximum number of candidates for the motion list under a MER may be signalled at sequence level/picture level/slice level/tile group level, such as in sequence header/picture header/sequence parameter set (SPS)/video parameter set (VPS)/decoder parameter set (DPS)/picture parameter set (PPS)/adaptation parameter set (APS)/slice header/tile group header.

i. In one example, the maximum number of candidates for the motion list of a block under a MER may be signalled only when MER is enabled for the video/sequence/picture/slice/sub-picture/tile group/tile/CTU row etc.
ii. In one example, the maximum number of candidates for the motion list (e.g., BV list) of a block under a MER (e.g., denoted as maxBvListSizeMer) may be signalled depending on the maximum number of candidates for the motion list of a block that is not under a MER (e.g., denoted as maxBvListSizeNonMer).
1) For example, maxBvListSizeNonMer–maxBvListSizeMer instead of maxBvListSizeMer may be signalled.

Figure 33:
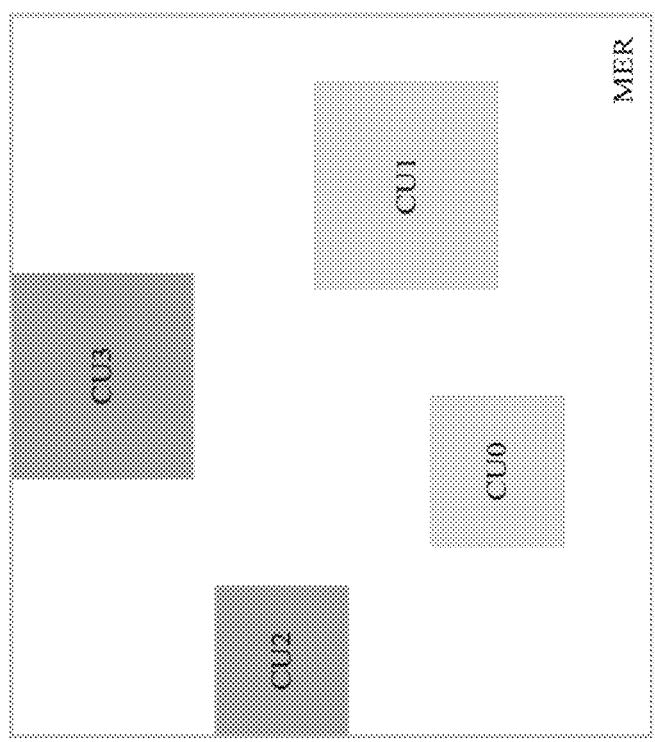
FIG. 33 shows an example of different block positions inside an MER.

6. In one example, the motion list construction process of a block may depend on the block position inside a MER. A block is completely inside a MER when it is inside a MER and neither its left boundary nor above boundary coincides with any boundary of the MER. As shown in FIG. 33, CU0 and CU1 are the blocks completely inside the MER, while CU2 and CU3 are not.

a. In one example, the motion list construction process in bullet 1-5 may be only applied to the blocks completely inside a MER.
i. In one example, at most X (X is an integer) pairwise average candidates may be added to the motion list for blocks completely inside the MER, e.g., X is equal to 2, or 3.

b. In one example, the signalling of merge index for blocks completely inside a MER may be different from blocks which are not inside a MER or not completely inside a MER.
i. In one example, denote the maximum number of merging MVP candidates in VVC by N. The maximum number of merging MVP candidates (M) for blocks completely inside the MER may be different from N.
   1) In one example, M may be less than N, e.g., M=2 but N=5.
   2) In one example, the maximum value of the truncated rice binarization code of a merge index for blocks completely inside a MER may depend on M (e.g. it is equal to M−1).
c. In one example, MMVD process for blocks completely inside a MER may be different from blocks which are not inside a MER or not completely inside a MER.
   i. In one example, the maximum number of MMVD base candidates (T) for blocks completely inside the MER may be larger than 2, e.g. T=3, or 4, or 5.
   ii. In one example, the pre-defined distance in MMVD may be modified for blocks completely inside the MER.
      1) In one example, the modified pre-defined distance may be equal to d*S, where d denotes the original pre-defined distance and S denotes a multiply-scale.
         a. In one example, S may be equal to 2, or 3.
         b. In one example, S may be equal to 1/2, or 1/3.
7. Normative constraints on BT and TT split are proposed to enable MER in VVC. Denote the MER width, MER height, block width and block height by R1, R2, W and H respectively.
   a. In one example, horizontal BT split may be disabled for current block when W>R1 and H<=R2.
   b. In one example, vertical BT split may be disabled for current block when W<=R1 and H>R2.
   c. In one example, horizontal TT split may be disabled for current block when (W>R1∥H>R2) and H<=K*R2.
      i. In one example, K may be an integer, such as K=2.
   d. In one example, vertical TT split may be disabled for current block when (W>R1∥H>R2) and W<=K*RI.
      i. In one example, K may be an integer, such as K=2.
   e. In one example, R1 may be not equal to R2, e.g., R1=32, R2=64, or R1=64, R2=32.
   f. In one example, R1 may be equal to R2, e.g., R1=R2=32, or R1=R2=64.
   g. In one example, if a type of split is disabled, the codeword to represent that type of split may be skipped.
   h. In one example, if a type of split is disabled, the syntax element (such as a flag) to represent that type of split may be skipped.
   i. In one example, whether to and/or how to apply normative constraints on BT and TT split may depend on slice/tile group type, and/or picture type, and/or partition tree type (e.g., dual tree/single tree).
      i. In one example, normative constraints on BT and TT split may be not applied when only intra coding tools are allowed for current picture/subpicture/slice/tile, e.g., current picture is a I frame, or current slice is a I slice.
      ii. In one example, normative constraints on BT and TT split may be applied when inter coding tools are allowed for current picture/subpicture/slice/tile, e.g., current picture is a P/B frame, or current slice is a P/B slice.
   j. In one example, normative constrains on BT and TT split may be applied to blocks in a certain region inside a picture/frame.
      i. The region may refer to a subpicture/slice/tile, or a predefined rectangular region (e.g., region of interest, ROI) in the picture/frame.
      ii. In one example, normative constrains on BT and TT split may not be applied to a block or a part of a block outside a picture/frame. Denote the top-left luma sample of the block, picture/frame width, and picture/height by (x0, y0), picW, and picH.
         1) In one example, a part of block is outside a picture/frame when its top-left corner is inside the picture/frame and the top-right or/and bottom-left corner is outside the picture/frame.
         2) In one example, BT split constraints may be not applied to a block when a part of the block is outside a picture/frame.
            a. In one example, horizontal BT split may be still allowed for a block when y0<=picH and y0+T>picH.
               i. In one example, T may be equal to the block height (T=H).
            b. In one example, vertical BT split may be still allowed for a block when x0<=picW and x0+T>picW.
               i. In one example, T may be equal to the block width (T=W).
         3) In one example, TT split constraints may not be applied to a block when a part of the block is outside a picture/frame.
            a. In one example, horizontal TT split may be still allowed for a block when y0<=picH and y0+T>picH.
               i. In one example, T may be equal to the block height (T=H)
               ii. In one example, T may be equal to b*H, where b=1/2 or 1/4.
            b. In one example, vertical TT split may be still allowed for a block when x0<=picW and x0+T>picW.
               i. In one example, T may be equal to the block width (T=W).
               ii. In one example, T may be equal to b*W, where b=1/2 or 1/4.

Figure 24:
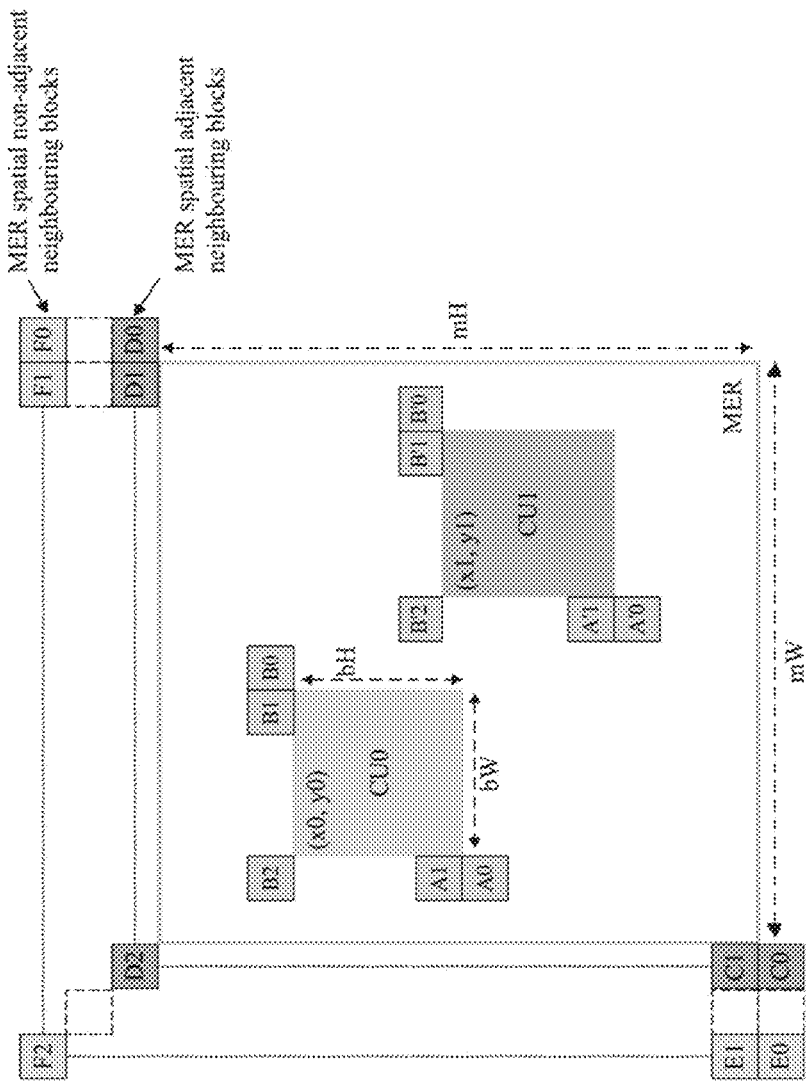
FIG. 24 shows an example of MER spatial neighbouring blocks at fixed positions.
Figure 25:
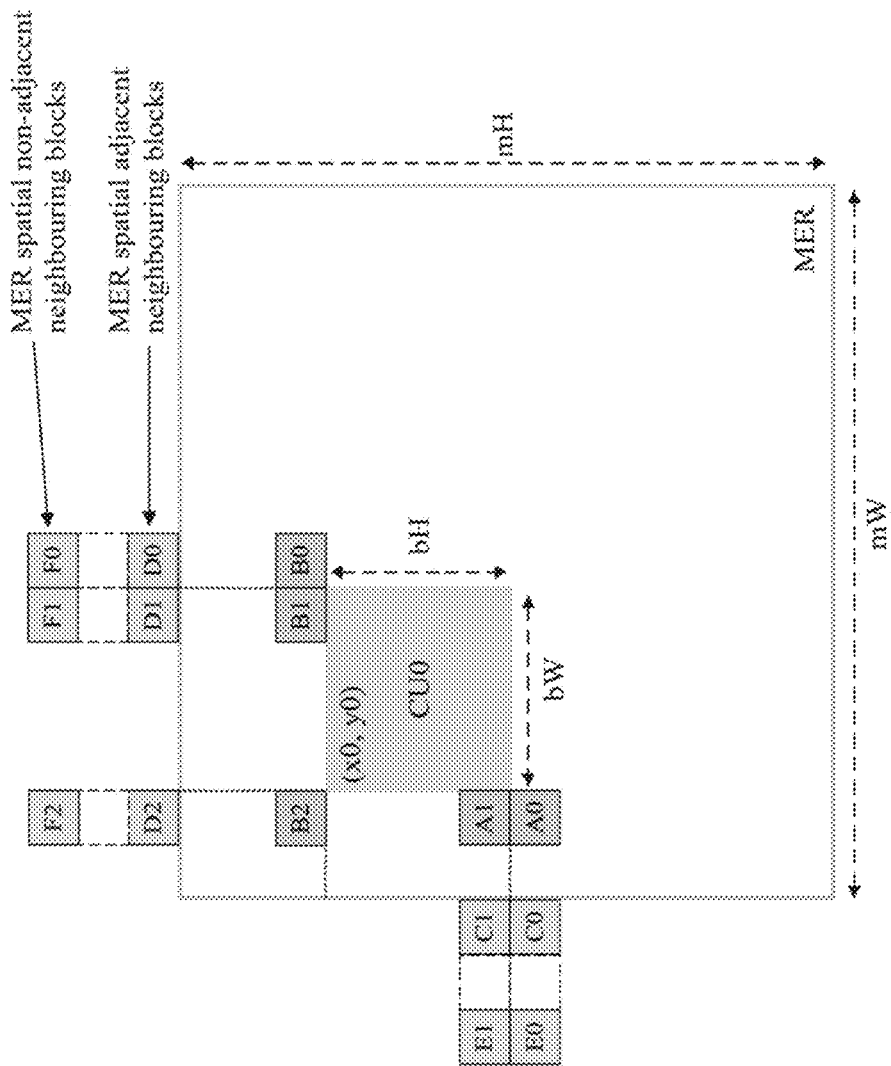
FIG. 25 shows an example of MER spatial neighbouring blocks at adaptive positions for one block.

Usage of the Tools
8. Whether and/or how to apply the above methods may depend on the following information:
   a. A message signalled in the DPS/SPS/VPS/PPS/APS/picture header/slice header/tile group header/Largest coding unit (LCU)/Coding unit (CU)/LCU row/group of LCUs/TU/PU block/Video coding unit
   b. Position of CU/PU/TU/block/Video coding unit
   c. Block dimension of current block and/or its neighbouring blocks
   d. Block shape of current block and/or its neighbouring blocks
   e. coded mode of a block, e.g., IBC or non-IBC inter mode or non-IBC subblock mode
   f. Indication of the colour format (such as 4:2:0, 4:4:4)
   g. Coding tree structure
   h. Slice/tile group type and/or picture type
   i. Colour component (e.g. may be only applied on chroma components or luma component)
   j. Temporal layer ID
   k. Profiles/Levels/Tiers of a standard FIG. 24 shows an example of MER spatial neighbouring blocks at fixed positions.
FIG. 25 shows an example of MER spatial neighbouring blocks at adaptive positions for one block.
FIG. 26 shows an example of MER spatial neighbouring blocks at adaptive positions for different blocks.

5 Embodiments

The changes to the current coding specification for the VVC standard are identified by bold, italicized text. Deleted texts are marked with [[bold text surrounded by double brackets]].

5.1 Embodiment 1

The working draft may be changed as below.
8.6.2 Derivation Process for Block Vector Components for IBC Blocks 8.6.2.1 General

. . .

When IsGt4by4 is equal to TRUE and ((xCb + cbWidth) >> Log2ParMrgLevel is greater than (xCb >> Log2ParMrgLevel) and ((yCb + cbHeight) >> Log2ParMrgLevel is greater than (yCb >> Log2ParMrgLevel), the updating process for the history-based block vector predictor list as specified in clause 8.6.2.6 is invoked with luma block vector bvL.
It is a requirement of bitstream conformance that the luma block vector bvL shall obey the following constraints:

. . .

8.6.2.3 Derivation Process for IBC Spatial Block Vector Candidates

. . .

The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.
When xCb >> Log2ParMrgLevel
  is equal to xNbA$_1$ >> Log2ParMrgLevel and
  yCb >> Log2ParMrgLevel is equal
  to yNbA$_1$ >> Log2ParMrgLevel,
  availableA$_1$ is set equal to FALSE.
The variables availableFlagA$_1$ and bvA$_1$ are derived as follows:

. . .

The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
When xCb >> Log2ParMrgLevel
  is equal to xNbB$_1$ >> Log2ParMrgLevel and
  yCb >> Log2ParMrgLevel is equal
  to yNbB$_1$ >> Log2ParMrgLevel,
  availableB$_1$ is set equal to FALSE.
The variables availableFlagB$_1$ and bvB$_1$ are derived as follows:

. . .

5.2 Embodiment 2

The working draft may be changed as below.
8.6.2 Derivation Process for Block Vector Components for IBC Blocks 8.6.2.1 General

. . .

When IsGt4by4 is equal to TRUE and ((xCb + cbWidth) >> Log2ParMrgLevel is greater than (xCb >> Log2ParMrgLevel) and ((yCb + cbHeight) >> Log2ParMrgLevel is greater than (yCb >> Log2ParMrgLevel), the updating process for the history-based block vector predictor list as specified in clause 8.6.2.6 is invoked with luma block vector bvL.
It is a requirement of bitstream conformance that the luma block vector bvL shall obey the following constraints:

. . .

8.6.2.3 Derivation Process for IBC Spatial Block Vector Candidates

. . .

The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.
*The variable availableA$_{m1}$ is set equal to FALSE.*
When xCb >> Log2ParMrgLevel
  is equal to xNbA$_1$
  >> Log2ParMrgLevel and
  yCb >> Log2ParMrgLevel is equal
  to yNbA$_1$ >> Log2ParMrgLevel,
  the variables availableA$_1$ and
  *availableA$_{m1}$ are derived as follows:*
  availableA$_1$ is set equal to FALSE.
  *The luma location (xNbA$_{m1}$, yNbA$_{m1}$)*
  *inside the neighbouring luma*
  *coding block is set equal to*
  *((xCb >> Log2ParMrgLevel)*
  *>> Log2ParMrgLevel - 1,*
  *(yCb >> Log2ParMrgLevel) << Lo*
  *g2ParMrgLevel +*
  *(1 << Log2ParMrgLevel) - 1).*
  *The derivation process for*
  *neighbouring block availability*
  *as specified in clause 6.4.4 is invoked*
  *with the current luma location*
  *(xCurr, yCurr) set equal to*
  *(xCb, yCb), the neighbouring luma*
  *location (xNbA$_{m1}$, yNbA$_{m1}$),*
  *checkPredModeY set equal to*
  *TRUE, and cIdx set equal to 0 as*
  *inputs, and the output is assigned*
  *to the block availability flag availableA$_{m1}$.*
The variables availableFlagA$_1$ and bvA$_1$ are derived as follows:
  If availableA$_1$ is equal to FALSE and availableA$_{m1}$ is equal to FALSE, availableFlagA$_1$ is set equal to 0 and both components of bvA$_1$ are set equal to 0.

Otherwise, if availableA$_{m1}$ is equal
to TRUE, availableFlagA$_1$ is
set equal to 1 and the following
assignments are made:

bvA$_1$ = MvL0[ xNbA$_{m1}$ ][ yNbA$_{m1}$ ]   (xxxx)

Otherwise, availableFlagA$_1$ is set equal to 1 and the following assignments are made:

bvA$_1$=MvL0[xNbA1][yNbA1]   (1122)

For the derivation of availableFlagB$_1$ and bvB$_1$ the following applies:

The luma location (xNbB$_1$, yNbB$_1$) inside the neighbouring luma coding block is set equal to (xCb+cbWidth−1, yCb−1).

The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.

*The variable availableB$_{m1}$ is set equal to FALSE.*
*When    xCb >> Log2ParMrgLevel*
*is    equal    to    xNbB$_1$*
*>> Log2ParMrgLevel    and*
*yCb >> Log2ParMrgLevel is equal to*
*yNbB$_1$ >> Log2ParMrgLevel,*
*the variables availableB$_1$ and*
*availableB$_{m1}$ are derived as follows:*
*availableB$_1$ is set equal to FALSE.*
*The luma location ( xNbB$_{m1}$, yNbB$_{m1}$ )*
*inside the neighbouring luma*
*coding block is set equal to*
*( ( xCb >> Log2ParMrgLevel )*
*<< Log2ParMrgLevel +*
*( 1 << Log2ParMrgLevel ) - 1, ( yCb*
*>> Log2ParMrgLevel ) <<*
*Log2ParMrgLevel - 1 ).*
*The derivation process for neighbouring*
*block availability as specified*
*in clause 6.4.4 is invoked*
*with the current luma location*
*( xCurr, yCurr ) set equal to*
*( xCb, yCb ), the neighbouring luma*
*location ( xNbN$_{m1}$, yNbB$_{m1}$, yNbB$_{m1}$ ),*
*checkPredModeY set equal to*
*TRUE, and cIdx set equal to 0 as*
*inputs, and the output is assigned to*
*the block availability flag availableB$_{m1}$.*

The variables availableFlagB$_1$ and bvB$_1$ are derived as follows:

If one or more of the following conditions are true, availableFlagB$_1$ is set equal to 0 and both components of bvB$_1$ are set equal to 0:

availableB$_1$ is equal to FALSE and availableB$_{m1}$ is equal to FALSE.

availableA$_1$ is equal to TRUE and availableB$_1$ is equal to TRUE and the luma locations (xNbA$_1$, yNbA$_1$) and (xNbB$_1$, yNbB$_1$) have the same block vectors.

availableA$_1$ is equal to TRUE and availableB$_{m1}$ is equal to TRUE and the luma locations (xNbA$_1$, yNbA$_1$) and (xNbB$_{m1}$, yNbB$_{m1}$) have the same block vectors.

availableA$_{m1}$ is equal to TRUE and availableB$_1$ is equal to TRUE and the luma locations (xNbA$_{m1}$, yNbA$_{m1}$) and (xNbB$_1$, yNbB$_1$) have the same block vectors.

availableA$_{m1}$ is equal to TRUE and availableB$_{m1}$ is equal to TRUE and the luma locations (xNbA$_{m1}$, yNbA$_{m1}$) and (xNbB$_{m1}$, yNbB$_{m1}$) have the same block vectors.

Otherwise, if availableB$_{m1}$ is equal to TRUE, availableFlagB$_1$ is set equal
to 1 and the following assignments are made:

bvB$_1$ = MvL0[ xNbB$_{m1}$ ][ yNbB$_{m1}$ ]   (xxxx)

Otherwise, availableFlagB$_1$ is set equal to 1 and the following assignments are made:

bvB$_1$=MvL0[xNbB$_1$][yNbB$_1$]   (1123)

5.3 Embodiment 3

The working draft may be changed as below.

8.6.2 Derivation Process for Block Vector Components for IBC Blocks

8.6.2.1 General

. . .

When IsGt4by4 is equal to TRUE and ( ( xCb + cbWidth ) >> Log2ParMrgLevel is greater than ( xCb >> Log2ParMrgLevel ) and ( ( yCb + cbHeight ) >> Log2ParMrgLevel is greater than  ( yCb >> Log2ParMrgLevel ), the updating process for the history-based block vector predictor list as specified in clause 8.6.2.6 is invoked with luma block vector bvL.

It is a requirement of bitstream conformance that the luma block vector bvL shall obey the following constraints:

. . .

8.6.2.3 Derivation Process for IBC Spatial Block Vector Candidates

. . .

The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.

*The variable availableA$_{m1}$ is set equal to FALSE.*
*When xCb >> Log2ParMrgLevel  is equal to xNbA$_1$*
*>> Log2ParMrgLevel and*
*yCb >> Log2ParMrgLevel is equal to*
*yNbA$_1$ >> Log2ParMrgLevel,*
*the variables availableA$_1$ and*
*availableA$_{m1}$ are derived as follows:*
*availableA$_1$ is set equal to FALSE.*
*The luma location ( xNbA$_{m1}$, yNbA$_{m1}$ )*
*inside the neighbouring luma*
*coding block is set equal*
*to ( ( xCb >> Log2ParMrgLevel )*
*<< Log2ParMrgLevel - 1,  yCb + cbHeight - 1 ).*
*The derivation process for neighbouring*
*block availability as specified* in clause 6.4.4 is invoked
with the current luma location
( xCurr, yCurr ) set equal to ( xCb, yCb ),
the neighbouring luma
location (xNbA$_{m1}$, yNbA$_{m1}$ ),
checkPredModeY set equal to
TRUE, and cIdx set equal to 0 as
inputs, and the output is assigned
to the block availability flag availableA$_{m1}$.

The variables availableFlagA$_1$ and bvA$_1$ are derived as follows:
- If availableA$_1$ is equal to FALSE and availableA$_{m1}$ is equal to FALSE, availableFlagA$_1$ is set equal to 0 and both components of bvA$_1$ are set equal to 0.
- *Otherwise, if availableA$_{m1}$ is equal to TRUE, availableFlagA$_1$ is set equal to 1 and the following assignments are made:*

*bvA$_1$ = MvL0[ xNbA$_{m1}$ ][ yNbA$_{m1}$ ]   (xxxx)*
- Otherwise, availableFlagA$_1$ is set equal to 1 and the following assignments are made:

bvA$_1$=MvL0[xNbA$_1$][yNbA$_1$]           (1122)

For the derivation of availableFlagB$_1$ and bvB$_1$ the following applies:
- The luma location (xNbB$_1$, yNbB$_1$) inside the neighbouring luma coding block is set equal to (xCb+cbWidth−1, yCb−1).
- The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
- *The variable availableB$_{m1}$ is set equal to FALSE.*
- *When xCb >>Log2ParMrgLevel is equal to xNbB$_1$ >> Log2ParMrgLevel and yCb >> Log2ParMrgLevel is equal to yNbB$_1$ >> Log2ParMrgLevel, the variables availableB$_1$ and availableB$_{m1}$ are derived as follows:*
  - *availableB$_1$ is set equal to FALSE.*
  - *The luma location (xNbB$_{m1}$, yNbB$_{m1}$ ) inside the neighbouring luma coding block is set equal to ( xCb + cbWidth − 1, ( yCb >> Log2ParMrgLevel ) << Log2ParMrgLevel − 1 ).*
  - *The derivation process for neighbouring block availability as specified in clause 6.4.4 is invoked with the current luma location ( xCurr, yCurr ) set equal to ( xCb, yCb ), the neighbouring luma location ( xNbB$_{m1}$, yNbB$_{m1}$ ), checkPredModeY set equal to TRUE, and cIdx set equal to 0 as inputs, and the output is assigned to the block availability flag availableB$_{m1}$.*

The variables availableFlagB$_1$ and bvB$_1$ are derived as follows:
- If one or more of the following conditions are true, availableFlagB$_1$ is set equal to 0 and both components of bvB$_1$ are set equal to 0:
  - availableB$_1$ is equal to FALSE and availableB$_{m1}$ is equal to FALSE.
  - availableA$_1$ is equal to TRUE and availableB$_1$ is equal to TRUE and the luma locations (xNbA$_1$, yNbA$_1$) and (xNbB$_1$, yNbB$_1$) have the same block vectors.
  - *availableA$_1$ is equal to TRUE and availableB$_{m1}$ is equal to TRUE and the luma locations ( xNbA$_1$, yNbA$_1$ ) and ( xNbB$_{m1}$, yNbB$_{m1}$ ) have the same block vectors.*
  - *availableA$_{m1}$ is equal to TRUE and availableB$_1$ is equal to TRUE and the luma locations ( xNbA$_{m1}$, yNbA$_{m1}$ ) and ( xNbB$_1$, yNbB$_1$ ) have the same block vectors.*
  - *availableA$_{m1}$ is equal to TRUE and availableB$_{m1}$ is equal to TRUE and the luma locations ( xNbA$_{m1}$, yNbA$_{m1}$ ) and ( xNbB$_{m1}$, yNbB$_{m1}$ ) have the same block vectors.*
- *Otherwise, if availableB$_{m1}$ is equal to TRUE, availableFlagB$_1$ is set equal to 1 and the following assignments are made:*

*bvB$_1$ = MvL0[ xNbB$_{m1}$ ][ yNbB$_{m1}$ ]   (xxxx)*
- Otherwise, availableFlagB$_1$ is set equal to 1 and the following assignments are made:

bvB$_1$=MvL0[xNbB$_1$][yNbB$_1$]           (1123)

5.4 Embodiment 4

The working draft may be changed as below.
8.5.2.3 Derivation Process for Spatial Merging Candidates
. . .
For the derivation of availableFlagB$_1$, refIdxLXB$_1$, predFlagLXB$_1$, mvLXB$_1$, hpelIfIdxB$_1$ and bcwIdxB$_1$ the following applies:
- The luma location (xNbB$_1$, yNbB$_1$) inside the neighbouring luma coding block is set equal to (xCb+cbWidth−1, yCb−1).
- The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
- *The variable availableB$_{m1}$ is set equal to FALSE.*
- When xCb>>Log2ParMrgLevel is equal to xNbB$_1$>>Log2ParMrgLevel and yCb>>Log2ParMrgLevel is equal to yNbB$_1$>>Log2ParMrgLevel, [[availableB$_1$ is set equal to FALSE.]] *the variables availableB$_1$ and availableB$_{m1}$ are derived as follows:*
  - *availableB$_1$ is set equal to FALSE.*
  - *The luma location ( xNbB$_{m1}$, yNbB$_{m1}$ ) inside the neighbouring luma coding block is set equal to ( ( xCb >> Log2ParMrgLevel ) << Log2ParMrgLevel + ( 1 << Log2ParMrgLevel ) − 1, ( yCb >> Log2ParMrgLevel ) << Log2ParMrgLevel − 1 ).*
  - *The derivation process for neighbouring block availability as specified in clause 6.4.4 is invoked with the current luma location ( xCurr, yCurr ) set equal to*

(xCb, yCb), the neighbouring luma location ($xNbB_{m1}$, $yNbB_{m1}$), checkPredModeY set equal to TRUE, and cIdx set equal to 0 as inputs, and the output is assigned to the block availability flag availableB$_{m1}$.

The variables availableFlagB$_1$, refIdxLXB$_1$, predFlagLXB$_1$, mvLXB$_1$, hpelIfIdxB$_1$ and bcwIdxB$_1$ are derived as follows:

If availableB$_1$ is equal to FALSE and availableB$_{m1}$ is equal to FALSE, availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, hpelIfIdxB$_1$ is set equal to 0, and bcwIdxB$_1$ is set equal to 0.

*Otherwise, if avaiableB$_{m1}$ is equal to TRUE, availableFlagB$_1$ is set equal to 1 and the following assignments are made:*

*mvLXB$_1$ = MvLX[ xNbB$_{m1}$ ][yNbB$_{m1}$ ]* (xxx)
*refIdxLXB$_1$ = RefIdxLX [ xNbB$_{m1}$ ][ yNbB$_{m1}$ ]* (xxx)
*predFlagLXB$_1$ = PredFlagLX[ xNbB$_{m1}$ ][ yNbB$_{m1}$ ]* (xxx)
*hpelIfIdxB$_1$ = HpelIf Idx[ xNbB$_{m1}$ ][ yNbB$_{m1}$ ]* (xxx)
*bcwIdxB$_1$ = BcwIdx[ xNbB$_{m1}$ ][ yNbB$_{m1}$ ]* (xxx)

Otherwise, availableFlagB$_1$ is set equal to 1 and the following assignments are made:

mvLXB1=MvLX[xNbB1][yNbB1]　　　(499)

refIdxLXB1=RefIdxLX[xNbB1][yNbB1]　　　(500)

predFlagLXB1=PredFlagLX[xNbB1][yNbB1]　　　(501)

hpelIfIdxB1=HpelIfIdx[xNbB1][yNbB1]　　　(502)

bcwIdxB1=BcwIdx[xNbB1][yNbB1]　　　(503)

For the derivation of availableFlagA$_1$, refIdxLXA$_1$, predFlagLXA$_1$, mvLXA$_1$, hpelIfIdxA$_1$ and bcwIdxA$_1$ the following applies:

The luma location (xNbA$_1$, yNbA$_1$) inside the neighbouring luma coding block is set equal to (xCb−1, yCb+cbHeight−1).

The derivation process for neighbouring block availability as specified in clause 6.4.4 is invoked with the current luma location (xCurr, yCurr) set equal to (xCb, yCb). the neighbouring luma location (xNbA$_1$, yNbA$_1$), checkPredModeY set equal to TRUE, and cIdx set equal to 0 as inputs, and the output is assigned to the block availability flag availableA$_1$.

*The variable availableA$_{m1}$ is set equal to FALSE.*

When xCb>>Log2ParMrgLevel is equal to xNbA$_1$>>Log2ParMrgLevel and yCb>>Log2ParMrgLevel is equal to yNbA$_1$>>Log2ParMrgLevel, [[availableA$_1$ is set equal to FALSE.]] *the variable availableA$_1$ and availableA$_{m1}$ are derived as follows:*
*availableA$_1$ is set equal to FALSE.*
*The luma location ( xNbA$_{m1}$, yNbA$_{m1}$) inside the neighbouring luma coding block is set equal to ( ( xCb >> Log2ParMrgLevel ) << Log2ParMrgLevel - 1,*
*(yCb >> Log2ParMrgLevel ) << Log2ParMrgLevel + ( 1 << Log2ParMrgLevel ) - 1).*
*The derivation process for neighbouring block availability as specified in clause 6.4.4 is invoked with the current luma location ( xCurr, yCurr ) set equal to ( xCb, yCb ), the neighbouring luma location ( xNbA$_{m1}$, yNbA$_{m1}$), checkPredModeY set equal to TRUE, and cIdx set equal to 0 as inputs, and the output is assigned to the block availability flag availableA$_{m1}$.*

The variables availableFlagA$_1$, refIdxLXA$_1$, predFlagLXA$_1$, mvLXA$_1$, hpelIfIdxA$_1$ and bcwIdxA$_1$ are derived as follows:

If one or more of the following conditions are true, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, hpelIfIdxA$_1$ is set equal to 0, and bcwIdxA$_1$ is set equal to 0:

availableA$_1$ is equal to FALSE and availableA$_{m1}$ is equal to FALSE, availableB$_1$ is equal to TRUE and availableA$_1$ is equal to TRUE and the luma locations (xNbA$_1$, yNbA$_1$) and (xNbB$_1$, yNbB$_1$) have the same motion vectors and the same reference indices.

availableB$_1$ is equal to TRUE and availableA$_{m1}$ is equal to TRUE and the luma locations ( xNbA$_{m1}$, yNbA$_{m1}$) and ( xNbB$_1$, yNbB1 ) have the same motion vectors and the same reference indices.

availableB$_{m1}$ is equal to TRUE and availableA$_1$ is equal to TRUE and the luma locations ( xNbA1, yNbA1 ) and ( xNbB$_{m1}$, yNbB$_{m1}$) have the same motion vectors and the same reference indices.

availableB$_{m1}$ is equal to TRUE and availableA$_{m1}$ is equal to TRUE and the luma locations ( xNbA$_{m1}$, yNbA$_{m1}$ ) and ( xNbB$_{m1}$, yNbB$_{m1}$) have the same motion vectors and the same reference indices.

*Otherwise, if availableA$_{m1}$ is equal to TRUE, availableFlagA$_1$ is set equal to 1 and the following assignments are made:*
*mvLXA$_1$ = MvLX[ xNbA$_{m1}$ ][ yNbA$_{m1}$ ]* (xxx)
*refIdxLXA$_1$ = RefIdxLX[ xNbA$_{m1}$ ][ yNbA$_{m1}$ ]* (xxx)
*predFlagLXA$_1$ = PredFlagLX[ xNbA$_{m1}$ ][ yNbA$_{m1}$ ]* (xxx)
*hpelIfIdxA$_1$ = HpelIfIdx[ xNbA$_{m1}$ ][ yNbA$_{m1}$ ]*
*(xxx) bcwIdxA$_1$ = BcwIdx[ xNbA$_{m1}$ ][ yNbA$_{m1}$ ]*
*(xxx)*

Otherwise, availableFlagA1 is set equal to 1 and the following assignments are made:

mvLXA1=MvLX[xNbA1][yNbA1]　　　(504)

refIdxLXA1=RefIdxLX[xNbA1][yNbA1]　　　(505)

predFlagLXA1=PredFlagLX[xNbA1][yNbA1]　　　(506)

hpelIfIdxA1=HpelIfIdx[xNbA1][yNbA1]  (507)

bcwIdxA1=BcwIdx[xNbA1][yNbA1]  (508)

For the derivation of availableFlagB$_0$, refIdxLXB$_0$, predFlagLXB$_0$, mvLXB$_0$, hpelIfIdxB$_0$ and bcwIdxB$_0$ the following applies:

The luma location (xNbB$_0$, yNbB$_0$) inside the neighbouring luma coding block is set equal to (xCb+cbWidth, yCb−1).

The derivation process for neighbouring block availability as specified in clause 6.4.4 is invoked with the current luma location (xCurr, yCurr) set equal to (xCb, yCb), the neighbouring luma location (xNbB$_0$, yNbB$_0$), checkPredModeY set equal to TRUE, and cIdx set equal to 0 as inputs, and the output is assigned to the block availability flag availableB$_0$.

*The variable availableB$_{m0}$  is set equal to FALSE.*
When xCb>>Log2ParMrgLevel is equal to xNbB$_0$>>Log2ParMrgLevel and yCb>>Log2ParMrgLevel is equal to yNbB$_0$>>Log2ParMrgLevel, [[availableB$_0$ is set equal to FALSE.]] *the variables availableB$_0$ and availableB$_{m0}$ are derived as follows:*
*availableB$_0$ is set equal to FALSE.*

*The luma location ( xNbB$_{m0}$, yNbB$_{m0}$)*
*inside the neighbouring luma*
*coding block is set equal to*
*( ( xCb >> Log2ParMrgLevel ) <<*
*Log2ParMrgLevel + ( 1 <<*
*Log2ParMrgLevel ), ( yCb >> L*
*og2ParMrgLevel ) << Log2ParMrgLevel − 1 ).*
*The derivation process for neighbouring*
*blocking availability as specified*
*in clause 6.4.4 is invoked*
*with the current luma location*
*( xCurr, yCurr ) set equal to*
*( xCb, yCb ), the neighbouring luma*
*location ( xNbB$_{m0}$, yNbB$_{m0}$ ),*
*checkPredModeY set equal to*
*TRUE, and cIdx set equal to 0 as*
*inputs, and the output is assigned to the*
*block availability flag availableB$_{m0}$.*

The variables availableFlagB$_0$, refIdxLXB$_0$, predFlagLXB$_0$, mvLXB$_0$, hpelIfIdxB$_0$ and bcwIdxB$_0$ are derived as follows:

If one or more of the following conditions are true, availableFlagB$_0$ is set equal to 0, both components of mvLXB$_0$ are set equal to 0, refIdxLXB$_0$ is set equal to −1 and predFlagLXB$_0$ is set equal to 0, with X being 0 or 1, hpelIfIdxB$_0$ is set equal to 0, and bcwIdxB$_0$ is set equal to 0:

availableB$_0$ is equal to FALSE and availableB$_{m0}$ *is equal to FALSE*.

availableB$_1$ is equal to TRUE and availableB$_0$ *is equal to TRUE* and the luma locations (xNbB$_1$, yNbB$_1$) and (xNbB$_0$, yNbB$_0$) have the same motion vectors and the same reference indices.

*availableB$_1$ is equal to TRUE and*
*availableB$_{m0}$ is equal to TRUE*
*and the luma locations*
*( xNbB$_1$, yNbB$_1$ )  and ( xNbB$_{m0}$, yNbB$_{m0}$ )*
*have the same motion*
*vectors and the same reference indices.*
*availableB$_{m1}$ is equal to TRUE and*
*availableB$_0$ is equal to TRUE*

*and the luma locations*
*( xNbB$_{m1}$, yNbB$_{m1}$ ) and ( xNbB$_0$, yNbB$_0$ )*
*have the same motion*
*vectors and the same  reference indices.*
*availableB$_{m1}$ is equal to TRUE and*
*availableB$_{m0}$ is equal to TRUE*
*and the luma locations*
*( xNbB$_{m1}$, yNbB$_{m1}$ ) and ( xNbB$_{m0}$, yNbB$_{m0}$ )*
*have the same motion  vectors and the same*
*references indices.*

Otherwise, *if availableB$_{m0}$ is equal to*
*TRUE, availableFlagB$_0$ is set*
*equal to 1 and the following*
*assignments are made:*
*mvLXB$_0$ = MvLX[ xNbB$_{m0}$ ][ yNbB$_{m0}$ ]  (xxx)*
*refIdxLXB$_0$ = RefIdxLX  xNbB$_{m0}$][ yNbB$_{m0}$ ]  (xxx)*
*predFlagLXB$_0$ = PredFlagLX[*
*xNbB$_{m0}$][ yNbB$_{m0}$ ]  (xxx)*
*hpelIfIdxB$_0$ = HpelIfIdx  [ xNbB$_{m0}$][ yNbB$_{m0}$ ]*
*(xxx)*
*bcwIdxB$_0$ = BcwIdx[ xNbB$_{m0}$ ][ yNbB$_{m0}$ ]  (xxx)*

Otherwise, availableFlagB$_0$ is set equal to 1 and the following assignments are made:

mvLXB$_0$=MvLX[xNbB$_0$][yNbB$_0$]  (509)

refIdxLXB$_0$=RefIdxLX[xNbB$_0$][yNbB$_0$]  (510)

predFlagLXB$_0$=PredFlagLX[xNbB$_0$][yNbB$_0$]  (511)

hpelIfIdxB$_0$=HpelIfIdx[xNbB$_0$][yNbB$_0$]  (512)

bcwIdxB$_0$=BcwIdx[xNbB$_0$][yNbB$_0$]  (513)

For the derivation of availableFlagA$_0$, refIdxLXA$_0$, predFlagLXA$_0$, mvLXA$_0$, hpelIfIdxA$_0$ and bcwIdxA$_0$ the following applies:

The luma location (xNbA$_0$, yNbA$_0$) inside the neighbouring luma coding block is set equal to (xCb−1, yCb+cbWidth).

The derivation process for neighbouring block availability as specified in clause 6.4.4 is invoked with the current luma location (xCurr, yCurr) set equal to (xCb, yCb). the neighbouring luma location (xNbA$_0$, yNbA$_0$), checkPredModeY set equal to TRUE, and cIdx set equal to 0 as inputs, and the output is assigned to the block availability flag availableA$_0$.

*The variable availableA$_{m0}$  is set equal to FALSE.*
When xCb>>Log2ParMrgLevel is equal to xNbA$_0$>>Log2ParMrgLevel and yCb>>Log2ParMrgLevel is equal to yNbA$_0$>>Log2ParMrgLevel, [[availableA$_0$ is set equal to FALSE.]] *the variables availableA$_0$ and availableA$_{m0}$ are derived as follows:*
*availableA$_0$ is set equal to FALSE.*
*The luma location ( xNbA$_{m0}$, yNbA$_{m0}$ )*
*inside the neighbouring luma*
*coding block is set equal  to*
*( ( xCb >> Log2ParMrgLevel ) <<*
*Log2ParMrgLevel − 1, (yCb >>*
*Log2ParMrgLevel ) << Lo*
*g2ParMrgLevel + ( 1 << Log2ParMrgLevel ) ).*
*The derivation process for neighbouring*
*block availability as specified*
*in clause 6.4.4 is invoked*
*with the current luma location*
*( xCurr, yCurr ) set equal to*
*( xCb, yCb ), the neighbouring luma* location ( $xNbA_{m0}$, $yNbA_{m0}$ ),
checkPredModeY set equal to
TRUE, and cIdx set equal to 0 as
inputs, and the output is assigned to the
block availability flag availableA$_{m0}$.

The variables availableFlagA$_0$, refIdxLXA$_0$, predFlagLXA$_0$, mvLXA$_0$, hpelIfIdxA$_0$ and bcwIdxA$_0$ are derived as follows:

If one or more of the following conditions are true, availableFlagA$_0$ is set equal to 0, both components of mvLXA$_0$ are set equal to 0, refIdxLXA$_0$ is set equal to −1 and predFlagLXA$_0$ is set equal to 0, with X being 0 or 1, hpelIfIdxA$_0$ is set equal to 0, and bcwIdxA$_0$ is set equal to 0:

availableA$_0$ is equal to FALSE and availableA$_{m0}$ is equal to FALSE.

availableA$_1$ is equal to TRUE and availableA$_0$ is equal to TRUE and the luma locations (xNbA$_1$, yNbA$_1$) and (xNbA$_0$, yNbA$_0$) have the same motion vectors and the same reference indices.

*and availableA$_1$ is equal to TRUE and*
    *availableA$_{m0}$ is equal to TRUE*
    *and the luma locations*
    *( xNbA$_1$, yNbA$_1$ ) and ( xNbA$_{m0}$, yNbA$_{m0}$ )*
    *have the same motion*
    *vectors and the same reference indices.*
  *availableA$_{m1}$ is equal to TRUE and*
    *availableA$_0$ is equal to TRUE*
    *and the luma locations*
    *( xNbA$_{m1}$, yNbA$_{m1}$ ) and ( xNbA$_0$, yNbA$_0$ )*
    *have the same motion*
    *vectors and the same reference indices.*
  *availableA$_{m1}$ is equal to TRUE and*
    *availableA$_{m0}$ is equal to*
    *TRUE and the luma locations*
    *( xNbA$_{m1}$, yNbA$_{m1}$ ) and ( xNbA$_{m0}$, yNbA$_{m0}$ )*
    *have the same motion vectors and the same*
    *reference indices.*

*Otherwise, if availableA$_{m0}$ is equal to*
*TRUE, availableFlagA$_0$ is set*
*equal to 1 and the following*
*assignments are made:*

*mvLXA$_0$ = MvLX[ xNbA$_{m0}$ ][ yNbA$_{m0}$ ]  (xxx)*

*refIdxLXA$_0$ = RefIdxLX  xNbA$_{m0}$ ][ yNbA$_{m0}$ ] (xxx)*
*predFlagLXA$_0$ = PredFlag  xNbA$_{m0}$ ][ yNbA$_{m0}$ ]*
*(xxx)*

*hpelIfIdxA$_0$ = HpelIfIdx  [ xNbA$_{m0}$ ][ yNbA$_{m0}$ ] (xxx)*
*bcwIdxA$_0$ = BcwIdx[ xNbA$_{m0}$ ][ yNbA$_{m0}$ ]  (xxx)*

Otherwise, availableFlagA$_0$ is set equal to 1 and the following assignments are made:

mvLXA$_0$=MvLX[xNbA$_0$][yNbA$_0$]     (514)

refIdxLXA$_0$=RefIdxLX[xNbA$_0$][yNbA$_0$]     (515)

predFlagLXA$_0$=PredFlagLX[xNbA$_0$][yNbA$_0$]     (516)

hpelIfIdxA$_0$=HpelIfIdx[xNbA$_0$][yNbA$_0$]     (517)

bcwIdxA$_0$=BcwIdx[xNbA$_0$][yNbA$_0$]     (518)

For the derivation of availableFlagB$_2$, refIdxLXB$_2$, predFlagLXB$_2$, mvLXB$_2$, hpelIfIdxB$_2$ and bcwIdxB$_2$ the following applies:

The luma location (xNbB$_2$, yNbB$_2$) inside the neighbouring luma coding block is set equal to (xCb−1, yCb−1).

The derivation process for neighbouring block availability as specified in clause 6.4.4 is invoked with the current luma location (xCurr, yCurr) set equal to (xCb, yCb), the neighbouring luma location (xNbB$_2$, yNbB$_2$), checkPredModeY set equal to TRUE, and cIdx set equal to 0 as inputs, and the output is assigned to the block availability flag availableB$_2$.

*The variable availableB$_{m2}$ is set equal to FALSE.*

When xCb>>Log2ParMrgLevel is equal to xNbB$_2$>>Log2ParMrgLevel and yCb>>Log2ParMrgLevel is equal to yNbB$_2$>>Log2ParMrgLevel, [[availableB$_2$ is set equal to FALSE.]] *the variables availableB$_2$ and availableB$_{m2}$ are derived as follows:*

*availableB$_2$ is set equal to FALSE.*
*The luma location ( xNbB$_{m2}$, yNbB$_{m2}$ )*
  *inside the neighbouring luma*
  *coding block is set equal to*
  *( ( xCb >> Log2ParMrgLevel ) <<*
  *Log2ParMrgLevel - 1, ( yCb >>*
  *Log2ParMrgLeve) << Lo g2ParMrgLevel - 1 ).*
*The derivation process for neighbouring*
  *block availability as specified*
  *in clause 6.4.4 is invoked*
  *with the current luma location*
  *( xCurr, yCurr ) set equal to*
  *( xCb, yCb ), the neightbouring luma*
  *location ( xNbB$_{m2}$, yNbB$_{m2}$ ),*
  *checkPredModeY set equal to*
  *TRUE, and cIdx set equal to 0 as*
  *inputs, and the output is assigned to the*
  *block availability flag availableB$_{m2}$.*

The variables availableFlagB$_2$, refIdxLXB$_2$, predFlagLXB$_2$, mvLXB$_2$, hpelIfIdxB$_2$ and bcwIdxB$_2$ are derived as follows:

If one or more of the following conditions are true, availableFlagB$_2$ is set equal to 0, both components of mvLXB$_2$ are set equal to 0, refIdxLXB$_2$ is set equal to −1 and predFlagLXB$_2$ is set equal to 0, with X being 0 or 1, hpelIfIdxB$_2$ is set equal to 0, and bcwIdxB$_2$ is set equal to 0:

availableB$_2$ is equal to FALSE *and availableB$_{m2}$ is equal to FALSE.* availableA$_1$ is equal to TRUE and availableB$_2$ is equal to TRUE and the luma locations (xNbA$_1$, yNbA$_1$) and (xNbB$_2$, yNbB$_2$) have the same motion vectors and the same reference indices.

*availableA$_1$ is equal to TRUE and*
    *availableB$_{m2}$ is equal to TRUE*
    *and the luma locations*
    *( xNbA$_1$, yNbA$_1$ ) and ( xNbB$_{m2}$, yNbB$_{m2}$ )*
    *have the same motion*
    *vectors and the same reference indices.*
  *availableA$_{m1}$ is equal to TRUE and*
    *availableB$_2$ is equal to TRUE*
    *and the luma locations*
    *( xNbA$_{m1}$, yNbA$_{m1}$ ) and ( xNbB$_2$, yNbB$_2$ )*
    *have the same motion*
    *vectors and the same reference indices.*
  *availableA$_{m1}$ is equal to TRUE*
    *and availableB$_{m2}$ is equal to*
    *TRUE and the luma locations*
    *( xNbA$_{m1}$, yNbA$_{m1}$ ) and ( xNbB$_2$, yNbB$_2$ )*
    *have the same motion*
    *vectors and the same reference indices.* availableB$_1$ is equal to TRUE
  and availableB$_2$ is equal to TRUE and the luma
  locations (xNbB$_1$, yNbB$_1$) and (xNbB$_2$, yNbB$_2$)
  have the same motion vectors and the same reference indices.
*availableB$_1$ is equal to TRUE and*
  *availableB$_{m2}$ is equal to TRUE*
  *and the luma locations*
  *( xNbB$_1$ , yNbB$_1$ ) and ( xNbA$_{m2}$, yNbA$_{m2}$ )*
  *have the same motion vectors and the same*
  *reference indices.*
*availableB$_{m1}$ is equal to TRUE and*
  *availableB$_2$ is equal to TRUE*
  *and the luma locations*
  *( xNbB$_{m1}$, yNbB$_{m1}$) and ( xNbB$_2$, yNbB$_2$ )*
  *have the same motion vectors and the same*
  *reference indices.*
*availableB$_{m1}$ is equal to TRUE and*
  *availableB$_{m2}$ is equal to TRUE*
  *and the luma locations*
  *( xNbB$_{m1}$, yNbB$_{m1}$ ) and ( xNbB$_{m2}$, yNbB$_{m2}$ )*
  *have the same motion vectors and the same*
  *reference indices.*
  availableFlagA$_0$+availableFlagA$_1$+availableFlagB$_0$+availableFlagB$_1$ is equal to 4.
Otherwise, if availableB$_{m2}$ is equal to
  TRUE, availableFlagB$_2$ is set
  equal to 1 and the following
  assignments are made:
*mvLXB$_2$ = MvLX[ xNbB$_{m2}$ ][ yNbB$_{m2}$ ]* (xxx)
*refIdxLXB$_2$ = RefIdxLX [ xNbB$_{m2}$ ][ yNbB$_{m2}$ ]* (xxx)
*predFlagLXB$_2$ = PredFlag LX[ xNbB$_{m2}$ ][ yNbB$_{m2}$ ]* (xxx)
*hpelIfIdxB$_2$ = HpelIfIdx [ xNbB$_{m2}$ ][ yNbB$_{m2}$ ]* (xxx)
*bcwIdxB$_2$ = BcwIdx[ xNbB$_{m2}$ ][ yNbB$_{m2}$ ]* (xxx)
Otherwise, availableFlagB$_2$ is set equal to 1 and the following assignments are made:

mvLXB$_2$=MvLX[xNbB$_2$][yNbB$_2$]  (519)

refIdxLXB$_2$=RefIdxLX[xNbB$_2$][yNbB$_2$]  (520)

predFlagLXB$_2$=PredFlagLX[xNbB$_2$][yNbB$_2$]  (521)

hpelIfIdxB$_2$=HpelIfIdx[xNbB$_2$][yNbB$_2$]  (522)

bcwIdxB$_2$=BcwIdx[xNbB$_2$][yNbB$_2$]  (523)

5.5 Embodiment 5

The working draft may be changed as below.
8.5.2.3 Derivation Process for Spatial Merging Candidates
. . .
For the derivation of availableFlagB$_1$, refIdxLXB$_1$, predFlagLXB$_1$, mvLXB$_1$, hpelIfIdxB$_1$ and bcwIdxB$_1$ the following applies:
  The luma location (xNbB$_1$, yNbB$_1$) inside the neighbouring luma coding block is set equal to (xCb+cbWidth−1, yCb−1).
  The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.

*The variable availableB$_{m1}$ is set equal to FALSE.*
When xCb>>Log2ParMrgLevel is equal to xNbB$_1$>>Log2ParMrgLevel and yCb>>Log2ParMrgLevel is equal to yNbB$_1$>>Log2ParMrgLevel, [[availableB$_1$ is set equal to FALSE.]] *the variables availableB$_1$ and availableB$_{m1}$ are derived as follows:*
  *availableB$_1$ is set equal to FALSE.*
  *The luma location ( xNbB$_{m1}$, yNbB$_{m1}$ )*
    *inside the neighbouring luma*
    *coding block is set equal to ( xCb + cbWidth - 1,*
    *( yCb >> Log2ParMgrLevel )*
    *<< Log2ParMrgLevel - 1 ).*
  *The derivation process for neighbouring*
    *block availability as specified*
    *in clause 6.4.4 is invoked*
    *with the current luma location*
    *( xCurr, yCurr ) set equal to*
    *( xCb, yCb ), the neighbouring luma*
    *location ( xNbB$_{m1}$, yNbB$_{m1}$ ),*
    *checkPredModeY set equal to*
    *TRUE, and cIdx set equal to 0 as*
    *inputs, and the output is assigned to the block*
    *availability flag availableB$_{m1}$.*
The variables availableFlagB$_1$, refIdxLXB$_1$, predFlagLXB$_1$, mvLXB$_1$, hpelIfIdxB$_1$ and bcwIdxB$_1$ are derived as follows:
  If availableB$_1$ is equal to FALSE *and availableB$_{m1}$ is equal to FALSE,* availableFlagB$_1$ is set equal to 0, both components of mvLXB$_1$ are set equal to 0, refIdxLXB$_1$ is set equal to −1 and predFlagLXB$_1$ is set equal to 0, with X being 0 or 1, hpelIfIdxB$_1$ is set equal to 0, and bcwIdxB$_1$ is set equal to 0.
  *Otherwise, if availableB$_{m1}$ is equal to*
    *TRUE, availableFlagB$_1$ is set*
    *equal to 1 and the following*
    *assignments are made:*
  *mvLXB$_1$ = MvLX[ xNbB$_{m1}$ ][ yNbB$_{m1}$ ]* (xxx)
  *refIdxLXB$_1$ = RefIdxLX [ xNbB$_{m1}$ ][ yNbB$_{m1}$ ]* (xxx)
  *predFlagLXB$_1$ = PredFlag LX[ xNbB$_{m1}$ ][ yNbB$_{m1}$ ]* (xxx)
  *hpelIfIdxB$_1$ = HpelIfIdx [ xNbB$_{m1}$ ][ yNbB$_{m1}$ ]* (xxx)
  *bcwIdxB$_1$ = BcwIdx[ xNbB$_{m1}$ ][ yNbB$_{m1}$ ]* (xxx)
  Otherwise, availableFlagB$_1$ is set equal to 1 and the following assignments are made:

mvLXB1=MvLX[xNbB1][yNbB1]  (499)

refIdxLXB1=RefIdxLX[xNbB1][yNbB1]  (500)

predFlagLXB1=PredFlagLX[xNbB1][yNbB1]  (501)

hpelIfIdxB1=HpelIfIdx[xNbB1][yNbB1]  (502)

bcwIdxB1=BcwIdx[xNbB1][yNbB1]  (503)

For the derivation of availableFlagA$_1$, refIdxLXA$_1$, predFlagLXA$_1$, mvLXA$_1$, hpelIfIdxA$_1$ and bcwIdxA$_1$ the following applies:
  The luma location (xNbA$_1$, yNbA$_1$) inside the neighbouring luma coding block is set equal to (xCb−1, yCb+cbHeight−1).
  The derivation process for neighbouring block availability as specified in clause 6.4.4 is invoked with the current luma location (xCurr, yCurr) set equal to (xCb, yCb). the neighbouring luma location (xNbA$_1$, yNbA$_1$), checkPredModeY set equal to TRUE, and cIdx set equal to 0 as inputs, and the output is assigned to the block availability flag availableA$_1$.

*The variable availableA$_{m1}$ is set equal to FALSE.*

When xCb>>Log2ParMrgLevel is equal to xNbA$_1$>>Log2ParMrgLevel and yCb>>Log2ParMrgLevel is equal to yNbA$_1$>>Log2ParMrgLevel, [[availableA$_1$ is set equal to FALSE.]] *the variables availableA$_1$ and availableA$_{m1}$ are derived as follows:*

*availableA$_1$ is set equal to FALSE.*

*The luma location ( xNbA$_{m1}$, yNbA$_{m1}$ )*
*inside the neighbouring luma*
*coding block is set equal*
*to ( ( xCb >> Log2ParMrgLevel )*
*<< Log2ParMrgLevel - 1, yCb + cbHeight - 1 ).*

*The derivation process for neighbouring*
*block availability as specified*
*in clause 6.4.4 is invoked*
*with the current luma location*
*( xCurr, yCurr ) set equal to*
*( xCb, yCb ), the neighbouring luma*
*location ( xNbA$_{m1}$, yNbA$_{m1}$ ),*
*checkPredModeY set equal to TRUE,*
*and cIdx set equal to 0 as*
*inputs, and the output is assigned*
*to the block availability flag availableA$_{m1}$.*

The variables availableFlagA$_1$, refIdxLXA$_1$, predFlagLXA$_1$, mvLXA$_1$, hpelIfIdxA$_1$ and bcwIdxA$_1$ are derived as follows:

If one or more of the following conditions are true, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, hpelIfIdxA$_1$ is set equal to 0, and bcwIdxA$_1$ is set equal to 0:

availableA$_1$ is equal to FALSE *and availableA$_{m1}$ is equal to FALSE*.

availableB$_1$ is equal to TRUE *and availableA$_1$ is equal to TRUE* and the luma locations (xNbA$_1$, yNbA$_1$) and (xNbB$_1$, yNbB$_1$) have the same motion vectors and the same reference indices.

*availableB$_1$ is equal to TRUE and*
*availableA$_{m1}$ is equal to TRUE*
*and the luma locations*
*( xNbA$_{m1}$, yNbA$_{m1}$) and ( xNbB$_1$, yNbB$_1$ )*
*have the same motion vectors and the same*
*reference indices.*

*availableB$_{m1}$ is equal to TRUE and*
*availableA$_1$ is equal to TRUE*
*and the luma locations*
*( xNbA$_1$, yNbA$_1$ ) and ( xNbB$_{m1}$, yNbB$_{m1}$ )*
*have the same motion*
*vectors and the same reference indices.*

*availableB$_{m1}$ is equal to TRUE and*
*availableA$_{m1}$ is equal to*
*TRUE and the luma locations*
*( xNbA$_{m1}$, yNbA$_{m1}$) and ( xNbB$_{m1}$, yNbB$_{m1}$ )*
*have the same motion*
*vectors and the same reference indices.*

*Otherwise, if availableA$_{m1}$ is equal*
*to TRUE, availableFlagA$_1$ is*
*set equal to 1 and the following*
*assignments are made:*

*mvLXA$_1$ = MvLX[ xNbA$_{m1}$ ][ yNbA$_{m1}$ ]* (xxx)
*refIdxLXA$_1$ = RefIdxLX [ xNbA$_{m1}$ ][ yNbA$_{m1}$ ]* (xxx)
*predFlagLXA$_1$ = PredFlag LX[ xNbA$_{m1}$ ][ yNbA$_{m1}$ ]* (xxx)
*hpelIfIdxA$_1$ = HpelIfIdx [ xNbA$_{m1}$ ][ yNbA$_{m1}$ ]* (xxx)
*bcwIdxA$_1$ = BcwIdx[ xNbA$_{m1}$ ][ yNbA$_{m1}$ ]* (xxx)

Otherwise, availableFlagA$_1$ is set equal to 1 and the following assignments are made:

$$\text{mvLXA1} = \text{MvLX}[x\text{NbA1}][y\text{NbA1}] \quad (504)$$

$$\text{refIdxLXA1} = \text{RefIdxLX}[x\text{NbA1}][y\text{NbA1}] \quad (505)$$

$$\text{predFlagLXA1} = \text{PredFlagLX}[x\text{NbA1}][y\text{NbA1}] \quad (506)$$

$$\text{hpelIfIdxA1} = \text{HpelIfIdx}[x\text{NbA1}][y\text{NbA1}] \quad (507)$$

$$\text{bcwIdxA1} = \text{BcwIdx}[x\text{NbA1}][y\text{NbA1}] \quad (508)$$

For the derivation of availableFlagB$_0$, refIdxLXB$_0$, predFlagLXB$_0$, mvLXB$_0$, hpelIfIdxB$_0$ and bcwIdxB$_0$ the following applies:

The luma location (xNbB$_0$, yNbB$_0$) inside the neighbouring luma coding block is set equal to (xCb+cbWidth, yCb−1).

The derivation process for neighbouring block availability as specified in clause 6.4.4 is invoked with the current luma location (xCurr, yCurr) set equal to (xCb, yCb), the neighbouring luma location (xNbB$_0$, yNbB$_0$), checkPredModeY set equal to TRUE, and cIdx set equal to 0 as inputs, and the output is assigned to the block availability flag availableB$_0$.

*The variable availableB$_{m0}$ is set equal to FALSE.*

When xCb>>Log2ParMrgLevel is equal to xNbB$_0$>>Log2ParMrgLevel and yCb>>Log2ParMrgLevel is equal to yNbB$_0$>>Log2ParMrgLevel, [[availableB$_0$ is set equal to FALSE.]] |*the variables available B$_0$ and availableB$_{m0}$ are derived as follows:*

*availableB$_0$ is set equal to FALSE.*

*The luma location ( xNbB$_{m0}$, yNbB$_{m0}$ )*
*inside the neighbouring luma*
*coding block is set equal*
*to ( xCb + cbWidth, ( yCb >>*
*Log2ParMrgLevel ) << Log2ParMrgLevel - 1 ).*

*The derivation process for neighbouring*
*block availability as specified*
*in clause 6.4.4 is invoked*
*with the current luma location*
*( xCurr, yCurr ) set equal to*
*( xCb, yCb ), the neighbouring luma*
*location ( xNbB$_{m0}$, yNbB$_{m0}$),*
*checkPredModeY set equal to*
*TRUE, and cIdx set equal to 0 as*
*inputs, and the output is assigned to*
*the block availability flag availableB$_{m0}$.*

The variables availableFlagB$_0$, refIdxLXB$_0$, predFlagLXB$_0$, mvLXB$_0$, hpelIfIdxB$_0$ and bcwIdxB$_0$ are derived as follows:

If one or more of the following conditions are true, availableFlagB$_0$ is set equal to 0, both components of mvLXB$_0$ are set equal to 0, refIdxLXB$_0$ is set equal to −1 and predFlagLXB$_0$ is set equal to 0, with X being 0 or 1, hpelIfIdxB$_0$ is set equal to 0, and bcwIdxB$_0$ is set equal to 0:

availableB$_0$ is equal to FALSE and availableB$_{m0}$ is equal to FALSE.

availableB$_1$ is equal to TRUE and availableB$_0$ is equal to TRUE and the luma locations (xNbB$_1$, yNbB$_1$) and (xNbB$_0$, yNbB$_0$) have the same motion vectors and the same reference indices.

*availableB$_1$ is equal to TRUE and availableB$_{m0}$ is equal to TRUE and the luma locations (xNbB$_1$, yNbB$_1$) and (xNbB$_{m0}$, yNbB$_{m0}$) have the same motion vectors and the same reference indices.*

*availableB$_{m1}$ is equal to TRUE and availableB$_0$ is equal to TRUE and the luma locations (xNbB$_{m1}$, yNbB$_{m1}$) and (xNbB$_0$, yNbB$_0$) have the same motion vectors and the same reference indices.*

*availableB$_{m1}$ is equal to TRUE and availableB$_0$ is equal to TRUE and the luma locations (xNbB$_{m1}$, yNbB$_{m1}$) and (xNbB$_{m0}$, yNbB$_{m0}$) have the same motion vectors and the same reference indices.*

*Otherwise, if availableB$_{m0}$ is equal to TRUE, availableFlagB$_0$ is set equal to 1 and the following assignments are made:*

*mvLXB$_0$ = MvLX[ xNbB$_{m0}$ ][ yNbB$_{m0}$ ] (xxx)*

*refIdxLXB$_0$ = RefIdxLX [ xNbB$_{m0}$ ][ yNbB$_{m0}$ ] (xxx)*

*predFlagLXB$_0$ = PredFlagLX[ xNbB$_{m0}$ ][ yNbB$_{m0}$ ] (xxx)*

*hpelIfIdxB$_0$ = HpelIfIdx [ xNbB$_{m0}$ ][ yNbB$_{m0}$ ] (xxx)*

*bcwIdxB$_0$ = BcwIdx[ xNbB$_{m0}$ ][ yNbB$_{m0}$ ] (xxx)*

Otherwise, availableFlagB$_0$ is set equal to 1 and the following assignments are made:

mvLXB$_0$=MvLX[xNbB$_0$][yNbB$_0$]  (509)

refIdxLXB$_0$=RefIdxLX[xNbB$_0$][yNbB$_0$]  (510)

predFlagLXB$_0$=PredFlagLX[xNbB$_0$][yNbB$_0$]  (511)

hpelIfIdxB$_0$=HpelIfIdx[xNbB$_0$][yNbB$_0$]  (512)

bcwIdxB$_0$=BcwIdx[xNbB$_0$][yNbB$_0$]  (513)

For the derivation of availableFlagA$_0$, refIdxLXA$_0$, predFlagLXA$_0$, mvLXA$_0$, hpelIfIdxA$_0$ and bcwIdxA$_0$ the following applies:

The luma location (xNbA$_0$, yNbA$_0$) inside the neighbouring luma coding block is set equal to (xCb−1, yCb+cbWidth).

The derivation process for neighbouring block availability as specified in clause 6.4.4 is invoked with the current luma location (xCurr, yCurr) set equal to (xCb, yCb), the neighbouring luma location (xNbA$_0$, yNbA$_0$), checkPredModeY set equal to TRUE, and cIdx set equal to 0 as inputs, and the output is assigned to the block availability flag availableA$_0$.

*The variable availableA$_{m0}$ is set equal to FALSE.*

When xCb>>Log2ParMrgLevel is equal to xNbA$_0$>>Log2ParMrgLevel is equal to and yCb>>Log2ParMrgLevel is equal to yNbA$_0$>>Log2ParMrgLevel, [[availableA$_0$ is set equal to FALSE.]] *the variables availableA$_0$ and availableA$_{m0}$ are derived as follows:*

*availableA$_0$ is set equal to FALSE.*

*The luma location (xNbA$_{m0}$, yNbA$_{m0}$) inside the neighbouring luma coding block is set equal to ( ( xCb >> Log2ParMrgLevel ) << Log2ParMrgLevel − 1, yCb + cbWidth ).*

*The derivation process for neighbouring block availability as specified in clause 6.4.4 is invoked with the current luma location (xCurr, yCurr) set equal to (xCb, yCb), the neighbouring luma location (xNbA$_{m0}$, yNbA$_{m0}$), checkPredModeY set equal to TRUE, and cIdx set equal to 0 as inputs, and the output is assigned to the block availability flag availableA$_{m0}$.*

The variables availableFlagA$_0$, refIdxLXA$_0$, predFlagLXA$_0$, mvLXA$_0$, hpelIfIdxA$_0$ and bcwIdxA$_0$ are derived as follows:

If one or more of the following conditions are true, availableFlagA$_0$ is set equal to 0, both components of mvLXA$_0$ are set equal to 0, refIdxLXA$_0$ is set equal to −1 and predFlagLXA$_0$ is set equal to 0, with X being 0 or 1, hpelIfIdxA$_0$ is set equal to 0, and bcwIdxA$_0$ is set equal to 0:

availableA$_0$ is equal to FALSE *and availableA$_{m0}$ is equal to FALSE.* availableA$_1$ is equal to TRUE *and availableA$_0$ is equal to TRUE* and the luma locations (xNbA$_1$, yNbA$_1$) and (xNbA$_0$, yNbA$_0$) have the same motion vectors and the same reference indices.

*availableA$_1$ is equal to TRUE and availableA$_{m0}$ is equal to TRUE and the luma locations (xNbA$_1$, yNbA$_1$) and (xNbA$_{m0}$, yNbA$_{m0}$) have the same motion vectors and the same reference indices.*

*availableA$_{m1}$ is equal to TRUE and availableA$_0$ is equal to TRUE and the luma locations (xNbA$_{m1}$, yNbA$_{m1}$) and (xNbA$_0$, yNbA$_0$) have the same motion vectors and the same reference indices.*

*availableA$_{m1}$ is equal to TRUE and availableA$_{m0}$ is equal to TRUE and the luma locations (xNbA$_{m1}$, yNbA$_{m1}$) and (xNbA$_{m0}$, yNbA$_{m0}$) have the same motion vectors and the same reference indices.*

*Otherwise, if availableA$_{m0}$ is equal to TRUE, availableFlagA$_0$ is set equal to 1 and the following assignments are made:*

*mvLXA$_0$ = MvLX[ xNbA$_{m0}$, yNbA$_{m0}$ ] (xxx)*

*refIdxLXA$_0$ = RefIdxLX [ xNbA$_{m0}$ ][ yNbA$_{m0}$ ] (xxx)*

*predFlagLXA$_0$ = PredFlagLX[ xNbA$_{m0}$ ][ yNbA$_{m0}$ ] (xxx)*

*hpelIfIdxA$_0$ = HpelIfIdx [ xNbA$_{m0}$ ][ yNbA$_{m0}$ ] (xxx)*

*bcwIdxA$_0$ = BcwIdx[ xNbA$_{m0}$ ][ yNbA$_{m0}$ ] (xxx)*

Otherwise, availableFlag$A_0$ is set equal to 1 and the following assignments are made:

mvLX$A_0$=MvLX[xNb$A_0$][yNb$A_0$]  (514)

refIdxLX$A_0$=RefIdxLX[xNb$A_0$][yNb$A_0$]  (515)

predFlagLX$A_0$=PredFlagLX[xNb$A_0$][yNb$A_0$]  (516)

hpelIfIdx$A_0$=HpelIfIdx[xNb$A_0$][yNb$A_0$]  (517)

bcwIdx$A_0$=BcwIdx[xNb$A_0$][yNb$A_0$]  (518)

For the derivation of availableFlag$B_2$, refIdxLX$B_2$, predFlagLX$B_2$, mvLX$B_2$, hpelIfIdx$B_2$ and bcwIdx$B_2$ the following applies:

The luma location (xNb$B_2$, yNb$B_2$) inside the neighbouring luma coding block is set equal to (xCb−1, yCb−1).

The derivation process for neighbouring block availability as specified in clause 6.4.4 is invoked with the current luma location (xCurr, yCurr) set equal to (xCb, yCb), the neighbouring luma location (xNb$B_2$, yNb$B_2$), checkPredModeY set equal to TRUE, and cIdx set equal to 0 as inputs, and the output is assigned to the block availability flag availableB$_2$.

*The variable availableB$_{m2}$ is set equal to FALSE.*

When xCb>>Log2ParMrgLevel is equal to xNb$B_2$>>Log2ParMrgLevel and yCb>>Log2ParMrgLevel is equal to yNb$B_2$>>Log2ParMrgLevel, [[availableB$_2$ is set equal to FALSE.]] *the variables availableB$_2$ and availableB$_{m2}$ are derived as follows:*
*availableB$_2$ is set equal to FALSE.*
*The luma location ( xNb$B_{m2}$, yNb$B_{m2}$) inside the neighbouring luma coding block is set equal to*
*( ( xCb >> Log2ParMrgLevel ) << Log2ParMrgLevel − 1,*
*( yCb >> Log2ParMrgLevel ) << Log2ParMrgLevel − 1 ).*
*The derivation process for neighbouring block availability as specified in clause 6.4.4 is invoked with the current luma location (xCurr, yCurr) set equal to (xCb, yCb), the neighbouring luma location (xNb$B_{m2}$, yNb$B_{m2}$), checkPredModeY set equal to TRUE, and cIdx set equal to 0 as inputs, and the output is assigned to block availability flag availableB$_{m2}$.*

The variables availableFlag$B_2$, refIdxLX$B_2$, predFlagLX$B_2$, mvLX$B_2$, hpelIfIdx$B_2$ and bcwIdx$B_2$ are derived as follows:

If one or more of the following conditions are true, availableFlag$B_2$ is set equal to 0, both components of mvLX$B_2$ are set equal to 0, refIdxLX$B_2$ is set equal to −1 and predFlagLX$B_2$ is set equal to 0, with X being 0 or 1, hpelIfIdx$B_2$ is set equal to 0, and bcwIdx$B_2$ is set equal to 0:

availableB$_2$ is equal to FALSE *and availableB$_{m2}$ is equal to FALSE.*
availableA$_1$ is equal to TRUE *and availableB$_2$ is equal to TRUE* and the luma locations (xNb$A_1$, yNb$A_1$) and (xNb$B_2$, yNb$B_2$) have the same motion vectors and the same reference indices.
*availableA$_1$ is equal to TRUE and availableB$_{m2}$ is equal to*
*TRUE and the luma locations*
*(xNbA$_1$, yNbA$_1$) and (xNbB$_{m2}$, yNbB$_{m2}$)*
*have the same motion vectors and the same reference indices.*
*availableA$_{m1}$ is equal to TRUE and*
*availableB$_2$ is equal to TRUE*
*and the luma locations*
*(xNbA$_{m1}$, yNbA$_{m1}$) and (xNbB$_2$, yNbB$_2$)*
*have the same motion vectors and the same reference indices.*
*availableA$_{m1}$ is equal to TRUE and*
*availableB$_{m2}$ is equal to TRUE*
*and the luma locations*
*( xNbA$_{m1}$, yNbA$_{m1}$) and ( xNbB$_{m2}$, yNbB$_{m2}$)*
*have the same motion vectors and the same reference indices.*
availableB$_1$ is equal to TRUE *and availableB$_2$ is equal to TRUE* and the luma locations (xNb$B_1$, yNb$B_1$) and (xNb$B_2$, yNb$B_2$) have the same motion vectors and the same reference indices.
*availableB$_1$ is equal to TRUE and*
*availableB$_{m2}$ is equal to TRUE*
*and the luma locations*
*( xNbB$_1$, yNbB$_1$ ) and ( xNbB$_{m2}$, yNbB$_{m2}$)*
*have the same motion vectors and the same reference indices.*
*availableB$_{m1}$ is equal to TRUE and*
*availableB$_2$ is equal to*
*TRUE and the luma locations*
*( xNbB$_{m1}$, yNbB$_{m1}$ ) and ( xNbB$_2$, yNbB$_2$ )*
*have the same motion vectors and the same reference indices.*
*availableB$_{m1}$ is equal to TRUE and*
*availableB$_{m2}$ is equal to*
*TRUE and the luma locations*
*( xNbB$_{m1}$, yNbB$_{m1}$ ) and ( xNbB$_{m2}$, yNbB$_{m2}$ )*
*have the same motion vectors and the same reference indices.*
availableFlag$A_0$+availableFlag$A_1$+availableFlag$B_0$+availableFlag$B_1$ is equal to 4.

*Otherwise, if availableB$_{m2}$ is equal*
*to TRUE, availableFlagB$_2$ is*
*set equal to 1 and the following*
*assignments are made:*
*mvLXB$_2$ = MvLX[ xNbB$_{m2}$ ][ yNbB$_{m2}$ ]   (xxx)*
*refIdxLXB$_2$ = RefIdxLX  [ xNbB$_{m2}$ ][ yNbB$_{m2}$ ]*
*(xxx)*
*predFlagLXB$_2$ = PredFlag  LX[ xNbB$_{m2}$ ][ yNbB$_{m2}$ ]*
*(xxx)*
*hpelIfIdxB$_2$ = HpelIdIdx  [ xNbB$_{m2}$ ][ yNbB$_{m2}$ ]*
*(xxx)*
*bcwIdxB$_2$ = BcwIdx[ xNbB$_{m2}$ ][ yNbB$_{m2}$ ]   (xxx)*

Otherwise, availableFlag$B_2$ is set equal to 1 and the following assignments are made:

mvLX$B_2$=MvLX[xNb$B_2$][yNb$B_2$]  (519)

refIdxLX$B_2$=RefIdxLX[xNb$B_2$][yNb$B_2$]  (520)

predFlagLX$B_2$=PredFlagLX[xNb$B_2$][yNb$B_2$]  (521)

hpelIfIdx$B_2$=HpelIfIdx[xNb$B_2$][yNb$B_2$]  (522)

bcwIdx$B_2$=BcwIdx[xNb$B_2$][yNb$B_2$]  (523)

5.6 Embodiment 6

The working draft may be changed as below.
8.5.5.2 Derivation Process for Motion Vectors and Reference Indices in Subblock Merge Mode

. . .

The variables numSbColX, numSbColY and the subblock merging candidate list, subblockMergeCandList are derived by the following ordered steps:
1. When sps_sbtmvp_enabled_flag is equal to 1, the following applies:
   For the derivation of availableFlag$A_1$, refIdxLX$A_1$, predFlagLX$A_1$ and mvLX$A_1$ the following applies:
   The luma location (xNb$A_1$, yNb$A_1$) inside the neighbouring luma coding block is set equal to (xCb−1, yCb+cbHeight−1).
   The derivation process for neighbouring block availability as specified in clause 6.4.4 is invoked with the current luma location (xCurr, yCurr) set equal to (xCb, yCb), the neighbouring luma location (xNb$A_1$, yNb$A_1$), checkPredModeY set equal to TRUE, and cIdx set equal to 0 as inputs, and the output is assigned to the block availability flag available$A_1$.
   *The available$A_{m1}$ is set equal to FALSE.*
   When xCb>>Log2ParMrgLevel is equal to xNb$A_1$>>Log2ParMrgLevel and yCb>>Log2ParMrgLevel is equal to yNb$A_1$>>Log2ParMrgLevel, [[available$A_1$ is set equal to FALSE.]] *the variables available$A_1$ and available$A_{m1}$ are derived as follows:*
   *available$A_1$ is set equal to FALSE.*
   *The luma location ( xNb$A_{m1}$, yNb$A_{m1}$ )*
   *inside the neighbouring luma coding block is*
   *set equal to*
   *( ( xCb >> Log2ParMrgLevel ) <<*
   *Log2ParMrgLevel − 1,*
   *(yCb >> Log2ParMrgLevel ) << Log2ParMrgLevel +*
   *( 1 << Log2ParMrgLevel ) − 1 ).*
   *The derivation process for*
   *neighbouring block*
   *availability as specified in*
   *clause 6.4.4 is invoked with the*
   *current luma location*
   *( xCurr, yCurr ) set equal to*
   *( xCb, yCb ), the neighbouring luma*
   *location ( xNb$A_{m1}$, yNb$A_{m1}$ ),*
   *checkPredModeY*
   *set equal to TRUE, and cIdx set*
   *equal to 0 as inputs, and*
   *the outputs is assigned to*
   *the block availability flag available$A_{m1}$.*
   The variables availableFlag$A_1$, refIdxLX$A_1$, predFlagLX$A_1$ and mvLX$A_1$ are derived as follows:
      If available$A_1$ is equal to FALSE *and available$A_{m1}$ is equal to FALSE*, availableFlag$A_1$ is set equal to 0, both components of mvLX$A_1$ are set equal to 0, refIdxLX$A_1$ is set equal to −1 and predFlagLX$A_1$ is set equal to 0, with X being 0 or 1, and bcwIdx$A_1$ is set equal to 0.
      *Otherwise, if available$A_{m1}$ is equal to TRUE, availableFlag$A_1$ is set equal to 1 and* the following assignments are made:
      mvLX$A_1$ = MvLX[ xNb$A_{m1}$ ][ yNb$A_{m1}$ ]  (xxx)
      refIdxLX$A_1$ = RefIdxLX [ xNb$A_{m1}$ ][ yNb$A_{m1}$ ]  (xxx)
      predFlagLX$A_1$ = PredFlag LX[ xNb$A_{m1}$ ][ yNb$A_{m1}$ ]  (xxx)
      Otherwise, availableFlag$A_1$ is set equal to 1 and the following assignments are made:

mvLX$A_1$=MvLX[xNb$A_1$][yNb$A_1$]  (680)

refIdxLX$A_1$=RefIdxLX[xNb$A_1$][yNb$A_1$]  (681)

predFlagLX$A_1$=PredFlagLX[xNb$A_1$][yNb$A_1$]  (682)

. . .

2. When sps_affine_enabled_flag is equal to 1, the sample locations (xNb$A_0$, yNb$A_0$), (xNb$A_1$, yNb$A_1$), (xNb$A_2$, yNb$A_2$), (xNb$B_0$, yNb$B_0$), (xNb$B_1$, yNb$B_1$), (xNb$B_2$, yNb$B_2$), and (xNb$B_3$, yNb$B_3$) are derived as follows:

(xNb$A_0$,yNb$A_0$)=(xCb−1,yCb+cbHeight)  (683)

(xNb$A_1$,yNb$A_1$)=(xCb−1,yCb+cbHeight−1)  (684)

(xNb$A_2$,yNb$A_2$)=(xCb−1,yCb)  (685)

(xNb$B_0$,yNb$B_0$)=(xCb+cbWidth,yCb−1)  (686)

(xNb$B_1$,yNb$B_1$)=(xCb+cbWidth−1,yCb−1)  (687)

(xNb$B_2$,yNb$B_2$)=(xCb−1,yCb−1)  (688)

(xNb$B_3$,yNb$B_3$)=(xCb,yCb−1)  (689)

*( xNb$A_{m0}$, yNb$A_{m0}$ ) =*
      *( ( xCb >> Log2ParMrgLevel ) <<*
      *Log2ParMrgLevel − 1,*
      *(yCb >>Log2ParMrgLevel ) <<*
      *Log2ParMrgLevel + ( 1 << Log2ParMrgLevel ) )*
   *(xxx) ( xNb$A_{m1}$, yNbB$A_{m1}$ ) =*
      *( ( xCb >> Log2ParMrgLevel )*
      *<< Log2ParMrgLevel − 1,*
      *(yCb >> Log2ParMrgLevel ) <<*
      *Log2ParMrgLevel +*
      *( 1 << Log2ParMrgLevel ) − 1 )  (xxx)*
   *( xNb$A_{m2}$, yNbB$A_{m2}$ ) =*
      *( ( xCb >> Log2ParMrgLevel )*
      *<< Log2ParMrgLevel − 1,*
      *(yCb >> Log2ParMrgLevel ) <<*
      *Log2ParMrgLevel )  (xxx)*
   *( xNb$B_{m0}$, yNb$B_{m0}$ ) =*
      *( ( xCb >> Log2ParMrgLevel ) <<*
      *Log2ParMrgLevel + ( 1 <<*
      *Log2ParMrgLevel ), (yCb >>*
      *Log2ParMrgLevel ) <<  Log2ParMrgLevel − 1 )*
      *(xxx)*
   *( xNb$B_{m1}$, yNb$B_{m1}$ ) =*
      *( ( xCb >> Log2ParMrgLevel ) <<*
      *Log2ParMrgLevel + ( 1 <<*
      *Log2ParMrgLevel ) − 1, (yCb*
      *>> Log2ParMrgLevel ) <<*
      *Log2ParMrgLevel − 1 )  (xxx)*
   *( xNb$B_{m2}$, yNb$B_{m2}$ ) =*
      *( ( xCb >> Log2ParMrgLevel ) <<*
      *Log2ParMrgLevel − 1, (yCb >>*
      *Log2ParMrgLevel ) <<*
      *Log2ParMrgLevel − 1 ) (xxx)*
   *( xNb$B_{m3}$, yNb$B_{m3}$ ) =*
      *( ( xCb >> Log2ParMrgLevel ) <<*

Log2ParMrgLevel, (yCb >> Log2ParMrgLevel ) << Log2 ParMrgLevel - 1 ) (xxx)

3. When sps_affine_enabled_flag is equal to 1, the variable availableFlagA is set equal to FALSE and the following applies for (xNbA$_k$, yNbA$_k$) from (xNbA$_0$, yNbA$_0$) to (xNbA$_1$, yNbA$_1$):

The derivation process for neighbouring block availability as specified in clause 6.4.4 is invoked with the current luma location (xCurr, yCurr) set equal to (xCb, yCb), the neighbouring luma location (xNbA$_k$, yNbA$_k$), checkPredModeY set equal to TRUE, and cIdx set equal to 0 as inputs, and the output is assigned to the block availability flag availableA$_k$.

*The availableA$_{mk}$ is set equal to FALSE.*

When xCb>>Log2ParMrgLevel is equal to xNbA$_k$>>Log2ParMrgLevel and yCb>>Log2ParMrgLevel is equal to yNbA$_k$>>Log2ParMrgLevel, [[availableA$_k$ is set equal to FALSE.]] *the variables availableA$_k$ and availableA$_{mk}$ are derived as follows:*

*availableA$_k$ is set equal to FALSE.*

*The derivation process for neighbouring block availability as specified in clause 6.4.4 is invoked with the current luma location (xCurr, yCurr) set equal to ( xCb, yCb), the neighbouring luma location*

*( xNbA$_{mk}$, yNbA$_{mk}$), checkPredModeY set equal to TRUE, and cIdx set equal to 0 as inputs, and the output is assigned to the block availability flag availableA$_{mk}$.*

When availableA$_k$ is equal to TRUE and MotionModelIdc[xNbA$_k$][yNbA$_k$] is greater than 0 and availableFlagA is equal to FALSE, the following applies:

The variable availableFlagA is set equal to TRUE, motionModelIdcA is set equal to MotionModelIdc[xNbA$_k$][yNbA$_k$], (xNb, yNb) is set equal to (CbPosX[0][xNbA$_k$][yNbA$_k$], CbPosY[0][xNbA$_k$][yNbA$_k$]), nbW is set equal to CbWidth[0][xNbA$_k$][yNbA$_k$], nbH is set equal to CbHeight[0][xNbA$_k$][yNbA$_k$], numCpMv is set equal to MotionModelIdc[xNbA$_k$][yNbA$_k$]+1, and bcwIdxA is set equal to BcwIdx[xNbA$_k$][yNbA$_k$].

For X being replaced by either 0 or 1, the following applies:

When PredFlagLX[xNbA$_k$][yNbA$_k$] is equal to 1, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXA[cpIdx] with cpIdx=0 . . . numCpMv−1 as output.

The following assignments are made:

predFlagLXA=PredFlagLX[xNbA$_k$][yNbA$_k$]   (690)

refIdxLXA=RefIdxLX[xNbAk][yNbAk]   (691)

*When availableA$_{mk}$ is equal to TRUE and MotionModelIdc[ xNbA$_{mk}$ ][ yNbA$_{mk}$ ]*
*is greater than 0 and availableFlagA is equal to FALSE, the following applies:*

*The variable availableFlagA is set equal to TRUE,*
*motionModelIdcA is set equal to MotionModelIdc[ xNbA$_{mk}$ ][ yNbA$_{mk}$ ],*
*( xNb, yNb ) is set equal to ( CbPosX[ 0 ][ xNbA$_{mk}$ ][ yNbA$_{mk}$ ], CbPosY[ 0 ][ xNbA$_{mk}$ ][ yNbA$_{mk}$ ]),*
*nbW is set equal to CbWidth[ 0 ][ xNbA$_{mk}$ ][ yNbA$_{mk}$ ]),*
*nbH is set equal to CbHeight[ 0 ] [ xNbA$_{mk}$ ][ yNbA$_{mk}$ ],*
*numCpMv is set equal to MotionModelIdc[ xNbA$_{mk}$ ][ yNbA$_{mk}$ ] + 1,*
*and bcwIdxA is set equal to BcwIdx[ xNbA$_{mk}$ ][ yNbA$_{mk}$ ].*

*For x being replaced by either 0 or 1, the following applies:*

*When PredFlagLx[ xNbA$_{mk}$ ][ yNbA$_{mk}$ ] is equal to 1, the derivation process for luma affine control point motion vectors from a neighbouring block as specified in clause 8.5.5.5 is invoked with the luma coding block location ( xCb, yCb ), the luma coding block width and height cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXA[ cpIdx ] with cpIdx = 0 .. numCpMv-1 as output.*

*The following assignments are made:*
*predFlagLXA = PredFlagLX [ xNbA$_{mk}$ ][ yNbA$_{mk}$ ]  (xxx)*
*refIdxLXA = RefIdxLX [ xNbA$_{mk}$ ][ yNbA$_{mk}$ ]  (xxx)*

4. When sps_affine_enabled_flag is equal to 1, the variable availableFlagB is set equal to FALSE and the following applies for (xNbB$_k$, yNbB$_k$) from (xNbB$_0$, yNbB$_0$) to (xNbB$_2$, yNbB$_2$):

The derivation process for neighbouring block availability as specified in clause 6.4.4 is invoked with the current luma location (xCurr, yCurr) set equal to (xCb, yCb), the neighbouring luma location (xNbB$_k$, yNbB$_k$), checkPredModeY set equal to TRUE, and cIdx set equal to 0 as inputs, and the output is assigned to the block availability flag availableB$_k$.

*The availableB$_{mk}$ is set equal to FALSE.*

When xCb>>Log2ParMrgLevel is equal to xNbB$_k$>>Log2ParMrgLevel and yCb>>Log2ParMrgLevel is equal to yNbB$_k$>>Log2ParMrgLevel, [[availableB$_k$ is set equal to FALSE.]]
*the variables availableB$_k$ and availableB$_{mk}$ are derived as follows:*
*availableB$_k$ is set equal to FALSE.*
*The derivation process for neighbouring block availability as specified in clause 6.4.4 is invoked with the current luma location*

(xCurr, yCurr) set equal to (xCb, yCb), the
neighbouring luma location
(xNbB$_{mk}$, yNbB$_{mk}$),
checkPredModeY set equal to TRUE,
and cIdx set equal to 0 as inputs,
and the output is assigned
to the block availability flag availableB$_{mk}$.

When availableB$_k$ is equal to TRUE and MotionModelIdc[xNbB$_k$][yNbB$_k$] is greater than 0 and availableFlagB is equal to FALSE, the following applies:
The variable availableFlagB is set equal to TRUE, motionModelIdcB is set equal to MotionModelIdc[xNbB$_k$][yNbB$_k$], (xNb, yNb) is set equal to (CbPosX[0][xNbAB][yNbB$_k$], CbPosY[0][xNbB$_k$][yNbB$_k$]), nbW is set equal to CbWidth[0][xNbB$_k$][yNbB$_k$], nbH is set equal to CbHeight[0][xNbB$_k$][yNbB$_k$], numCpMv is set equal to MotionModelIdc[xNbB$_k$][yNbB$_k$ ]+1, and bcwIdxB is set equal to BcwIdx[xNbB$_k$][yNbB$_k$].

For X being replaced by either 0 or 1, the following applies:
When PredFlagLX[xNbB$_k$][yNbB$_k$] is equal to TRUE, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXB[cpIdx] with cpIdx=0 . . . numCpMv−1 as output.
The following assignments are made:

predFlagLXB=PredFlagLX[*x*NbB$_k$][*y*NbB$_k$]        (692)

refIdxLXB=RefIdxLX[*x*NbB$_k$][*y*NbB$_k$]        (693)

*When availableB$_{mk}$ is equal to TRUE and MotionModelIdc[ xNbB$_{mk}$ ][ yNbB$_{mk}$ ] is greater than 0 and availableFlagB is equal to FALSE, the following applies:*
*The variable availableFlagB is set equal to TRUE, motionModelIdcB is set equal to MotionModelIdc[ xNbB$_{mk}$ ][ yNbB$_{mk}$ ], (xNb, yNb) is set equal to (CbPosX[ 0 ][ xNbAB ][ yNbB$_k$ ], CbPosY[ 0 ][ xNbB$_{mk}$ ][ yNbB$_{mk}$ ]), nbW is set equal to cbWidth[ 0 ][ xNbB$_{mk}$ ][ yNbB$_{mk}$ ], nbH is set equal to CbHeight[ 0 ][ xNbB$_{mk}$ ][ yNbB$_{mk}$ ], numCpMv is set equal to MotionModelIdc[ xNbB$_{mk}$ ][ yNbB$_{mk}$ ] + 1, and bcwIdxB is set equal to BcwIdx[ xNbB$_{mk}$ ][ yNbB$_{mk}$ ].*
*For X being replaced by either 0 or 1, the following applies:*
*When PredFlagLX [ xNbB$_{mk}$ ][ yNbB$_{mk}$ ] is equal to TRUE, the derivation process for luma affine control point motion vectors from a neighbouring block as specified in clause 8.5.5.5 is invoked with the luma coding block location (xCb, yCb), the luma coding block width and height*

(cbWidth, cbHeight),
the neighbouring luma
coding block location (xNb, yNb),
the neighbouring luma
coding block width and
height (nbW, nbH), and the number
of control point motion
vectors numCpMv as
input, the control point motion vector
predictor candidates
cpMvLXB[ cpIdx ] with
cpIdx = 0 .. numCpMv - 1 as output.
*The following assignments are made:*
*predFlagLXB = PredFlag*
*LX[ xNbB$_{mk}$ ][ yNbB$_{mk}$ ] (xxx)*
*refIdxLXB = RefIdxLX[ xNbB$_{mk}$ ][ yNbB$_{mk}$ ]*
*(xxx)*

5. When sps_affine_enabled_flag is equal to 1, the following applies:
The derivation process for neighbouring block availability as specified in clause 6.4.4 is invoked with the current luma location (xCurr, yCurr) set equal to (xCb, yCb), the neighbouring luma location (xNbA$_2$, yNbA$_2$), checkPredModeY set equal to TRUE, and cIdx set equal to 0 as inputs, and the output is assigned to the block availability flag availableA$_2$.
*The availableA$_{m2}$ is set equal to FALSE.*
When xCb>>Log2ParMrgLevel is equal to xNbA$_2$>>Log2ParMrgLevel and yCb>>Log2ParMrgLevel is equal to yNbA$_2$>>Log2ParMrgLevel, [[availableA$_2$ is set equal to FALSE.]] *the variables availableA$_2$ and availableA$_{m2}$ are derived as follows:*
*availableA$_2$ is set equal to FALSE.*
*The derivation process for neighbouring*
*block availability as specified in*
*clause 6.4.4 is invoked with the*
*current luma location*
*(xCurr, yCurr) set equal to*
*(xCb, yCb), the neighbouring luma*
*location (xNbA$_{m2}$, yNbA$_{m2}$),*
*checkPredModeY*
*set equal to TRUE, and cIdx set equal*
*to 0 as inputs, and the output is assigned to*
*the block availability flag availableA$_{m2}$.*
The derivation process for neighbouring block availability as specified in clause 6.4.4 is invoked with the current luma location (xCurr, yCurr) set equal to (xCb, yCb), the neighbouring luma location (xNbB$_3$, yNbB$_3$), checkPredModeY set equal to TRUE, and cIdx set equal to 0 as inputs, and the output is assigned to the block availability flag availableB$_3$.
*The availableB$_{m3}$ is set equal to FALSE.*
When xCb>>Log2ParMrgLevel is equal to xNbB$_3$>>Log2ParMrgLevel and yCb>>Log2ParMrgLevel is equal to yNbB$_3$>>Log2ParMrgLevel, [[availableB$_3$ is set equal to FALSE.]]*the variables availableB$_3$ and availableB$_{m3}$ are derived as follows:*
*availableB$_3$ is set equal to FALSE.*
*The derivation process for neighbouring*
*block availability as specified in*
*clause 6.4.4 is invoked with the*
*current luma location*
*(xCurr, yCurr) set equal to*
*(xCb, yCb), the neighbouring luma*
*location (xNbB$_{m3}$, yNbB$_{m3}$),*

*checkPredModeY*
*set equal to TRUE, and cIdx set*
*equal to 0 as inputs,*
*and the output is assigned to*
*the block availability flag availableB$_{m1}$.*

The derivation process for constructed affine control point motion vector merging candidates as specified in clause 8.5.5.6 is invoked with the luma coding block location (xCb, yCb), the luma coding block width and height (cbWidth, cbHeight), the availability flags (availableA$_0$||*availableA$_{m0}$*), (availableA$_1$||*availableA$_{m1}$*), (availableA$_2$||*availableA$_{m2}$*), (availableB$_0$||*availableB$_{m0}$*), (availableB$_1$||*availableB$_{m1}$*), (availableB$_2$||*availableB$_{m2}$*), (availableB$_3$||*availableB$_{m3}$*) as inputs, and the availability flags availableFlagConstK, the reference indices refIdxLXConstK, prediction list utilization flags predFlagLXConstK, motion model indices motionModelIdcConstK, bi-prediction weight indices bcwIdxConstK and cpMvpLXConstK[cpIdx] with X being 0 or 1, K=1 . . . 6, cpIdx=0 . . . 2 as outputs.

. . .

5.7 Embodiment 7

The working draft may be changed as below.
8.5.5.2 Derivation Process for Motion Vectors and Reference Indices in Subblock Merge Mode
. . .
The variables numSbColX, numSbColY and the subblock merging candidate list, subblockMergeCandList are derived by the following ordered steps:
1. When sps_sbtmvp_enabled_flag is equal to 1, the following applies:
   For the derivation of availableFlagA$_1$, refIdxLXA$_1$, predFlagLXA$_1$ and mvLXA$_1$ the following applies:
   The luma location (xNbA$_1$, yNbA$_1$) inside the neighbouring luma coding block is set equal to (xCb−1, yCb+cbHeight−1).
   The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.
   *The availableA$_{m1}$ is set equal to FALSE.*
   When xCb>>Log2ParMrgLevel is equal to xNbA$_1$>>Log2ParMrgLevel and yCb>>Log2ParMrgLevel is equal to yNbA$_1$>>Log2ParMrgLevel, [[availableA$_1$ is set equal to FALSE.]]
   *the variables availableA$_1$ and*
   *availableA$_{m1}$ are derived as follows:*
   *availableA$_1$ is set equal to FALSE.*
   *The luma location (xNbB$_{m1}$,yNbB$_{m1}$)*
   *inside the neighbouring*
   *luma coding block is set equal to*
   *((xCb >> Log2ParMrgLevel) <<*
   *Log2ParMrgLevel - 1, yCb + cbHeight - 1 ).*
   *The derivation process for*
   *neighbouring block*
   *availability as specified in*
   *clause 6.4.4 is invoked with the*
   *current luma location*
   *(xCurr, yCurr) set equal to*
   *(xCb, yCb), the neighbouring luma*
   *location (xNbA$_{m1}$, yNbA$_{m1}$),*
   *checkPredModeY*
   *set equal to TRUE, and cIdx set*
   *equal to 0 as inputs,*
   *and the output is assigned to*
   *the block availability flag availableA$_{m1}$.*

The variables availableFlagA$_1$, refIdxLXA$_1$, predFlagLXA$_1$ and mvLXA$_1$ are derived as follows:
If availableA$_1$ is equal to FALSE and availableA$_{m1}$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and bcwIdxA$_1$ is set equal to 0.
*Otherwise, if availableA$_{m1}$ is equal to*
*TRUE, availableFlagA$_1$*
*is set equal to 1 and*
*the following assignments are made:*
*mvLXA$_1$ = MvLX[ xNbA$_{m1}$ ][ yNbA$_{m1}$ ]   (xxx)*
*refIdxLXA$_1$ = RefIdxLX[ xNbA$_{m1}$ ][ yNbA$_{m1}$ ]*
*(xxx)*
*predFlagLXA$_1$ = PredFlag*
*LX[ xNbA$_{m1}$ ][ yNbA$_{m1}$ ]   (xxx)*
Otherwise, availableFlagA$_1$ is set equal to 1 and the following assignments are made:

mvLXA$_1$=MvLX[xNbA$_1$][yNbA$_1$]   (680)

refIdxLXA$_1$=RefIdxLX[xNbA$_1$][yNbA$_1$]   (681)

predFlagLXA$_1$=PredFlagLX[xNbA$_1$][yNbA$_1$]   (682)

. . .

2. When sps_affine_enabled_flag is equal to 1, the sample locations (xNbA$_0$, yNbA$_0$) (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$), and (xNbB$_3$, yNbB$_3$) are derived as follows:

(xNbA$_0$,yNbA$_0$)=(xCb−1,yCb+cbHeight)   (683)

(xNbA$_1$,yNbA$_1$)=(xCb−1,yCb+cbHeight−1)   (684)

(xNbA$_2$,yNbA$_2$)=(xCb−1,yCb)   (685)

(xNbB$_0$,yNbB$_0$)=(xCb+cbWidth,yCb−1)   (686)

(xNbB$_1$,yNbB$_1$)=(xCb+cbWidth−1,yCb−1)   (687)

(xNbB$_2$,yNbB$_2$)=(xCb−1,yCb−1)   (688)

(xNbB$_3$,yNbB$_3$)=(xCb,yCb−1)   (689)

*( xNbA$_{m0}$, yNbA$_{m0}$ ) =*
  *( ( xCb >> Log2ParMrgLevel ) <<*
  *Log2ParMrgLevel - 1, yCb + cbHeight )   (xxx)*
*( xNbA$_{m1}$, yNbA$_{m1}$ ) =*
  *( ( xCb >> Log2ParMrgLevel ) <<*
  *Log2ParMrgLevel - 1,  yCb + cbHeight - 1)(xxx)*
*( xNbA$_{m2}$, yNbA$_{m2}$ ) =*
  *( ( xCb >> Log2ParMrgLevel ) <<*
  *Log2ParMrgLevel - 1,*
  *(yCb >> Log2ParMrgLevel ) <<*
  *Log2ParMrgLevel ) (xxx)*
*( xNbB$_{m0}$, yNbB$_{m0}$ ) =*
  *(( xCb + cbWidth , (yCb > > Log2ParMrgLevel )*
  *<< Log2ParMrgLevel - 1 )   (xxx)*
*( xNbB$_{m1}$, yNbN$_{m1}$, ) =*
  *( xCb + cbWidth - 1, (yCb > > Log2ParMrgLevel )*
  *<< Log2ParMrgLevel - 1 )   (xxx)*

( xNbB_{m2}, yNbB_{m2} ) =
  ( ( xCB >> Log2ParMrgLevel ) <<
    Log2ParMrgLevel - 1,
  (yCb >> Log2ParMrgLevel ) <<
    Log2ParMrgLevel - 1 )         (xxx)
( xNbB_{m3}, yNbB_{m3} ) =
  ( ( xCb >> Log2ParMrgLevel ) <<
    Log2ParMrgLevel,
  (yCb >> Log2ParMrgLevel ) << Log2
    ParMrgLevel - 1 ) (xxx)

3. When sps_affine_enabled_flag is equal to 1, the variable availableFlagA is set equal to FALSE and the following applies for (xNbA_{k}, yNbA_{k}) from (xNbA_{0}, yNbA_{0}) to (xNbA_{1}, yNbA_{1}):

The derivation process for neighbouring block availability as specified in clause 6.4.4 is invoked with the current luma location (xCurr, yCurr) set equal to (xCb, yCb), the neighbouring luma location (xNbA_{k}, yNbA_{k}), checkPredModeY set equal to TRUE, and cIdx set equal to 0 as inputs, and the output is assigned to the block availability flag availableA_{k}.
  *The availableA_{mk} is set equal to FALSE.*
  When xCb>>Log2ParMrgLevel is equal to xNbA_{k}>>Log2ParMrgLevel and yCb>>Log2ParMrgLevel is equal to yNbA_{k}>>Log2ParMrgLevel, [[availableA_{k} is set equal to FALSE.]] *]the variables availableA_{k} and availableA_{mk} are derived as follows:*
  *availableA_{k} is set equal to FALSE.*
  *The derivation process for neighbouring*
    *block availability as specified in clause 6.4.4 is*
    *invoked with the current luma*
    *location ( xCurr, yCurr ) set*
    *equal to ( xCb, yCb ), the*
    *neighbouring luma location ( xNbA_{mk}, yNbA_{mk} ),*
    *checkPredModeY set equal to TRUE,*
    *and cIdx set equal to 0 as inputs,*
    *and the output is assigned*
    *to the block availability flag  availableA_{mk}.*
  When availableA_{k} is equal to TRUE and MotionModelIdc[xNbA_{k}][yNbA_{k}] is greater than 0 and availableFlagA is equal to FALSE, the following applies:
    The variable availableFlagA is set equal to TRUE, motionModelIdcA is set equal to MotionModelIdc [xNbA_{k}][yNbA_{k}], (xNb, yNb) is set equal to (CbPosX[0][xNbA_{k}][yNbA_{k}], CbPosY[0][xNbA_{k}][yNbA_{k}]), nbW is set equal to CbWidth[0][xNbA_{k}][yNbA_{k}], nbH is set equal to CbHeight[0][xNbA_{k}][yNbA_{k}], numCpMv is set equal to MotionModelIdc[xNbA_{k}][yNbA_{k}]+1, and bcwIdxA is set equal to BcwIdx[xNbA_{k}][yNbA_{k}].
    For X being replaced by either 0 or 1, the following applies:
      When PredFlagLX[xNbA_{k}][yNbA_{k}] is equal to 1, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXA[cpIdx] with cpIdx=0 ... numCpMv-1 as output.

The following assignments are made:

predFlagLXA=PredFlagLX[xNbA_{k}][yNbA_{k}]         (690)

refIdxLXA=RefIdxLX[xNbA_{k}][yNbA_{k}]         (691)

*When availableA_{mk} is equal to TRUE and*
  *MotionModelIdc[ xNbA_{mk} ][ yNbA_{mk} ]  is greater*
  *than 0 and availableFlagA is equal*
  *to FALSE, the following applies:*
  *The variable availableFlagA is set equal to*
    *TRUE, motionModelIdcA is set equal to*
    *MotionModelIdc[ xNbA_{mk} ][ yNbA_{mk}],*
    *( xNb, yNb ) is set equal to*
    *( CbPosX[ 0 ][ xNbA_{mk} ][ yNbA_{mk} ], CbPosY[ 0 ]*
    *[ xNbA_{mk} ][ yNbA_{mk}] ), nbW is set equal*
    *to       CbWidth[ 0 ][ xNbA_{mk} ][ yNbA_{mk} ],*
    *nbH  is  set  equal  to*
    *CbHeight[ 0 ][ xNbA_{mk} ][ yNbA_{mk}],*
    *numCpMv  is  set  equal  to*
    *MotionModelIdc[ xNbA_{mk} ][ yNbA_{mk} + 1,]*
    *and bcwIdxA is set equal to*
    *BcwIdx[ xNbA_{mk} ][ yNbA_{mk} ].*
  *For X being replaced by either 0*
    *or 1, the following applies:*
    *When PredFlagLX[ xNbA_{mk} ][ yNbA_{mk} ]*
      *is equal to 1, the derivation process for*
      *luma affine control point*
      *motion vectors from a*
      *neighbouring block as specified in*
      *clause 8.5.5.5 is invoked with*
      *the luma coding block*
      *location ( xCb, yCb ), the luma*
      *coding block width and height*
      *(cbWidth, cbHeight),*
      *the neighbouring luma coding*
      *block location ( xNb, yNb ),*
      *the neighbouring luma coding*
      *block width and height*
      *(nbW, nbH), and the number of*
      *control point motion vectors*
      *numCpMv as input, the*
      *control point motion vector*
      *predictor candidates*
      *cpMvLXA[ cpIdx ] with*
      *cpIdx = 0 .. numCpMv - 1 as output.*
    *The following assignments are made:*
      *predFlagLXA = PredFlagLX*
        *[ xNbA_{mk} ][ yNbA_{mk} ]   (xxx)*
      *refIdxLXA = RefIdxLX [ xNbA_{mk} ][ yNbA_{mk} ]*
        *(xxx)*

4. When sps_affine_enabled_flag is equal to 1, the variable availableFlagB is set equal to FALSE and the following applies for (xNbB_{k}, yNbB_{k}) from (xNbB_{0}, yNbB_{0}) to (xNbB_{2}, yNbB_{2}):

The derivation process for neighbouring block availability as specified in clause 6.4.4 is invoked with the current luma location (xCurr, yCurr) set equal to (xCb, yCb), the neighbouring luma location (xNbB_{k}, yNbB_{k}), checkPredModeY set equal to TRUE, and cIdx set equal to 0 as inputs, and the output is assigned to the block availability flag availableB_{k}.
  *The availableB_{mk} is set equal to FALSE.*
  When xCb>>Log2ParMrgLevel is equal to xNbB_{k}>>Log2ParMrgLevel and yCb>>Log2ParMrgLevel is equal to yNbB_{k}>>Log2ParMrgLevel, [[availableB_{k} is set equal to FALSE.]] *the variables availableB$_k$ and availableB$_{mk}$ are derived as follows:*
*availableB$_k$ is set equal to FALSE.*
*The derivation process for neighbouring block availability as specified in clause 6.4.4 is invoked with the current luma location ( xCurr, yCurr ) set equal to ( xCb, yCb ), the neighbouring luma location ( xNbB$_{mk}$, yNbB$_{mk}$ ), checkPredModeY set equal to TRUE, and cIdx set equal to 0 as inputs, and the output is assigned to the block availability flag availableB$_{mk}$.*

When availableB$_k$ is equal to TRUE and MotionModelIdc[xNbB$_k$][yNbB$_k$] is greater than 0 and availableFlagB is equal to FALSE, the following applies:
The variable availableFlagB is set equal to TRUE, motionModelIdcB is set equal to MotionModelIdc [xNbB$_k$][yNbB$_k$], (xNb, yNb) is set equal to (CbPosX[0][xNbAB][yNbB$_k$], CbPosY[0][xNbB$_k$][yNbB$_k$]), nbW is set equal to CbWidth[0][xNbB$_k$][yNbB$_k$], nbH is set equal to CbHeight[0][xNbB$_k$][yNbB$_k$], numCpMv is set equal to MotionModelIdc[xNbB$_k$][yNbB$_k$ ]+1, and bcwIdxB is set equal to BcwIdx[xNbB$_k$][yNbB$_k$].

For X being replaced by either 0 or 1, the following applies:
When PredFlagLX[xNbB$_k$][yNbB$_k$] is equal to TRUE, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXB[cpIdx] with cpIdx=0 . . . numCpMv−1 as output.
The following assignments are made:

predFlagLXB=PredFlagLX[xNbB$_k$][yNbB$_k$]       (692)

refIdxLXB=RefIdxLX[xNbB$_k$][yNbB$_k$]       (693)

*When availableB$_{mk}$ is equal to TRUE and MotionModeIdc[ xNbB$_{mk}$ ][ yNbB$_{mk}$ ] is greater than 0 and availableFlagB is equal to FALSE, the following applies:*
*The variable availableFlagB is set equal to TRUE, motionModelIdcB is set equal to MotionModelIdc[ xNbB$_{mk}$ ][ yNbB$_{mk}$ ], ( xNb, yNb ) is set equal to ( CbPosX[ 0 ][ xNbAB ][ yNbB$_k$ ], CbPosY[ 0 ][ xNbB$_{mk}$ ][ yNbB$_{mk}$ ] ), nbW is set equal to CbWidth [ 0 ][ xNbB$_{mk}$ ][ yNbB$_{mk}$ ], nbH is set equal to CbHeight[ 0 ][ xNbB$_{mk}$ ][ yNbB$_{mk}$ ], numCpMv is set equal to MotionModelIdc[ x Nb$_{mk}$ ][ yNbB$_{mk}$ ] + 1, and bcwIdxB is set equal to BcwIdx[ xNbB$_{mk}$ ][ yNbB$_{mk}$ ].*

*For X being replaced by either 0 or 1, the following applies:*
*When PredFlagLX[ xNbB$_{mk}$ ][ yNbB$_{mk}$ ] is equal to TRUE, the derivation process for luma affine control point motion vectors from a neighbouring block as specified in clause 8.5.5.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXB[ cpIdx ] with cpIdx = 0 .. numCpMv - 1 as output.*

*The following assignments are made:*
*predFlagLXB = PredFlag LX[ xNbB$_{mk}$ ][ yNbB$_{mk}$ ]       (xxx)*
*refIdxLXB = RefIdxLX[ xNbB$_{mk}$ ][ yNbB$_{mk}$ ]       (xxx)*

5. When sps_affine_enabled_flag is equal to 1, the following applies:
The derivation process for neighbouring block availability as specified in clause 6.4.4 is invoked with the current luma location (xCurr, yCurr) set equal to (xCb, yCb), the neighbouring luma location (xNbA$_2$, yNbA$_2$), checkPredModeY set equal to TRUE, and cIdx set equal to 0 as inputs, and the output is assigned to the block availability flag availableA$_2$.
*The availableA$_{m2}$ is set equal to FALSE.*
When xCb>>Log2ParMrgLevel is equal to xNbA$_2$>>Log2ParMrgLevel and yCb>>Log2ParMrgLevel is equal to yNbA$_2$>>Log2ParMrgLevel, [[availableA$_2$ is set equal to FALSE.]] *the variables availableA$_2$ and availableA$_{m2}$ are derived as follows:*
*availableA$_2$ is set equal to FALSE*
*for neighbouring*
*The derivation process*
  *block availability as specified in clause 6.4.4 is invoked with the current luma location ( xCurr, yCurr ) set equal to ( xCb, yCb ), the neighbouring luma location ( xNbA$_{m2}$, yNbA$_{m2}$ ), checkPredModeY checkPredModeY equal to 0 as inputs, and the output is assigned to the block availability flag availableA$_{m2}$.*
The derivation process for neighbouring block availability as specified in clause 6.4.4 is invoked with the current luma location (xCurr, yCurr) set equal to (xCb, yCb), the neighbouring luma location (xNbB$_3$, yNbB$_3$), checkPredModeY set equal to TRUE, and cIdx set equal to 0 as inputs, and the output is assigned to the block availability flag availableB$_3$.
*The availableB$_{m3}$ is set equal to FALSE.*

When xCb>>Log2ParMrgLevel is equal to xNbB$_3$>>Log2ParMrgLevel and yCb>>Log2ParMrgLevel is equal to yNbB$_3$>>Log2ParMrgLevel, [[availableB$_3$ is set equal to FALSE.]] *the variables availableB$_3$ and availableB$_{m3}$ are derived as follows:*
  *availableB$_3$ is set equal to FALSE.*
  *The derivation process for neighbouring block availability as specified in clause 6.4.4 is invoked with the current luma location ( xCurr, yCurr ) set equal to ( xCb, yCb ), the neighbouring luma location ( xNbA$_{m3}$, yNbA$_{m3}$ ), checkPredModeY set equal to TRUE, and cIdx set equal to 0 as inputs, and the output is assigned to the block availability flag availableB$_{m3}$.*
The derivation process for constructed affine control point motion vector merging candidates as specified in clause 8.5.5.6 is invoked with the luma coding block location (xCb, yCb), the luma coding block width and height (cbWidth, cbHeight), the availability flags (availableA$_0$||*availableA$_{m0}$*), (availableA$_1$||*availableA$_{m1}$*), (availableA$_2$||*availableA$_{m2}$*), (availableB$_0$||*availableB$_{m0}$*), (availableB$_1$||*availableB$_{m1}$*), (availableB$_2$||*availableB$_{m2}$*), (availableB$_3$||*availableB$_{m3}$*) as inputs, and the availability flags availableFlagConstK, the reference indices refIdxLXConstK, prediction list utilization flags predFlagLXConstK, motion model indices motionModelIdcConstK, bi-prediction weight indices bcwIdxConstK and cpMvpLXConstK[cpIdx] with X being 0 or 1, K=1..6, cpIdx=0 . . . 2 as outputs.
. . .

5.8 Embodiment 8

The working draft may be changed as below.
6.4.2 Allowed Binary Split Process
. . .
The variable allowBtSplit is derived as follows:
  If one or more of the following conditions are true, allowBtSplit is set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and (cbWidth/SubWidthC)*(cbHeight/SubHeightC) is less than or equal to 16
    treeType is equal to DUAL_TREE_CHROMA and (cbWidth/SubWidthC) is equal to 4 and btSplit is equal to SPLIT_BT_VER
    treeType is equal to DUAL_TREE_CHROMA and modeType is equal to MODE_TYPE_INTRA
    cbWidth*cbHeight is equal to 32 and modeType is equal to MODE_TYPE_INTER
  Otherwise, if all of the following conditions are true, allowBtSplit is set equal to FALSE
    btSplit is equal to SPLIT_BT_VER
    y0+cbHeight is greater than pic_height_in_luma_samples
  Otherwise, if all of the following conditions are true, allowBtSplit is set equal to FALSE
    btSplit is equal to SPLIT_BT_VER
    cbHeight is greater than 64
    x0+cbWidth is greater than pic_width_in_luma_samples
  Otherwise, if all of the following conditions are true, allowBtSplit is set equal to FALSE
    btSplit is equal to SPLIT_BT_VER
    cbWidth is less than or equal to (1<<Log2ParMrgLevel)
    cbHeight is greater than (1<<Log2ParMrgLevel)
  Otherwise, if all of the following conditions are true, allowBtSplit is set equal to FALSE
    btSplit is equal to SPLIT_BT_HOR
    cbWidth is greater than 64
    y0+cbHeight is greater than pic_height_in_luma_samples
  Otherwise, if all of the following conditions are true, allowBtSplit is set equal to FALSE
    btSplit is equal to SPLIT_BT_HOR
    cbHeight is less than or equal to (1<<Log2ParMrgLevel)
    cbWidth is greater than (1<<Log2ParMrgLevel)
  Otherwise, if all of the following conditions are true, allowBtSplit is set equal to FALSE
    x0+cbWidth is greater than pic_width_in_luma_samples
    y0+cbHeight is greater than pic_height_in_luma_samples
    cbWidth is greater than minQtSize
  Otherwise, if all of the following conditions are true, allowBtSplit is set equal to FALSE
    btSplit is equal to SPLIT_BT_HOR
    x0+cbWidth is greater than pic_width_in_luma_samples
    y0+cbHeight is less than or equal to pic_height_in_luma_samples
  Otherwise, if all of the following conditions are true, allowBtSplit is set equal to FALSE:
    mttDepth is greater than 0
    partIdx is equal to 1
    MttSplitMode[x0][y0][mttDepth−1] is equal to parallelTtSplit
  Otherwise, if all of the following conditions are true, allowBtSplit is set equal to FALSE
    btSplit is equal to SPLIT_BT_VER
    cbWidth is less than or equal to 64
    cbHeight is greater than 64 *are true, allowBtSplit is*
  *Otherwise, if all of the following conditions*
    *are true, allowBtSplit is set equal to False*
    *btSplit is equal to SPLIT_BT_VER*
    *cbWidth is less than or equal to*
      *(1 << Log2ParMrgLevel)*
    *cbHeight is greater than (1 << Log2ParMrgLevel)*
  Otherwise, if all of the following conditions are true, allowBtSplit is set equal to FALSE
    btSplit is equal to SPLIT_BT_HOR
    cbWidth is greater than 64
    cbHeight is less than or equal to 64
  *Otherwise, if all of the following*
    *conditions are true, allow BtSplit*
    *is set equal to FALSE*
    *btSplit is equal to SPLIT_BT_HOR*
    *cbHeight is less than or equal to*
      *(1 << Log2ParMrgLevel)*
    *cbWidth is greater than (1 << Log2ParMrgLevel)*
  Otherwise, allowBtSplit is set equal to TRUE.
. . .

6.4.3 Allowed Ternary Split Process
. . .
The variable allowTtSplit is derived as follows:
  If one or more of the following conditions are true, allowTtSplit is set equal to FALSE:
    cbSize is less than or equal to 2*MinTtSizeY
    cbWidth is greater than Min(64, maxTtSize)
    cbHeight is greater than Min(64, maxTtSize)
    ttSplit is equal to SPLIT TT HOR,
      and cbWidth is larger than
      (1 << Log2ParMrgLevel) or
      cbHeight is larger than
      (1 << Log2ParMrgLevel), and cbHeight is less
      **than or equal to 2 * (1 << Log2ParMrgLevel)**
    ttSplit is equal to SPLIT_TT_VER,
      and cbWidth is larger than
      (1 << Log2ParMrgLevel) or
      cbHeight is larger than
      (1 << Log2ParMrgLevel),
      **and cbWidth is less than or equal to 2 * (1 << Log2ParMrgLevel)**
    mttDepth is greater than or equal to maxMttDepth
    x0+cbWidth is greater than pic_width_in_luma_samples
    y0+cbHeight is greater than pic_height_in_luma_samples
    treeType is equal to DUAL_TREE_CHROMA and (cbWidth/SubWidthC)*(cbHeight/SubHeightC) is less than or equal to 32
    treeType is equal to DUAL_TREE_CHROMA and (cbWidth/SubWidthC) is equal to 8 and ttSplit is equal to SPLIT_TT_VER
    treeType is equal to DUAL_TREE_CHROMA and modeType is equal to MODE_TYPE_INTRA
    cbWidth*cbHeight is equal to 64 and modeType is equal to MODE_TYPE_INTER
  Otherwise, allowTtSplit is set equal to TRUE.
. . .

5.9 Embodiment 9

The working draft may be changed as below.
6.4.2 Allowed Binary Split Process
. . .
The variable allowBtSplit is derived as follows:
  If one or more of the following conditions are true, allowBtSplit is set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and (cbWidth/SubWidthC)*(cbHeight/SubHeightC) is less than or equal to 16
    treeType is equal to DUAL_TREE_CHROMA and (cbWidth/SubWidthC) is equal to 4 and btSplit is equal to SPLIT_BT_VER
    treeType is equal to DUAL_TREE_CHROMA and modeType is equal to MODE_TYPE_INTRA
    cbWidth*cbHeight is equal to 32 and modeType is equal to MODE_TYPE_INTER
    btSplit is equal to SPLIT_BT_VER
      and cbWidth is less than
      or equal to (1 << Log2ParMrgLevel) and cbHeight is greater than
      (1 << Log2ParMrgLevel)
    btSplit is equal to SPLIT_BT_HOR
      and cbHeight is less
      than or equal to (1 << Log2ParMrgLevel) and cbWidth is greater than
      (1 << Log2ParMrgLevel)
  Otherwise, if all of the following conditions are true, allowBtSplit is set equal to FALSE
    btSplit is equal to SPLIT_BT_VER
    y0+cbHeight is greater than pic_height_in_luma_samples
  Otherwise, if all of the following conditions are true, allowBtSplit is set equal to FALSE
    btSplit is equal to SPLIT_BT_VER
    cbHeight is greater than 64
    x0+cbWidth is greater than pic_width_in_luma_samples
  Otherwise, if all of the following conditions are true, allowBtSplit is set equal to FALSE
    btSplit is equal to SPLIT_BT_VER
    cbWidth is less than or equal to (1<<Log2ParMrgLevel)
    cbHeight is greater than (1<<Log2ParMrgLevel)
  Otherwise, if all of the following conditions are true, allowBtSplit is set equal to FALSE
    btSplit is equal to SPLIT_BT_HOR
    cbWidth is greater than 64
    y0+cbHeight is greater than pic_height_in_luma_samples
  Otherwise, if all of the following conditions are true, allowBtSplit is set equal to FALSE
    btSplit is equal to SPLIT_BT_HOR
    cbHeight is less than or equal to (1<<Log2ParMrgLevel)
    cbWidth is greater than (1<<Log2ParMrgLevel)
  Otherwise, if all of the following conditions are true, allowBtSplit is set equal to FALSE
    x0+cbWidth is greater than pic_width_in_luma_samples
    y0+cbHeight is greater than pic_height_in_luma_samples
    cbWidth is greater than minQtSize
  Otherwise, if all of the following conditions are true, allowBtSplit is set equal to FALSE
    btSplit is equal to SPLIT_BT_HOR
    x0+cbWidth is greater than pic_width_in_luma_samples
    y0+cbHeight is less than or equal to pic_height_in_luma_samples
  Otherwise, if all of the following conditions are true, allowBtSplit is set equal to FALSE:
    mttDepth is greater than 0
    partIdx is equal to 1
    MttSplitMode[x0][y0][mttDepth−1] is equal to parallelTtSplit
  Otherwise, if all of the following conditions are true, allowBtSplit is set equal to FALSE
    btSplit is equal to SPLIT_BT_VER
    cbWidth is less than or equal to 64
    cbHeight is greater than 64
  Otherwise, if all of the following conditions are true, allowBtSplit is set equal to FALSE
    btSplit is equal to SPLIT_BT_HOR
    cbWidth is greater than 64
    cbHeight is less than or equal to 64
  Otherwise, allowBtSplit is set equal to TRUE.
. . .

6.4.3 Allowed Ternary Split Process
. . .

The variable allowTtSplit is derived as follows:
  If one or more of the following conditions are true, allowTtSplit is set equal to FALSE:
    cbSize is less than or equal to 2*MinTtSizeY
    cbWidth is greater than Min(64, maxTtSize)
    cbHeight is greater than Min(64, maxTtSize)
    **ttSplit is equal to SPLIT_TT_HOR, and cbWidth is larger than (1 << Log2ParMrgLevel) or cbHeight is larger than (1 << Log2ParMrgLevel), and cbHeight is less than or equal to 2 * (1 << Log2ParMrgLevel)**
    **ttSplit is equal to SPLIT TT VER, and cbWidth is larger than (1 << Log2ParMrgLevel) or cbHeight is larger than (1 << Log2ParMrgLevel), and cbWidth is less than or equal to 2 * (1 << Log2ParMrgLevel)**
    mttDepth is greater than or equal to maxMttDepth
    x0+cbWidth is greater than pic_width_in_luma_samples
    y0+cbHeight is greater than pic_height_in_luma_samples
    treeType is equal to DUAL_TREE_CHROMA and (cbWidth/SubWidthC)*(cbHeight/SubHeightC) is less than or equal to 32
    treeType is equal to DUAL_TREE_CHROMA and (cbWidth/SubWidthC) is equal to 8 and ttSplit is equal to SPLIT_TT_VER
    treeType is equal to DUAL_TREE_CHROMA and modeType is equal to MODE_TYPE_INTRA
    cbWidth*cbHeight is equal to 64 and modeType is equal to MODE_TYPE_INTER
  Otherwise, allowTtSplit is set equal to TRUE.

5.10 Embodiment 10

The working draft may be changed as below.
6.4.2 Allowed Binary Split Process
. . .

The variable allowBtSplit is derived as follows:
  If one or more of the following conditions are true, allowBtSplit is set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and (cbWidth/SubWidthC)*(cbHeight/SubHeightC) is less than or equal to 16
    treeType is equal to DUAL_TREE_CHROMA and (cbWidth/SubWidthC) is equal to 4 and btSplit is equal to SPLIT_BT_VER
    treeType is equal to DUAL_TREE_CHROMA and modeType is equal to MODE_TYPE_INTRA
    cbWidth*cbHeight is equal to 32 and modeType is equal to MODE_TYPE_INTER
    btSplit is equal to SPLIT_BT_VER and cbWidth is less than or equal to (1 << Log2ParMrgLevel) and cbHeight is greater than (1 << log2ParMrgLevel) and slice_type is not equal to I and x0 + cbWidth is less than or equal to pic_ width_in_luma_samples
    btSplit is equal to SPLIT_BT_HOR and cbHeight is less than or equal to (1 << Log2ParMrgLevel) and cbWidth is greater than (1 << Log2ParMrgLevel) and slice_type is not equal to I and y0 + cbHeight is less than or equal to pic_height_in_luma_samples
  Otherwise, if all of the following conditions are true, allowBtSplit is set equal to FALSE
    btSplit is equal to SPLIT_BT_VER
    y0+cbHeight is greater than pic_height_in_luma_samples
  Otherwise, if all of the following conditions are true, allowBtSplit is set equal to FALSE
    btSplit is equal to SPLIT_BT_VER
    cbHeight is greater than 64
    x0+cbWidth is greater than pic_width_in_luma_samples
  Otherwise, if all of the following conditions are true, allowBtSplit is set equal to FALSE
    btSplit is equal to SPLIT_BT_VER
    cbWidth is less than or equal to (1<<Log2ParMrgLevel)
    cbHeight is greater than (1<<Log2ParMrgLevel)
  Otherwise, if all of the following conditions are true, allowBtSplit is set equal to FALSE
    btSplit is equal to SPLIT_BT_HOR
    cbWidth is greater than 64
    y0+cbHeight is greater than pic_height_in_luma_samples
  Otherwise, if all of the following conditions are true, allowBtSplit is set equal to FALSE
    btSplit is equal to SPLIT_BT_HOR
    cbHeight is less than or equal to (1<<Log2ParMrgLevel)
    cbWidth is greater than (1<<Log2ParMrgLevel)
  Otherwise, if all of the following conditions are true, allowBtSplit is set equal to FALSE
    x0+cbWidth is greater than pic_width_in_luma_samples
    y0+cbHeight is greater than pic_height_in_luma_samples
    cbWidth is greater than minQtSize
  Otherwise, if all of the following conditions are true, allowBtSplit is set equal to FALSE
    btSplit is equal to SPLIT_BT_HOR
    x0+cbWidth is greater than pic_width_in_luma_samples
    y0+cbHeight is less than or equal to pic_height_in_luma_samples
  Otherwise, if all of the following conditions are true, allowBtSplit is set equal to FALSE:
    mttDepth is greater than 0
    partIdx is equal to 1
    MttSplitMode[x0][y0][mttDepth−1] is equal to parallelTtSplit
  Otherwise, if all of the following conditions are true, allowBtSplit is set equal to FALSE
    btSplit is equal to SPLIT_BT_VER
    cbWidth is less than or equal to 64
    cbHeight is greater than 64
  Otherwise, if all of the following conditions are true, allowBtSplit is set equal to FALSE btSplit is equal to SPLIT_BT_HOR
cbWidth is greater than 64
cbHeight is less than or equal to 64
Otherwise, allowBtSplit is set equal to TRUE.
. . .
6.4.3 Allowed Ternary Split Process
. . .
The variable allowTtSplit is derived as follows:
If one or more of the following conditions are true, allowTtSplit is set equal to FALSE:
cbSize is less than or equal to 2*MinTtSizeY
cbWidth is greater than Min(64, maxTtSize)
cbHeight is greater than Min(64, maxTtSize)
*ttSplit is equal to SPLIT_TT_HOR,*
  *and cbWidth is larger than*
  *(1 << Log2ParMrgLevel) or*
  *cbHeight is larger than*
  *(1 << Log2ParMrgLevel),*
  *and cbHeight is less than or equal to 2 * (1 << Log2ParMrgLevel),*
  *and slice_type is not equal to I*
*ttSplit is equal to SPLIT_TT_VER,*
  *and cbWidth is larger than*
  *(1 << Log2ParMrgLevel) or*
  *cbHeight is larger than (1 << Log2ParMrgLevel), and cbWidth*
  *is less than or equal to 2 * (1 << Log2ParMrgLevel),*
  *and slice_type is not equal to I*
mttDepth is greater than or equal to maxMttDepth
x0+cbWidth is greater than pic_width_in_luma_samples
y0+cbHeight is greater than pic_height_in_luma_samples
treeType is equal to DUAL_TREE_CHROMA and (cbWidth/SubWidthC)*(cbHeight/SubHeightC) is less than or equal to 32
treeType is equal to DUAL_TREE_CHROMA and (cbWidth/SubWidthC) is equal to 8 and ttSplit is equal to SPLIT_TT_VER
treeType is equal to DUAL_TREE_CHROMA and modeType is equal to MODE_TYPE_INTRA
cbWidth*cbHeight is equal to 64 and modeType is equal to MODE_TYPE_INTER
Otherwise, allowTtSplit is set equal to TRUE.
. . .

5.11 Embodiment 11

The working draft may be changed as below.
6.4.2 Allowed Binary Split Process
. . .
The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth
treeType is equal to DUAL_TREE_CHROMA and (cbWidth/SubWidthC)*(cbHeight/SubHeightC) is less than or equal to 16
treeType is equal to DUAL_TREE_CHROMA and (cbWidth/SubWidthC) is equal to 4 and btSplit is equal to SPLIT_BT_VER
treeType is equal to DUAL_TREE_CHROMA and modeType is equal to MODE_TYPE_INTRA
cbWidth*cbHeight is equal to 32 and modeType is equal to MODE_TYPE_INTER
*btSplit is equal to SPLIT_BT_VER*
  *and cbWidth is less than*
  *or equal to (1 <<*
  *Log2ParMrgLevel) and cbHeight*
  *is greater than (1 <<Log2ParMrgLevel)*
  *and slice_type is not*
  *equal to I and x0 + cbWidth is less*
  *than or equal to pic_width_in_luma_samples*
*btSplit is equal to SPLIT_BT_HOR*
  *and cbHeight is less than or equal to (1 <<*
  *Log2ParMrgLevel) and cbWidth is*
  *greater than (1 << Log2ParMrgLevel*
  *and slice_type is not*
  *equal to I and y0 + cbHeight is less*
  *than or equal to pic_height_in_luma_samples*
Otherwise, if all of the following conditions are true, allowBtSplit is set equal to FALSE
btSplit is equal to SPLIT_BT_VER
y0+cbHeight is greater than pic_height_in_luma_samples
Otherwise, if all of the following conditions are true, allowBtSplit is set equal to FALSE
btSplit is equal to SPLIT_BT_VER
cbHeight is greater than 64
x0+cbWidth is greater than pic_width_in_luma_samples
Otherwise, if all of the following conditions are true, allowBtSplit is set equal to FALSE
btSplit is equal to SPLIT_BT_VER
cbWidth is less than or equal to (1<<Log2ParMrgLevel)
cbHeight is greater than (1<<Log2ParMrgLevel)
Otherwise, if all of the following conditions are true, allowBtSplit is set equal to FALSE
btSplit is equal to SPLIT_BT_HOR
cbWidth is greater than 64
y0+cbHeight is greater than pic_height_in_luma_samples
Otherwise, if all of the following conditions are true, allowBtSplit is set equal to FALSE
btSplit is equal to SPLIT_BT_HOR
cbHeight is less than or equal to (1<<Log2ParMrgLevel)
cbWidth is greater than (1<<Log2ParMrgLevel)
Otherwise, if all of the following conditions are true, allowBtSplit is set equal to FALSE
x0+cbWidth is greater than pic_width_in_luma_samples
y0+cbHeight is greater than pic_height_in_luma_samples
cbWidth is greater than minQtSize
Otherwise, if all of the following conditions are true, allowBtSplit is set equal to FALSE
btSplit is equal to SPLIT_BT_HOR
x0+cbWidth is greater than pic_width_in_luma_samples
y0+cbHeight is less than or equal to pic_height_in_luma_samples
Otherwise, if all of the following conditions are true, allowBtSplit is set equal to FALSE:
mttDepth is greater than 0
partIdx is equal to 1
MttSplitMode[x0][y0][mttDepth−1] is equal to parallelTtSplit Otherwise, if all of the following conditions are true, allowBtSplit is set equal to FALSE
btSplit is equal to SPLIT_BT_VER
cbWidth is less than or equal to 64
cbHeight is greater than 64
Otherwise, if all of the following conditions are true, allowBtSplit is set equal to FALSE
btSplit is equal to SPLIT_BT_HOR
cbWidth is greater than 64
cbHeight is less than or equal to 64
Otherwise, allowBtSplit is set equal to TRUE.
. . .
6.4.3 Allowed Ternary Split Process
. . .
The variable allowTtSplit is derived as follows:
If one or more of the following conditions are true, allowTtSplit is set equal to FALSE:
cbSize is less than or equal to 2*MinTtSizeY
cbWidth is greater than Min(64, maxTtSize)
cbHeight is greater than Min(64, maxTtSize)
ttSplit is equal to SPLIT_TT_HOR,
and cbWidth is larger than
(1 << Log2ParMrgLevel) or
cbHeight is larger than (1 <<
Log2ParMrgLevel), and cbHeight
**is less than or equal to 2 * (1**
<< Log2ParMrgLevel), and slice_type
is not equal to I, and x0 +
cbWidth is less than or equal
to pic_width_in_luma_samples
ttSplit is equal to SPLIT_TT_VER,
and cbWidth is larger than
(1 << Log2ParMrgLevel) or
cbHeight is larger than ( <<
Log2ParMrgLevel), and cbWidth
**is less than or equal to 2 * (1**
<< Log2ParMrgLevel), and slice_
type is not equal to I, and x0 +
cbWidth is less than or equal
to pic_width_in_luma_samples
mttDepth is greater than or equal to maxMttDepth
x0+cbWidth is greater than pic_width_in_luma_samples
y0+cbHeight is greater than pic_height_in_luma_samples
treeType is equal to DUAL_TREE_CHROMA and (cbWidth/SubWidthC)*(cbHeight/SubHeightC) is less than or equal to 32
treeType is equal to DUAL_TREE_CHROMA and (cbWidth/SubWidthC) is equal to 8 and ttSplit is equal to SPLIT_TT_VER
treeType is equal to DUAL_TREE_CHROMA and modeType is equal to MODE_TYPE_INTRA
cbWidth*cbHeight is equal to 64 and modeType is equal to MODE_TYPE_INTER
Otherwise, allowTtSplit is set equal to TRUE.

Figure 27:
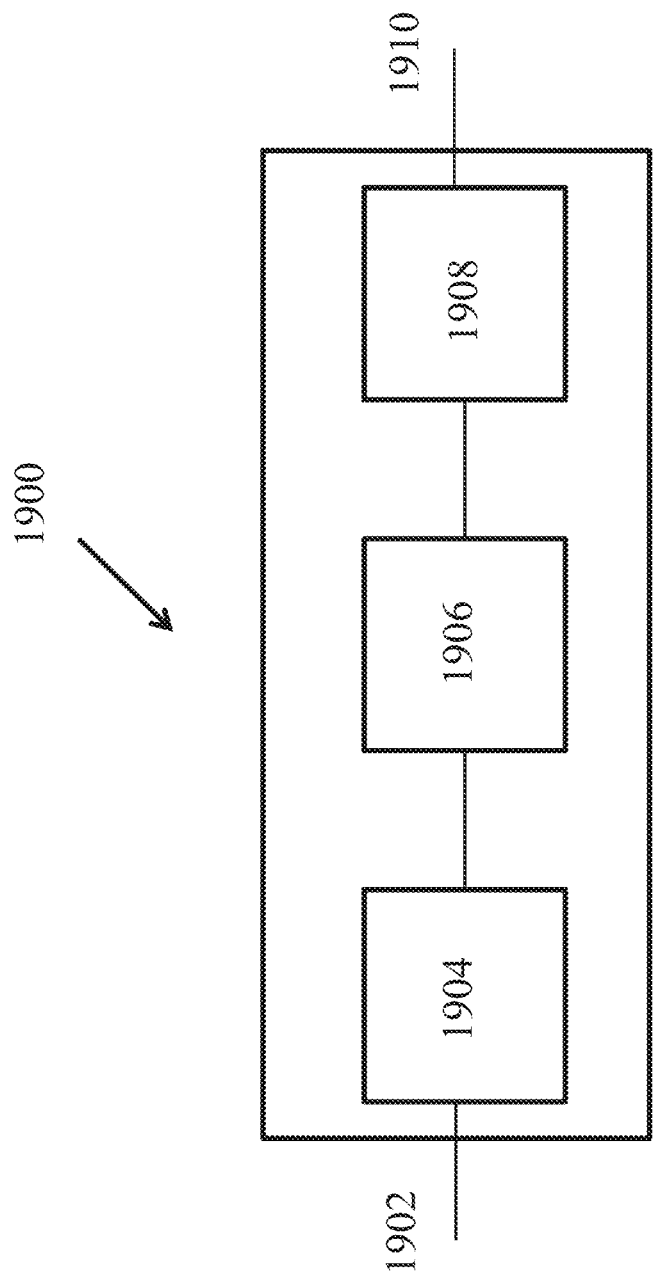
FIG. 27 is a block diagram of an example video processing system.

FIG. 27 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The techniques described in the present document may be embodied in various electronic devices such as mobile phones, laptops, smartphones or other devices that are capable of performing digital data processing and/or video display.

Figure 28:
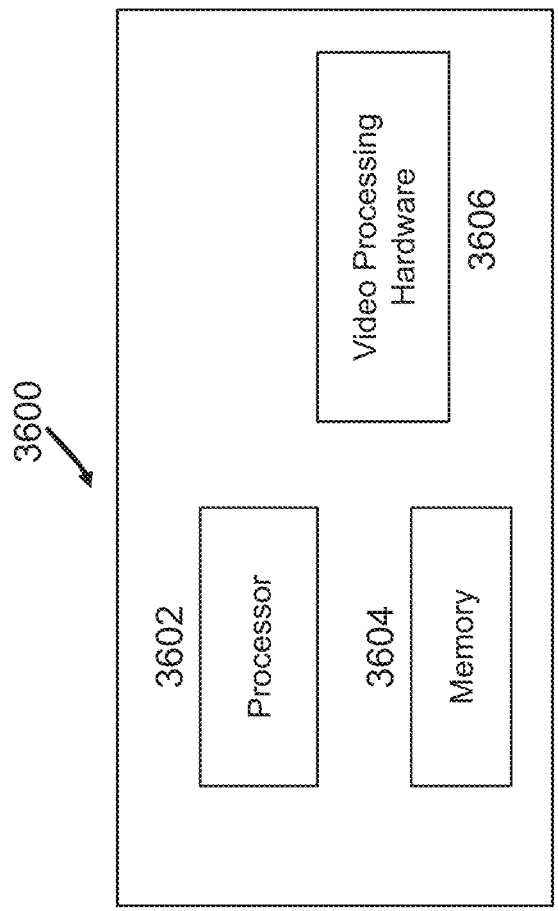
FIG. 28 is a block diagram of a video processing apparatus.

FIG. 28 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 30:
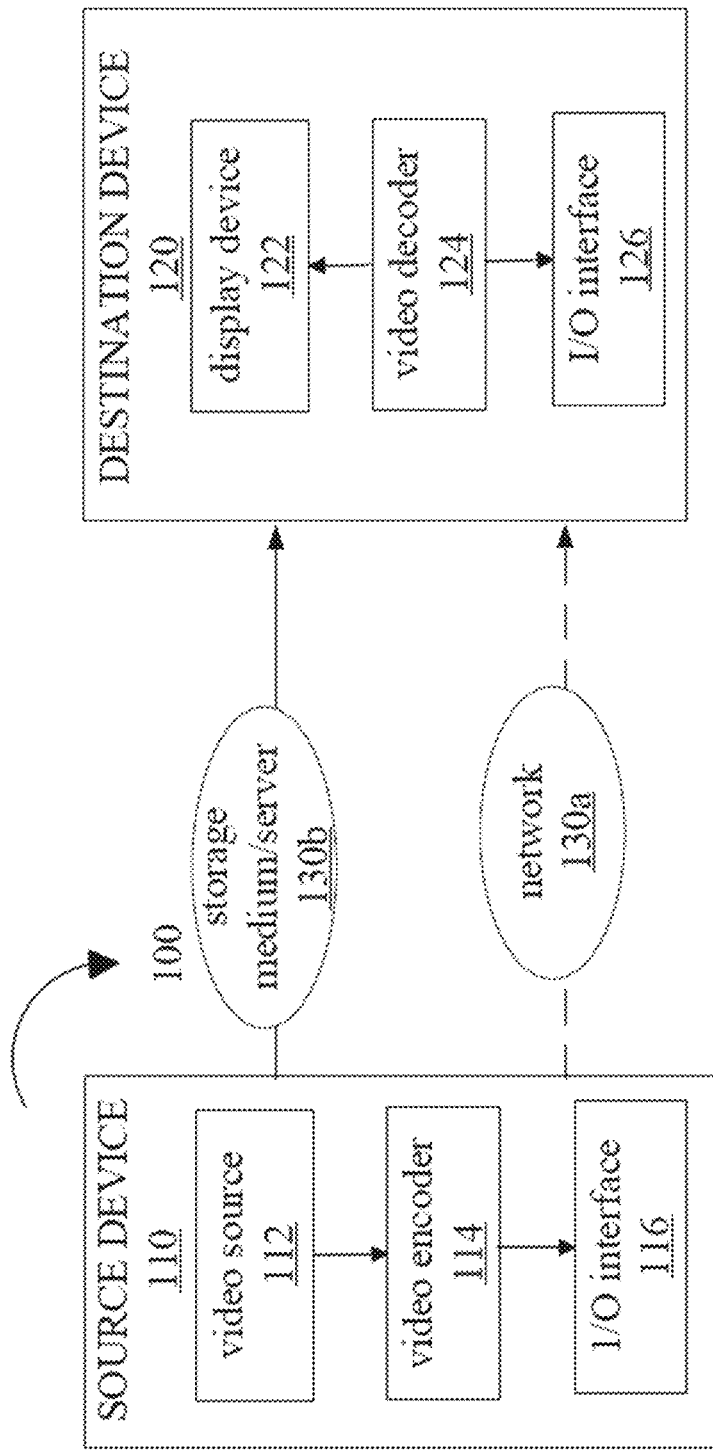
FIG. 30 is a block diagram that illustrates a video coding system in accordance with some embodiments of the present disclosure.

FIG. 30 is a block diagram that illustrates an example video coding system 100 that may utilize the techniques of this disclosure.

As shown in FIG. 30, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 31:
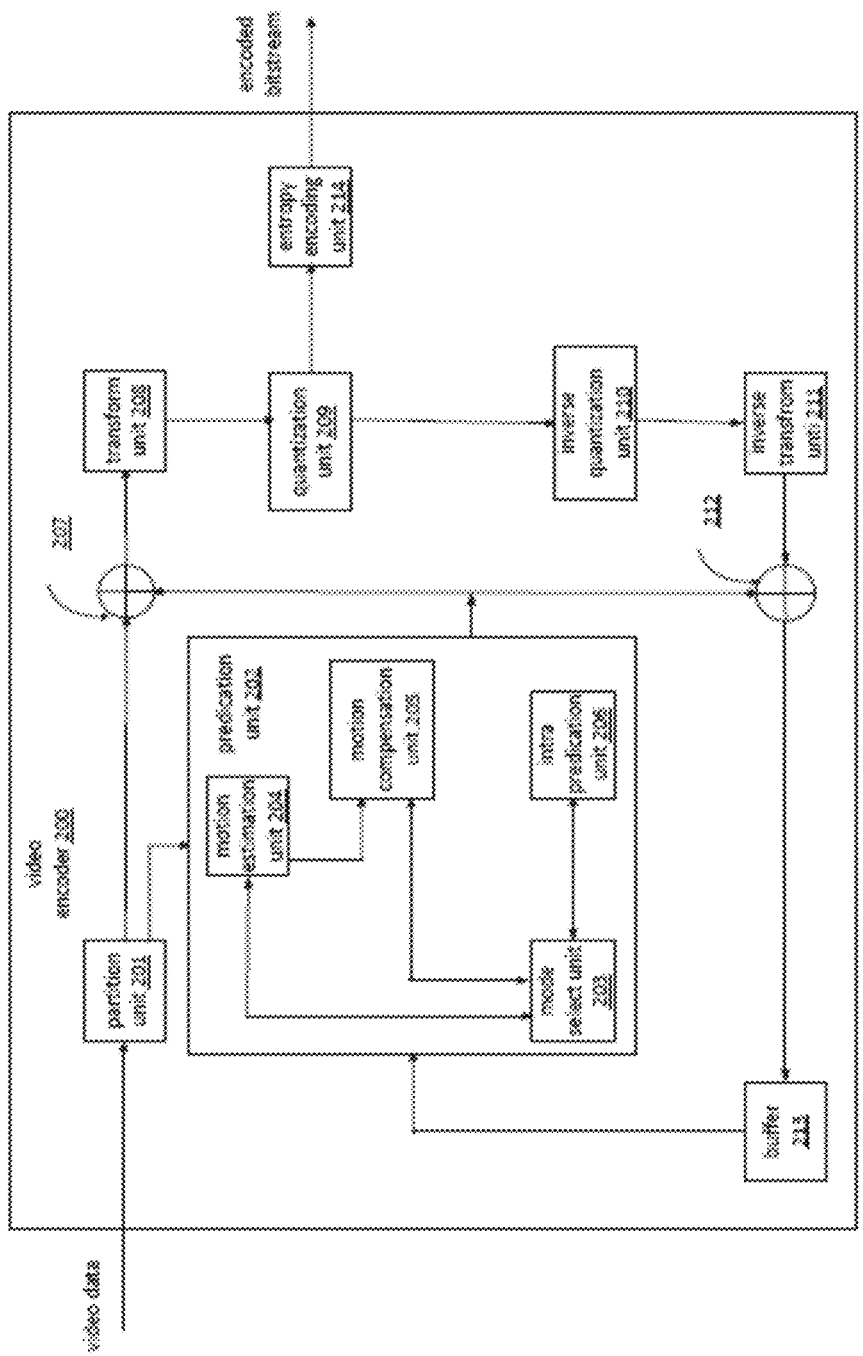
FIG. 31 is a block diagram that illustrates an encoder in accordance with some embodiments of the present disclosure.

FIG. 31 is a block diagram illustrating an example of video encoder 200, which may be video encoder 114 in the system 100 illustrated in FIG. 30.

Video encoder 200 may be configured to perform any or all of the techniques of this disclosure. In the example of FIG. 31, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 31 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 32:
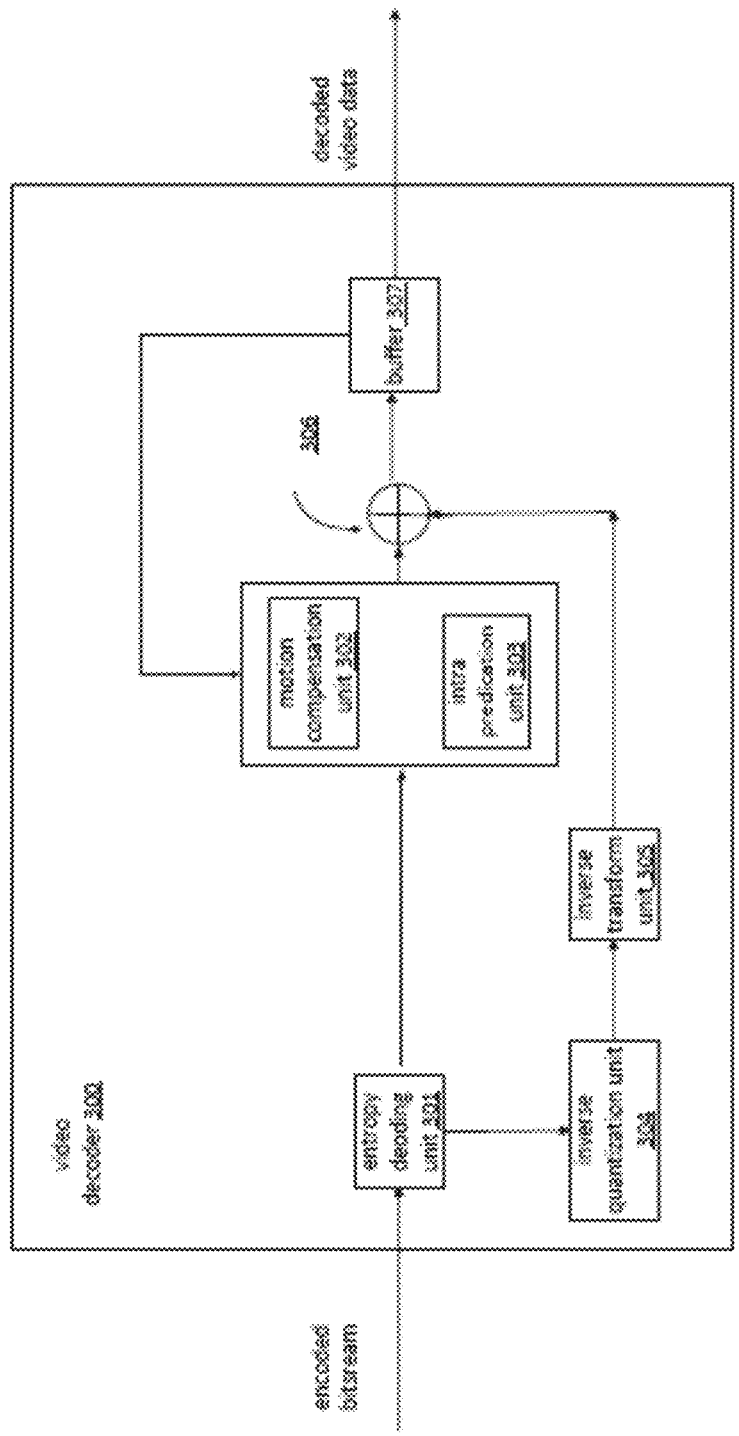
FIG. 32 is a block diagram that illustrates a decoder in accordance with some embodiments of the present disclosure.

FIG. 32 is a block diagram illustrating an example of video decoder 300 which may be video decoder 114 in the system 100 illustrated in FIG. 30.

The video decoder 300 maybe configured to perform any or all of the techniques of this disclosure. In the example of FIG. 32, the video decoder 300 includes a plurality of functional components. The techniques described in this disclosure may be shared among the various components of the video decoder 300. In some examples, a processor may be configured to perform any or all of the techniques described in this disclosure.

In the example of FIG. 32, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 31).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 29:
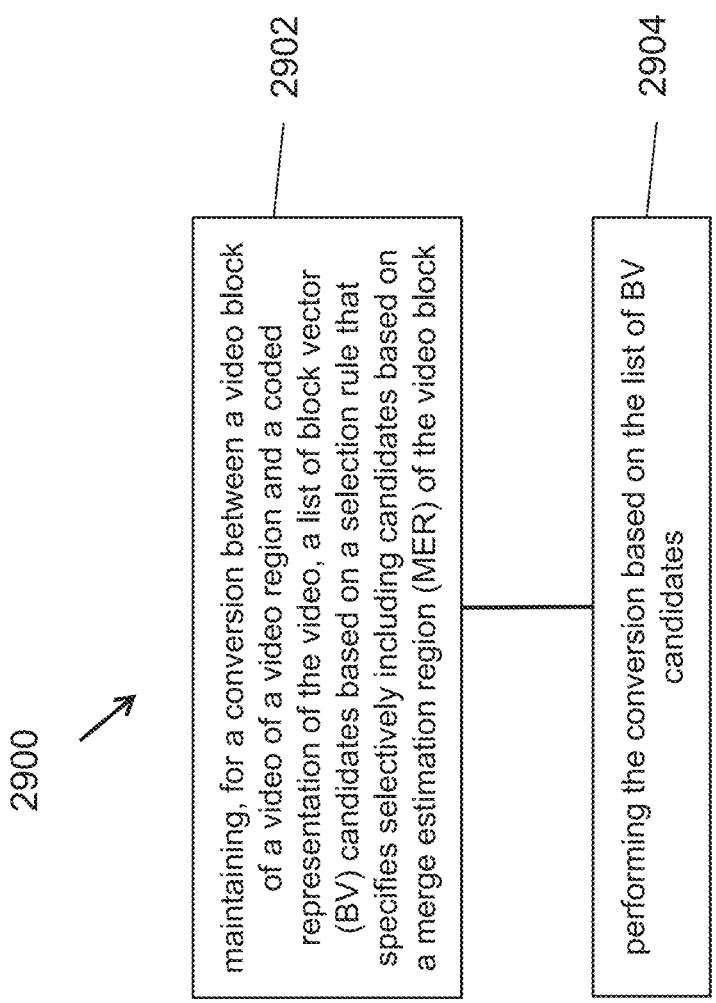
FIG. 29 is a flowchart for an example method of video processing.

1. A method of video processing (e.g., method 2900 depicted in FIG. 29), comprising: maintaining (2902), for a conversion between a video block of a video of a video region and a coded representation of the video, a list of block vector (BV) candidates based on a selection rule that specifies selectively including candidates based on a merge estimation region (MER) of the video block; and performing (2904) the conversion based on the list of BV candidates.

2. The method of solution 1, wherein the video block is coded using an intra block copy (IBC) mode.

3. The method of any of solutions 1-2, wherein the selection rule specifies to exclude candidates from blocks that are under the MER of the video block.

4. The method of any of solutions 1-3, wherein the selection rule specifies to include blocks that are outside the MER and/or candidates that are in a block vector history based motion vector prediction table and/or default block vector candidates.

The following solutions show example embodiments of techniques discussed in the previous section (e.g., items 2-3).

5. A method of video processing, comprising: determining, for a conversion between a video block of a video and a coded representation of the video; and processing a list of block vector history based candidates subject to a rule that the list is not updated in a first case that the video block is in a merge estimation region (MER) or in a second case that the list has been updated once before inside the MER.

6. The method of solution 5, wherein the rule specifies that the list is updated in a case that the video block is inside the MER only if a right-bottom corner of the video block coincides with a right-bottom corner of the MER.

The following solutions show example embodiments of techniques discussed in the previous section (e.g., item 4).

7. A method of video processing, comprising: maintaining, for a conversion between a video block of a video and a coded representation of the video, a list of motion candidates to which candidates from neighboring blocks of a merge estimation region (MER) of the video block are selectively added based a rule; and performing the conversion based on the list of motion candidates.

8. The method of solution 7, wherein the rule specifies that the neighboring blocks of the MER are checked in case that a neighboring block of the video block is not available for addition to the list.

9. The method of solution 7, wherein the rule specifies that the neighboring blocks of the MER are checked after all available neighboring blocks of the video block are checked.

10. The method of solution 7, wherein the rule specifies an order in which the neighboring blocks of the MER are checked after all history based motion vector prediction candidates are checked.

11. The method of any of solutions 7-10, wherein the rule specifies that at most X candidates from the neighboring blocks of the MER are added to the list, wherein X is an integer.

12. The method of solution 11, wherein X=2.

13. The method of solution 7, wherein the rule specifies a pre-determined order of the neighboring blocks of the MER for adding to the list.

14. The method of solution 7, wherein the rule specifies to check the neighboring blocks of the MER that are at adaptive positions such that at least two blocks are checked differently.

15. The method of solution 7, wherein the rule specifies to limit additions to the list to the neighboring block of the MER that satisfy a position condition or an availability condition.

16. The method of solution 15, wherein the position condition specifies to use motion candidates for at least one position outside the MER is used for adding to the list.

The following solutions show example embodiments of techniques discussed in the previous section (e.g., item 5).

17. A method of video processing, comprising: maintaining, for a conversion between a video block of a video and a coded representation of the video, a list of motion candidates whose size depends on whether the video block is under a merge estimation region (MER) according to a size rule; and performing the conversion based on the list of motion candidates.

18. The method of solution 17, wherein the size rule specifies that sizes of lists for blocks that are under the MER are different from sizes of lists for blocks that are not under the MER.

19. The method of any of solutions 17-18, wherein a field in the coded representation corresponds to a maximum size of the list.

20. The method of solution 19, wherein the field is included at a sequence level or a picture level or a slice level or a tile group level.

21. The method of any of solutions 19-20, wherein the field is included in a sequence header or a picture header or a sequence parameter set or a video parameter set or a picture parameter set or an adaptation parameter set or a slice header or a tile group header.

The following solutions show example embodiments of techniques discussed in the previous section (e.g., item 6).

22. A video processing method, comprising: determining, a position of a video block of a video with respect to a corresponding merge estimation region, and performing, by selecting a motion list construction process based on a rule that depends on the position, a conversion between the video block and a coded representation of the video.

23. The method of solution 22, wherein the position includes a completely inside position in which the video block is entirely inside the merge estimation region.

24. The method of solution 23, wherein the rule specifies to use different motion list construction processes for blocks that have the completely inside positions and remaining blocks.

The following solutions show example embodiments of techniques discussed in the previous section (e.g., item 7).

25. A video processing method, comprising: determining, for a video block of a video, a characteristic of a merge estimation region for the video block, and performing a conversion between the video block and a coded representation of the video, wherein a tree splitting mode used during the conversion depends on the characteristic according to a rule.

26. The method of solution 25, wherein the rule disables a horizontal binary tree splitting of the video block due to a width W of the video block being greater than R1 and/or a height H of the video block being less than or equal to R2, wherein R1 and R2 are rational numbers.

27. The method of solution 25, wherein the rule disables a horizontal binary tree splitting of the video block due to a width W of the video block being less than or equal to R1 and/or a height H of the video block being greater than R2, wherein R1 and R2 are rational numbers.

28. The method of any of solutions 1 to 27, wherein the conversion comprises encoding the video into the coded representation.

29. The method of any of solutions 1 to 27, wherein the conversion comprises decoding the coded representation to generate pixel values of the video.

30. A video decoding apparatus comprising a processor configured to implement a method recited in one or more of solutions 1 to 29.

31. A video encoding apparatus comprising a processor configured to implement a method recited in one or more of solutions 1 to 29.

32. A computer program product having computer code stored thereon, the code, when executed by a processor, causes the processor to implement a method recited in any of solutions 1 to 29.

33. A method, apparatus or system described in the present document.

Figure 34:
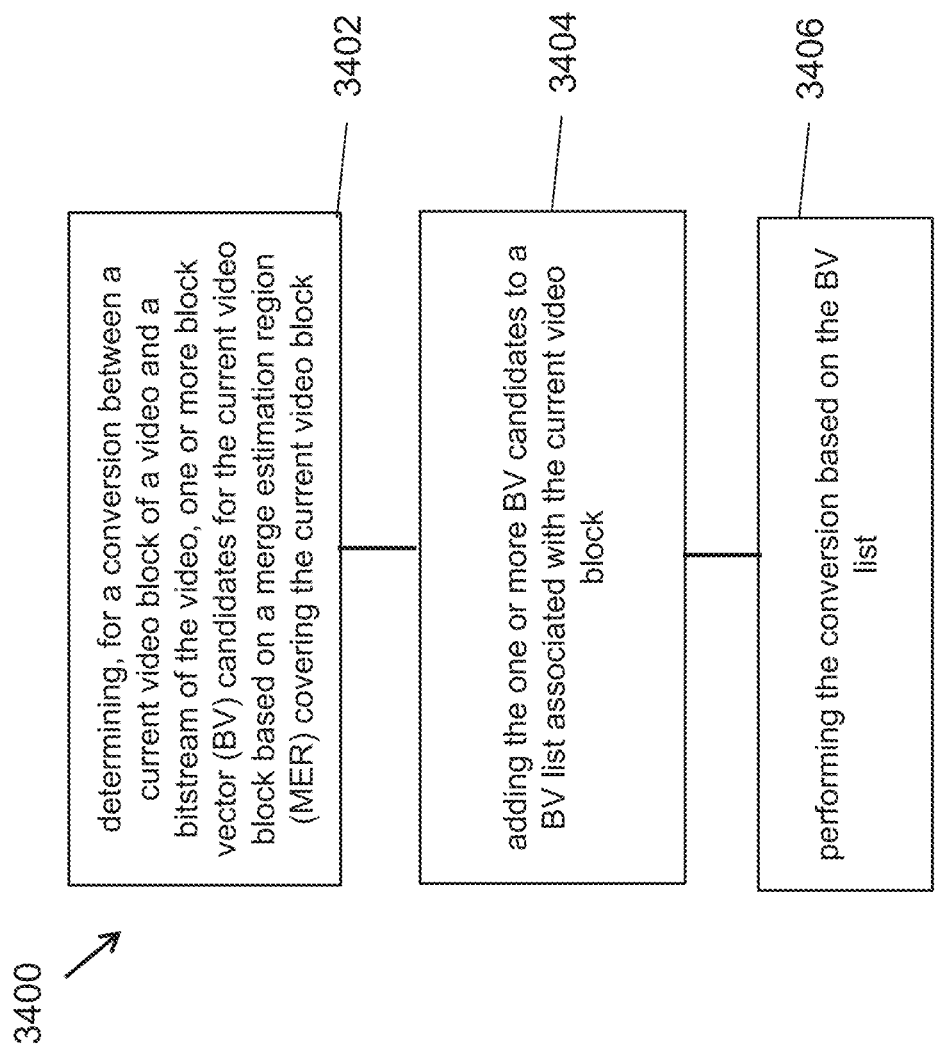
FIG. 34 is a flowchart for an example method of video processing.

FIG. 34 shows a flowchart of an example method for video processing. The method includes determining (3402), for a conversion between a current video block of a video and a bitstream of the video, one or more block vector (BV) candidates for the current video block based on a merge estimation region (MER) covering the current video block; adding (3404) the one or more BV candidates to a BV list associated with the current video block; and performing (3406) the conversion based on the BV list.

In some examples, the current video block is an intra block copy (IBC) coded block.

In some examples, BV candidates from spatial neighbouring adjacent or/and non-adjacent blocks that are under the MER are not added to the BV list.

In some examples, only BV candidates from spatial neighbouring adjacent or/and non-adjacent blocks that are outside the MER, or/and BV candidates from an IBC history-based motion vector prediction (HMVP) table, or/and default BV candidates are added to the BV list.

In some examples, the BV candidates from spatial neighbouring blocks are not be added to the BV list.

In some examples, the BV candidates from the IBC HMVP tables are added to the BV list in a predefined order or/and no pruning is performed when adding such BV candidates.

In some examples, the order is based on an ascending order or a descending order of entry index to the tables.

In some examples, the first N entries in the table are skipped.

In some examples, the last N entries in the table are skipped.

In some examples, an entry with invalid BV(s) is skipped.

In some examples, BV candidates from the IBC HMVP table are modified before being added to the BV list.

In some examples, an offset is added to a horizontal component or/and vertical component of a BV candidate from the IBC HMVP table.

In some examples, an HMVP candidate with invalid BV(s) is modified to a candidate with valid BV(s).

In some examples, one or more default BV candidates are added after or before one or more HMVP BV candidates, wherein the default BV candidate is defined as (BVx, BVy).

In some examples, BVx=0, BVy=0.

In some examples, BVx=−W, BVy=−H, wherein W and H are the width and height of the current video block.

In some examples, the BV list refers to an IBC AMVP list or/and an IBC merge list associated with the current video block.

In some examples, the IBC HMVP table is not updated after decoding a current video block under the MER.

In some examples, the IBC HMVP table is updated only once for video blocks inside the MER.

In some examples, the IBC HMVP table is only updated in a case that the current video block is not inside the MER, or a right-bottom corner of the current video block coincides with right-bottom corner of the MER.

Figure 35:
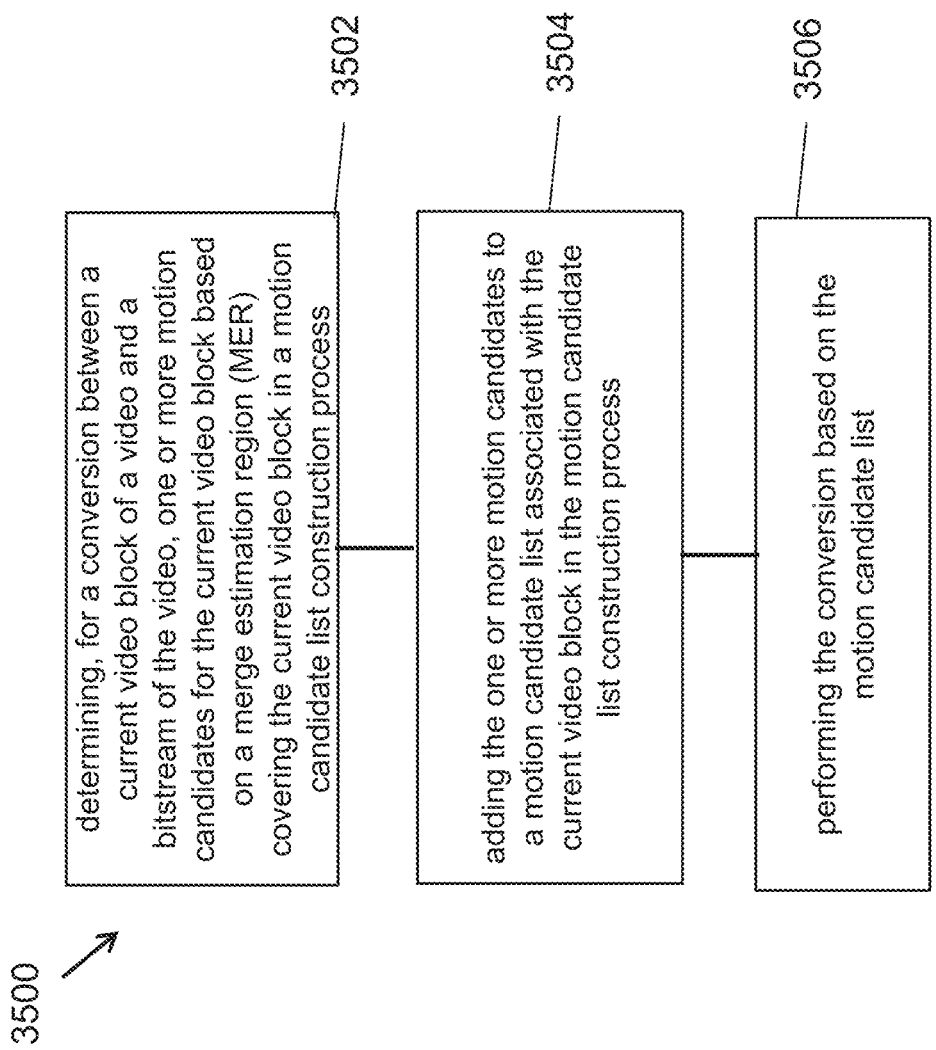
FIG. 35 is a flowchart for an example method of video processing.

FIG. 35 shows a flowchart of an example method for video processing. The method includes determining (3502), for a conversion between a current video block of a video and a bitstream of the video, one or more motion candidates for the current video block based on a merge estimation region (MER) covering the current video block in a motion candidate list construction process; adding (3504) the one or more motion candidates to a motion candidate list associated with the current video block in the motion candidate list construction process; and performing (3506) the conversion based on the motion candidate list.

In some examples, the motion candidate list includes block vector (BV) candidate list, normal merge list, or sub-block merge list.

In some examples, motion candidates from MER spatial neighbouring blocks of the MER are utilized during the motion candidate list construction process, the MER spatial neighbouring blocks including MER spatial neighbouring adjacent or/and non-adjacent blocks of the MER.

In some examples, when a spatial neighboring block of the current video block is not available, the MER spatial neighboring block of the MER is checked during the motion candidate list construction process.

In some examples, if motion information of the MER spatial neighbouring block is available, the motion information is utilized to derive a motion candidate which is directly added to the motion candidate list as a replacement of a motion candidate derived from the spatial neighboring block.

In some examples, the MER spatial neighboring blocks are checked after all spatial neighbouring blocks of the current video block are checked during the motion candidate list construction process.

In some examples, the motion candidates from the MER spatial neighboring blocks are added to the motion candidate list after spatial merge candidates.

In some examples, the MER spatial neighboring blocks are checked after all history-based motion vector prediction (HMVP) candidates are checked.

In some examples, the motion candidates from the MER spatial neighboring blocks are added to the motion candidate list after the HMVP candidates.

In some examples, at most X candidates from the MER neighboring blocks are added to the motion candidate list, wherein X is an integer.

In some examples, X=2.

In some examples, MER spatial neighbouring blocks at fixed positions are checked and motion information from those fixed positions are utilized during the motion candidate list construction process.

In some examples, for two blocks within the same MER, a same set of allowed MER spatial neighbouring blocks is defined, and only those blocks in the set are checked and utilized.

In some examples, only one or multiple of the MER spatial neighbouring adjacent blocks in the set are checked and utilized.

In some examples, only one or multiple of the MER spatial neighbouring non-adjacent blocks in the set are checked and utilized.

In some examples, when a neighbouring adjacent block of the current video block is unavailable, a corresponding MER spatial neighbouring block is utilized instead by assuming a size of the current video block is equal to a size of the MER, where denoting a top-left position of the current video block relative to a top-left sample of the current picture by (x0, y0), a block width by bW, a block height by bH, a MER width by mW, and a MER height by mH.

In some examples, if a left block located at (x−1, y0+bH−1) is unavailable, a block located at ((0>>Log2(mW))<<Log2(mW)−1, (y0>>Log2(mH))<<Log2(mH)+mH−1) is utilized.

In some examples, if a below-left block located at (x−1, y0+bH) is unavailable, a block located at ((0>>Log2(mW))<<Log2(mW)−1, (y0>>Log2(mH))<<Log2(mH)+mH) is utilized.

In some examples, if an above-right block located at (x0+bW, y0−1) is unavailable, a block located at ((x>>Log2(mW))<<Log2(mW)+mW, (y0>>Log2(mH))<<Log2(mH)−1) is utilized.

In some examples, if an above block located at ((x0>>Log2(mW))<<Log2(mW)+mW−1, y0−1) is unavailable, a block located at (x0+bW−1, (y0>>Log2(mH))<<Log2(mH)−1) is utilized.

In some examples, if an above-left block located at (x−1, y0−1) is unavailable, a block located at ((0>>Log2(mW))<<Log2(mW)−1, (y0>>Log2(mH))<<Log2(mH)−1) is utilized.

In some examples, MER spatial neighbouring blocks at adaptive positions are checked and motion information from those adaptive positions are utilized during the motion candidate list construction process.

In some examples, at least for two blocks under the MER, at least one of blocks to be checked is different.

In some examples, when a neighbouring adjacent block of the current video block is unavailable, a corresponding MER spatial neighbouring block is utilized instead by assuming a size of the current video block is equal to a size of the MER, where denoting a top-left position of the current video block relative to a top-left sample of the current picture by (x0, y0), a block width by bW, a block height by bH, a MER width by mW, and a MER height by mH.

In some examples, if a left block located at (x−1, y0+bH−1) is unavailable, a block located at ((0>>Log2(mW))<<Log2(mW)−1, y0+bH−1) is utilized.

In some examples, if a below-left block located at (x0−1, y0+bH) is unavailable, a block located at ((0>>Log2(mW))<<Log2(mW)−1, y0+bH) is utilized.

In some examples, if an above-right block located at (x0+bW, y0−1) is unavailable, a block located at (x0+bW, (y0>>Log2(mH))<<Log2(mH)−1) is utilized.

In some examples, if an above block located at ((x0>>Log2(mW))<<Log2(mW)+mW−1, y0−1) is unavailable, a block located at (x0+bW−1, (y0>>Log2(mH))<Log2(mH)−1) is utilized.

In some examples, if an above-left block located at (x−1, y0−1) is unavailable, a block located at ((0>>Log2(mW))<<Log2(mW)−1, (y0>>Log2(mH))<<Log2(mH)−1) is utilized.

In some examples, for different blocks within the same MER, different sets of allowed MER spatial neighbouring blocks associated with the different blocks are defined, and only those blocks in the same set are checked and utilized.

In some examples, only one or multiple of the MER spatial neighbouring adjacent blocks (C0, C1, D0, D1, and D2) in a first set associated with a first block are checked and utilized.

In some examples, only one or multiple of the MER spatial neighbouring non-adjacent blocks (E0, E1, F0, F1, and F2) in a first set associated with a first block are checked and utilized.

In some examples, only one or multiple of the MER spatial neighbouring adjacent blocks (C0, C1, D'0, D'1, and D'2) in a second set associated with a second block are checked and utilized.

In some examples, only one or multiple of the MER spatial neighbouring non-adjacent blocks (E'0, E'1, F'0, F'1, and F'2) in a second set associated with a second block are checked and utilized.

In some examples, whether a motion candidate from a MER spatial neighbouring block is added to the motion candidate list depends on position or/and availability of the MER spatial neighbouring block.

In some examples, motion candidates from at least one of the MER spatial neighbouring adjacent or/and non-adjacent blocks outside the MER are utilized during the motion candidate list construction process.

In some examples, the motion candidates include IBC candidate, or normal inter candidate, or subblock candidate including affine candidates.

In some examples, motion candidates locating at certain positions are added to the motion candidate list.

In some examples, the certain positions include left and above neighbouring adjacent blocks, or left and above neighbouring non-adjacent blocks.

In some examples, the certain positions include above and left neighbouring adjacent blocks, or above and left neighbouring non-adjacent blocks.

In some examples, the certain positions include left, above and above-left neighbouring adjacent blocks, or left, above and above-left neighbouring non-adjacent blocks.

In some examples, the certain positions include above and above-left neighbouring adjacent blocks, or above and above-left neighbouring non-adjacent blocks.

In some examples, the certain positions include left and above-left neighbouring adjacent blocks, or left and above-left neighbouring non-adjacent blocks.

In some examples, motion candidates from the spatial neighbouring blocks are inserted into the motion candidate list following a predefined order.

In some examples, the predetermined order is left, bottom-left, above-right, above and above-left neighbouring adjacent blocks, or left, bottom-left, above-right, above and above-left neighbouring non-adjacent blocks.

In some examples, the predetermined order is above, above-right, left, bottom-left and above-left neighbouring adjacent blocks, or above, above-right, left, bottom-left and above-left neighbouring non-adjacent blocks.

In some examples, the predetermined order is above-left, left, above, bottom-left and above-right neighbouring adjacent blocks, or above-left, left, above, bottom-left and above-right neighbouring non-adjacent blocks.

In some examples, BV candidates from at least one of below-left, left, above-right, above-left and above neighbouring non-adjacent blocks outside the MER are utilized during the motion candidate list construction process.

In some examples, the MER spatial neighbouring block is determined to be available only when the block is coded with a certain mode.

In some examples, the certain mode includes an IBC mode.

In some examples, the certain mode includes a normal inter mode.

In some examples, the normal inter mode include a translational motion-based inter mode.

In some examples, a neighbouring block of the current video block used in the motion candidate list construction is treated as unavailable if it is outside the MER.

In some examples, the motion candidate from the MER spatial neighbouring block is added to the motion candidate list with pruning operation.

In some examples, a motion candidate is not added to the motion candidate list when the motion information of the motion candidate exists in the motion candidate list.

In some examples, two motion candidates from the MER spatial neighbouring blocks are compared to determine whether they are same or similar, and the two motion candidates are both put into the motion candidate list only when they are not same or similar.

In some examples, the motion candidate from the MER spatial neighbouring block is added to the motion candidate list without pruning operation.

In some examples, a maximum number of the motion candidates for the motion candidate list of a block depends on whether the block is under the MER or not.

In some examples, for a first block that is under the MER and a second block that is not under the MER, the maximum numbers of the motion candidates for the motion candidate list of the first block and the second block are different.

In some examples, the maximum number of the motion candidates for the motion list of the first block is less than that of the second block.

In some examples, the maximum number of the motion candidates for the motion list of the first block is greater than that of the second block.

In some examples, for a first block that is under the MER and a second block that is not under the MER, the maximum numbers of the motion candidates for the motion candidate list of the first block and the second block are the same.

In some examples, the maximum number of the motion candidates for the motion candidate list of a block under the MER is signalled at sequence level, picture level, slice level, or tile group level.

In some examples, the maximum number of the motion candidates for the motion candidate list of the block under the MER is signalled in sequence header, picture header, SPS, VPS, DPS, PPS, APS, slice header or tile group header.

In some examples, the maximum number of the motion candidates for the motion candidate list of the block under the MER is signalled only when MER is enabled for the video, sequence, picture, slice, sub-picture, tile group, tile or CTU row.

In some examples, the maximum number of the motion candidates for the motion candidate list of the block under the MER, which is denoted as maxBvListSizeMer, is signalled depending on the maximum number of the motion candidates for the motion candidate list of a block that is not under a MER, which is denoted as maxBvListSizeNonMer.

In some examples, maxBvListSizeNonMer–maxBvListSizeMer instead of maxBvListSizeMer is signalled.

In some examples, the motion candidate list construction process depends on the block position inside a MER.

In some examples, the motion candidate list construction process is only applied to the blocks completely inside the MER, wherein a block is completely inside a MER when it is inside a MER and neither its left boundary nor above boundary coincides with any boundary of the MER.

In some examples, at most X pairwise average candidates are added to the motion candidate list in a case that the block completely inside the MER, X being an integer.

In some examples, X is equal to 2 or 3.

In some examples, signalling of merge index for blocks completely inside a MER is different from blocks which are not inside a MER or not completely inside a MER.

In some examples, maximum number of merging MVP candidates M for blocks completely inside the MER is different from a maximum number of merging MVP candidates N in VVC, M and N being an integer.

In some examples, M is less than N.

In some examples, M=2, and N=5.

In some examples, maximum value of a truncated rice binarization code of merge index for blocks completely inside a MER depend on M.

In some examples, the maximum value is equal to M−1.

In some examples, Merge with Motion Vector Differences (MMVD) process for blocks completely inside a MER is different from blocks which are not inside a MER or not completely inside a MER.

In some examples, maximum number of MMVD base candidates T for blocks completely inside the MER is larger than 2.

In some examples, T=3, or 4, or 5.

In some examples, a pre-defined distance in MMVD is modified for blocks completely inside the MER.

In some examples, the modified pre-defined distance is equal to d*S, where d denotes an original pre-defined distance and S denotes a multiply-scale.

In some examples, S is equal to 2, or 3.

In some examples, S is equal to 1/2, or 1/3.

Figure 36:
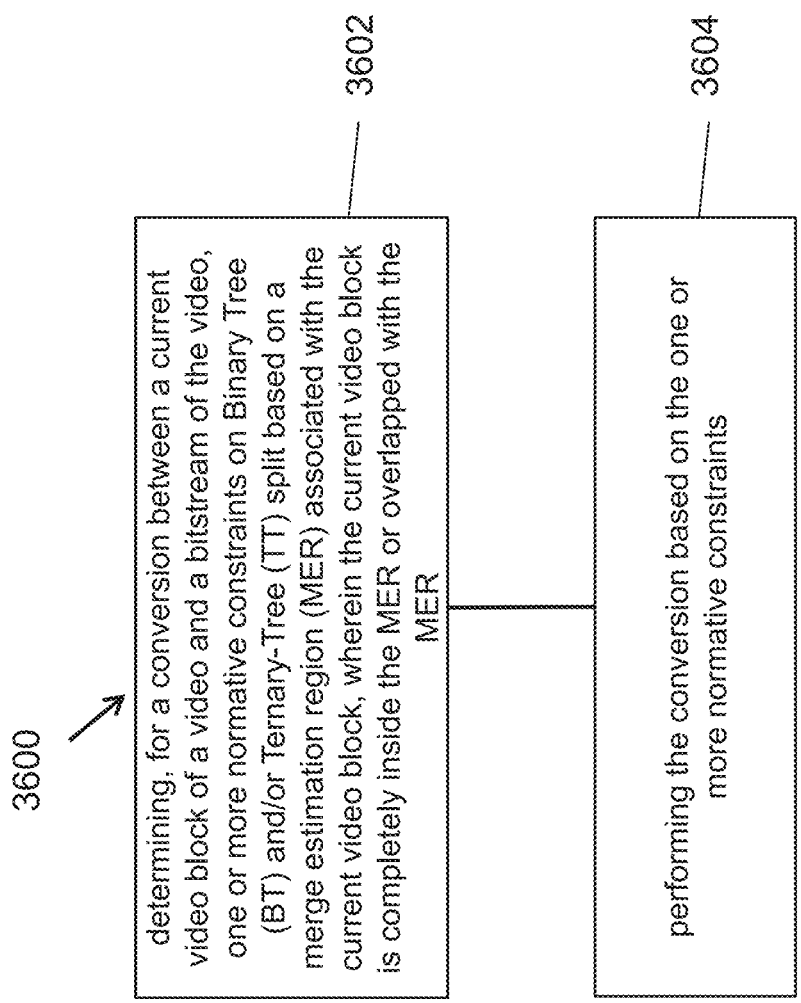
FIG. 36 is a flowchart for an example method of video processing.

FIG. 36 shows a flowchart of an example method for video processing. The method includes determining (3602), for a conversion between a current video block of a video and a bitstream of the video, one or more normative constraints on Binary Tree (BT) and/or Ternary-Tree (TT) split based on a merge estimation region (MER) associated with the current video block, wherein the current video block is completely inside the MER or overlapped with the MER; and performing (3604) the conversion based on the one or more normative constraints.

In some examples, MER width, MER height, block width and block height of the current video block are denoted by R1, R2, W and H respectively, and the one or more normative constraints on Binary Tree (BT) and/or Ternary-Tree (TT) split depends on at least one of the MER width, the MER height, the block width and the block height.

In some examples, horizontal BT split is disabled for a current video block when W>R1 and H<=R2.

In some examples, vertical BT split is disabled for a current video block when W<=R1 and H>R2.

In some examples, horizontal TT split is disabled for a current video block when (W>R1||H>R2) and H<=K*R2, K being an integer.

In some examples, K=2.

In some examples, vertical TT split is disabled for a current video block when (W>R1||H>R2) and W<=K*R1, K being an integer.

In some examples, K=2.

In some examples, R1 is not equal to R2.

In some examples, R1=32, R2=64, or R1=64, R2=32.

In some examples, R1 is equal to R2.

In some examples, R1=R2=32, or R1=R2=64.

In some examples, if a type of split is disabled, a codeword to represent that type of split is skipped.

In some examples, if a type of split is disabled, a syntax element to represent that type of split is skipped.

In some examples, whether to and/or how to apply the one or more normative constraints on BT and TT split depends on slice or tile group type, and/or picture type, and/or partition tree type including dual tree and/or single tree of the video.

In some examples, the one or more normative constraints on BT and TT split are not applied when only intra coding tools are allowed for current picture, current subpicture, current slice or current tile.

In some examples, the current picture is a I frame, or the current slice is a I slice.

In some examples, the one or more normative constraints on BT and TT split are not applied when only inter coding tools are allowed for current picture, current subpicture, current slice or current tile.

In some examples, the current picture is a P/B frame, or the current slice is a P/B slice.

In some examples, the one or more normative constrains on BT and TT split is applied to a block in a case that the block is in a certain region inside a picture or frame of the video.

In some examples, the certain region includes at least one of a subpicture, a slice, a tile, or a predefined rectangular region including region of interest (ROI) in the picture or the frame of the video.

In some examples, the one or more normative constrains on BT and TT split is not applied to block in a case that a part of the block is outside a picture or frame of the video, where a top-left luma sample of the block, picture or frame width, and picture or frame height are denoted by (x0, y0), picW, and picH, respectively.

In some examples, a part of the block is outside a picture or frame of the video when a top-left corner of the block is inside the picture or frame and a top-right or/and bottom-left corner of the block is outside the picture or frame.

In some examples, the one or more normative constrains on BT split is not applied to block in a case that a part of the block is outside a picture or frame of the video.

In some examples, horizontal BT split is still allowed for a block when y0<=picH and y0+T>picH, T being an integer.

In some examples, T is equal to a block height.

In some examples, vertical BT split is still allowed for a block when x0<=picW and x0+T>picW, T being an integer.

In some examples, T is equal to a block width.

In some examples, the one or more normative constrains on TT split is not applied to a block when a part of the block is outside a picture or frame of the video.

In some examples, horizontal TT split is still allowed for a block when y0<=picH and y0+T>picH, T being an integer.

In some examples, T is equal to a block height.

In some examples, T is equal to b*H, where b=1/2 or 1/4.

In some examples, vertical TT split is still allowed for a block when x0<=picW and x0+T>picW, T being an integer.

In some examples, T is equal to a block width.

In some examples, T is equal to b*W, where b=1/2 or 1/4.

In some examples, whether and/or how to perform the determining operation and the adding operation depends on the following information:
  a. a message signalled in at least one of DPS, SPS, VPS, PPS, APS, picture header, slice header, tile group header, Largest coding unit (LCU), Coding unit (CU), LCU row, group of LCUs, TU, PU block, Video coding unit;
  b. position of at least one of CU, PU, TU, block, Video coding unit;
  c. block dimension of current block and/or its neighbouring blocks;
  d. block shape of current block and/or its neighbouring blocks;
  e. coded mode of a block including IBC or non-IBC inter mode or non-IBC subblock mode;
  f. indication of colour format including 4:2:0 and 4:4:4;
  g. coding tree structure;
  h. slice, tile group type and/or picture type;
  i. colour component including only chroma components or luma component;
  j. temporal layer ID;
  k. profiles, Levels, Tiers of a standard.

In some examples, the conversion includes encoding the current video block into the bitstream.

In some examples, the conversion includes decoding the current video block from the bitstream.

In some examples, the conversion includes generating the bitstream from the current video block; the method further comprising: storing the bitstream in a non-transitory computer-readable recording medium.

Figure 37:
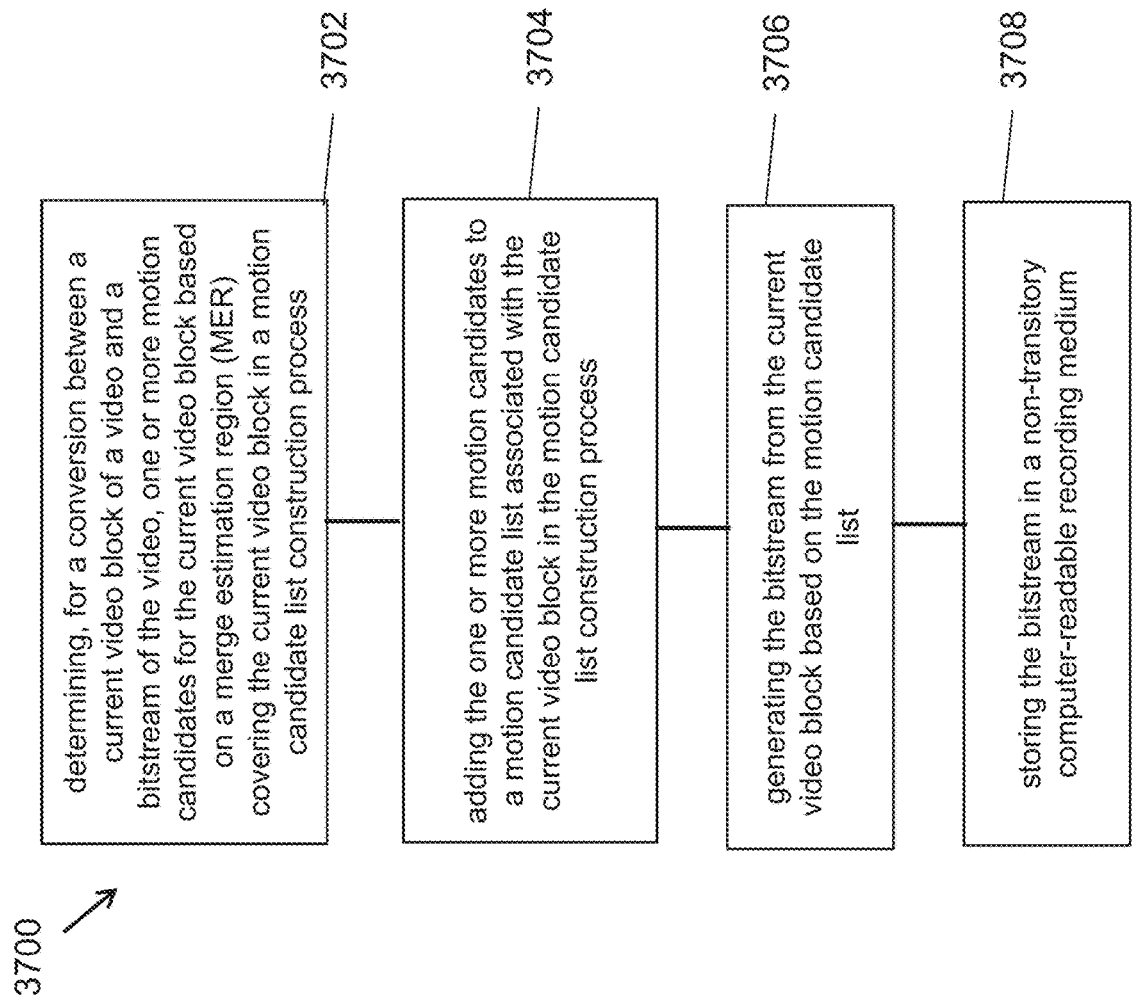
FIG. 37 is a flowchart for an example method of video processing.

FIG. 37 shows a flowchart of an example method for video processing. The method includes determining (3702), for a conversion between a current video block of a video and a bitstream of the video, one or more motion candidates for the current video block based on a merge estimation region (MER) covering the current video block in a motion candidate list construction process; adding (3704) the one or more motion candidates to a motion candidate list associated with the current video block in the motion candidate list construction process; generating (3706) the bitstream from the current video block based on the motion candidate list; and storing (3708) the bitstream in a non-transitory computer-readable recording medium.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   determining, for a conversion between a current video block of a video and a bitstream of the video, one or more normative constraints on Binary Tree (BT) and/or Ternary-Tree (TT) split based on a merge estimation region (MER) associated with the current video block, wherein the current video block is completely inside the MER or overlapped with the MER; and
   performing the conversion based on the one or more normative constraints,
   wherein the one or more normative constraints on BT and TT split is not applied to a block in a case that a part of the block is outside a picture or frame of the video, where a top-left luma sample of the block, picture or frame width, and picture or frame height are denoted by (x0, y0), picW, and picH, respectively, and
   wherein a part of the block is outside a picture or frame of the video when a top-left corner of the block is inside the picture or frame and a top-right or/and a bottom-left corner of the block is outside the picture or frame.

2. The method of claim 1, wherein MER width, MER height, block width and block height of the current video block are denoted by R1, R2, W and H respectively, and the one or more normative constraints on Binary Tree (BT) and/or Ternary-Tree (TT) split depends on at least one of the MER width, the MER height, the block width and the block height.

3. The method of claim 2, wherein horizontal BT split is disabled for a current video block when W>R1 and H<=R2, or wherein vertical BT split is disabled for a current video block when W<=R1 and H>R2.

4. The method of claim 2, wherein horizontal TT split is disabled for a current video block when (W>R1||H>R2) and H<=K*R2, K being an integer, or
   wherein vertical TT split is disabled for a current video block when (W>R1||H>R2) and W<=K*R1, K being an integer.

5. The method of claim 1, wherein if a type of split is disabled, a codeword to represent that type of split is skipped, or
   wherein if a type of split is disabled, a syntax element to represent that type of split is skipped.

6. The method of claim 1, wherein whether to and/or how to apply the one or more normative constraints on BT and TT split depends on slice or tile group type, and/or picture type, and/or partition tree type including dual tree and/or single tree of the video.

7. The method of claim 6, wherein the one or more normative constraints on BT and TT split are not applied when only intra coding tools are allowed for current picture, current subpicture, current slice or current tile, and wherein the current picture is a I frame, or the current slice is a I slice.

8. The method of claim 6, wherein the one or more normative constraints on BT and TT split are not applied when only inter coding tools are allowed for current picture, current subpicture, current slice or current tile, and wherein the current picture is a P/B frame, or the current slice is a P/B slice.

9. The method of claim 1, wherein the one or more normative constraints on BT and TT split is applied to a block in a case that the block is in a certain region inside a picture or frame of the video.

10. The method of claim 9, wherein the certain region includes at least one of a subpicture, a slice, a tile, or a predefined rectangular region including region of interest (ROI) in the picture or the frame of the video.

11. The method of claim 1, wherein the one or more normative constraints on BT split is not applied to a block in a case that a part of the block is outside a picture or frame of the video.

12. The method of claim 11, wherein horizontal BT split is still allowed for a block when y0<=picH and y0+T>picH, T being an integer, or wherein vertical BT split is still allowed for a block when x0<=picW and x0+T>picW, T being an integer.

13. The method of claim 1, wherein the one or more normative constraints on TT split is not applied to a block when a part of the block is outside a picture or frame of the video.

14. The method of claim 13, wherein horizontal TT split is still allowed for a block when y0<=picH and y0+T>picH, T being an integer, or wherein vertical TT split is still allowed for a block when x0<=picW and x0+T>picW, T being an integer.

15. The method of claim 1, wherein the conversion includes encoding the video into the bitstream.

16. The method of claim 1, wherein the conversion includes decoding the video from the bitstream.

17. An apparatus for processing video data comprising a processor and a non-transitory memory with instructions thereon, wherein the instructions upon execution by the processor, cause the processor to:

determine, for a conversion between a current video block of a video and a bitstream of the video, one or more normative constraints on Binary Tree (BT) and/or Ternary-Tree (TT) split based on a merge estimation region (MER) associated with the current video block, wherein the current video block is completely inside the MER or overlapped with the MER; and perform the conversion based on the one or more normative constraints, wherein the one or more normative constraints on BT and TT split is not applied to a block in a case that a part of the block is outside a picture or frame of the video, where a top-left luma sample of the block, picture or frame width, and picture or frame height are denoted by (x0, y0), picW, and picH, respectively, and wherein a part of the block is outside a picture or frame of the video when a top-left corner of the block is inside the picture or frame and a top-right or/and a bottom-left corner of the block is outside the picture or frame.

18. A non-transitory computer-readable recording medium storing a bitstream of a video which is generated by a method performed by a video processing apparatus, wherein the method comprises:

determining, for a current video block of a video, one or more normative constraints on Binary Tree (BT) and/or Ternary-Tree (TT) split based on a merge estimation region (MER) associated with the current video block, wherein the current video block is completely inside the MER or overlapped with the MER; and generating the bitstream of the video based on the one or more normative constraints, wherein the one or more normative constraints on BT and TT split is not applied to a block in a case that a part of the block is outside a picture or frame of the video, where a top-left luma sample of the block, picture or frame width, and picture or frame height are denoted by (x0, y0), picW, and picH, respectively, and wherein a part of the block is outside a picture or frame of the video when a top-left corner of the block is inside the picture or frame and a top-right or/and a bottom-left corner of the block is outside the picture or frame.

* * * * *